(12) United States Patent
DeMars

(10) Patent No.: US 7,201,458 B2
(45) Date of Patent: Apr. 10, 2007

(54) PORTABLE BAR WITH PORTABLE BARBECUE

(75) Inventor: Robert DeMars, La Quinta, CA (US)

(73) Assignee: Original Ideas, Inc., La Quinta, CA (US)

( * ) Notice: Subject to any disclaimer, the term of this patent is extended or adjusted under 35 U.S.C. 154(b) by 0 days.

(21) Appl. No.: 11/431,843

(22) Filed: May 11, 2006

(65) Prior Publication Data

US 2006/0202594 A1 Sep. 14, 2006

Related U.S. Application Data

(63) Continuation of application No. 11/406,716, filed on Apr. 20, 2006, which is a continuation-in-part of application No. 11/101,876, filed on Apr. 9, 2005, now abandoned, which is a continuation of application No. 10/866,611, filed on Jun. 14, 2004, now Pat. No. 6,918,640, which is a continuation-in-part of application No. 10/640,803, filed on Aug. 13, 2003, now Pat. No. 6,957,876.

(51) Int. Cl.
*A47B 43/00* (2006.01)
(52) U.S. Cl. .................. 312/140.2; 312/258; 126/25 R
(58) Field of Classification Search .. 312/140.1–140.4, 312/257.1, 263, 265.1–265.4, 258, 262, 236; 126/25 R, 277, 305; 108/115, 99, 162, 167, 108/171, 179, 157.16; 160/135, 351; 52/36.1
See application file for complete search history.

(56) References Cited

U.S. PATENT DOCUMENTS

| | | | | |
|---|---|---|---|---|
| 282,794 A | * | 8/1883 | Starling | ........................ 312/100 |
| 1,913,387 A | * | 6/1933 | Hayward | .................. 312/140.2 |
| 2,321,204 A | * | 6/1943 | Hillenbrand | ............. 248/188.8 |
| D171,856 S | | 3/1954 | Mont | |
| 2,771,334 A | | 11/1956 | Wahlborn | |
| 2,808,305 A | | 10/1957 | Jackson | |

(Continued)

OTHER PUBLICATIONS

PortaBar, www.improvementscatalog.com web page Feb. 3, 2005.*

(Continued)

*Primary Examiner*—Janet M. Wilkens
(74) *Attorney, Agent, or Firm*—Dan M. DeLaRosa

(57) ABSTRACT

A portable bar is provided, the bar comprises a vertical panel having a front side, a back side and opposing ends; at least two side panels, one side panel being connected to each of the opposing ends of the vertical panel and is perpendicular to the vertical panel, each of the side panels comprising at least one leg, the leg being a transversely located elongated foot member; at least two vertical support panels, each support panel is connected to the opposing ends of the vertical panel and the side panels, each of the vertical support panels comprises a front panel and a side support panel, the side support panel is connected to the front panel of the vertical support panel and comprises at least one leg; a counter is connected to and supported by the vertical panel and the vertical support panels, at least a portion of the counter comprising at least one aperture for receiving a cooking apparatus such as a barbecue; and at least one horizontal shelf is situated on the back side of the vertical panel.

20 Claims, 43 Drawing Sheets

U.S. PATENT DOCUMENTS

| | | |
|---|---|---|
| 2,995,408 A | 8/1961 | Kobrin |
| 3,140,133 A | 7/1964 | Kraft |
| 3,347,591 A * | 10/1967 | Soroos et al. ............... 296/168 |
| 3,532,403 A | 10/1970 | Koski |
| 3,588,209 A | 6/1971 | Nathan |
| 3,841,728 A | 10/1974 | Petersen et al. |
| 4,066,305 A * | 1/1978 | Gazarek ..................... 312/195 |
| D258,478 S | 3/1981 | Zola |
| 4,437,714 A | 3/1984 | Struck |
| 4,635,613 A * | 1/1987 | Tucker et al. .............. 126/25 R |
| 4,747,644 A | 5/1988 | Gallery et al. |
| D306,664 S | 3/1990 | Pouch |
| 5,076,252 A * | 12/1991 | Schlosser et al. ......... 126/25 R |
| 5,353,716 A | 10/1994 | Wilbert |
| 5,382,087 A | 1/1995 | Pouch |
| 5,405,192 A | 4/1995 | McGrath |
| 5,518,127 A | 5/1996 | Warmack et al. |
| D375,216 S | 11/1996 | Intardonato |
| 5,582,471 A | 12/1996 | Lin |
| 5,915,602 A | 6/1999 | Nelson |
| D419,000 S | 1/2000 | Galloway |
| 6,039,414 A | 3/2000 | Melane et al. |
| 6,196,712 B1 | 3/2001 | Elm |
| D449,750 S | 10/2001 | Antonioni |
| 6,349,715 B1 * | 2/2002 | McBroom ................... 126/276 |
| 6,615,550 B2 * | 9/2003 | Reuschel et al. ............ 52/36.2 |
| 6,632,317 B1 | 10/2003 | Höfer |
| 6,684,576 B2 | 2/2004 | Grandin |
| D488,650 S | 4/2004 | Muenzberg |
| 6,739,330 B1 * | 5/2004 | Ross ........................ 126/41 R |
| 2003/0183134 A1 * | 10/2003 | Jackson ....................... 108/64 |
| 2004/0017135 A1 * | 1/2004 | Roberts et al. .......... 312/140.3 |
| 2004/0060588 A1 * | 4/2004 | Lekhtman .................... 135/98 |
| 2004/0065313 A1 * | 4/2004 | Thompson ................ 126/37 R |
| 2006/0144935 A1 * | 7/2006 | Gross ......................... 235/383 |

OTHER PUBLICATIONS

BAR01-Rolling Portable Bar, www.peeriessumbrella.com web page Feb. 3, 2005.*

* cited by examiner

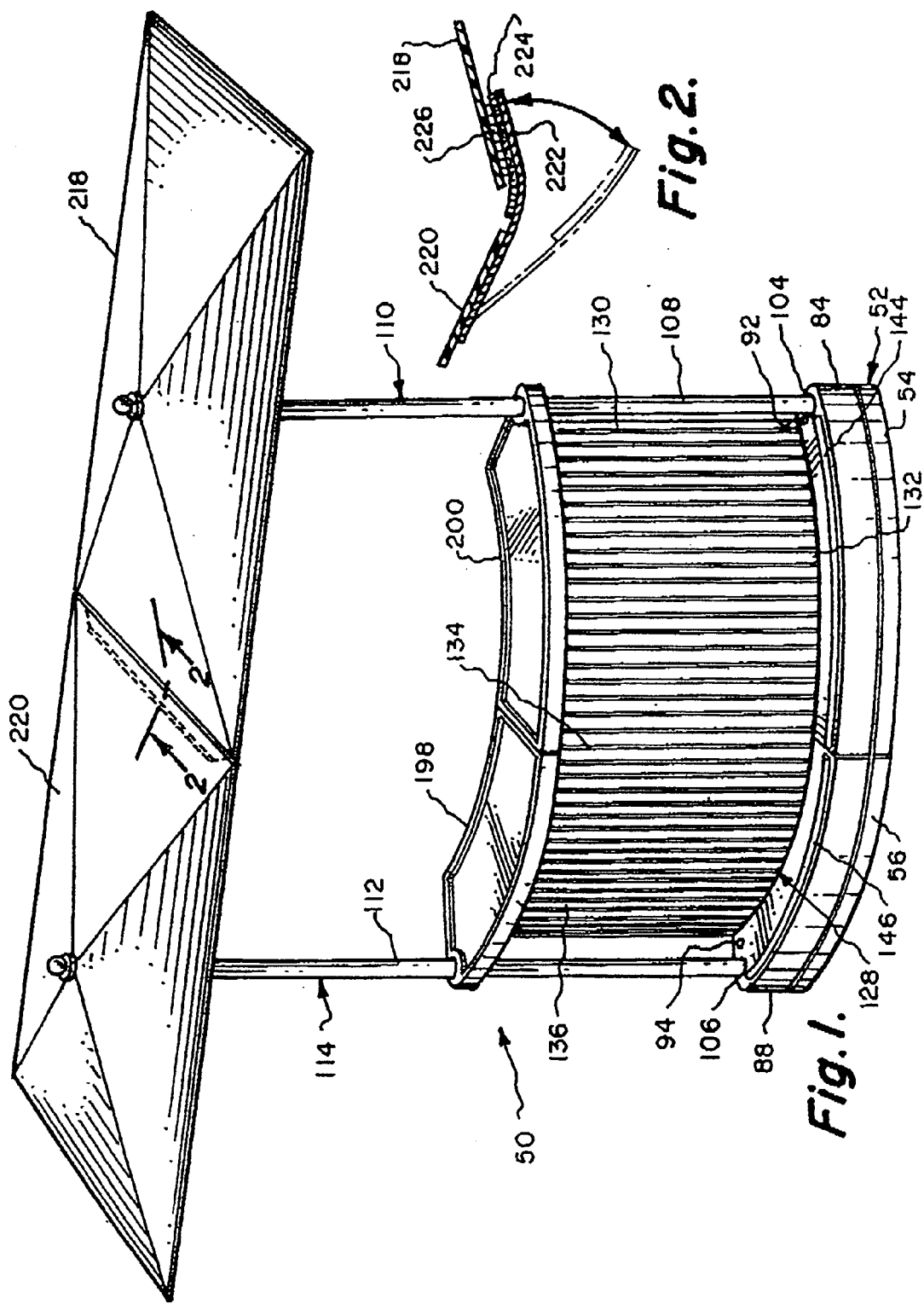

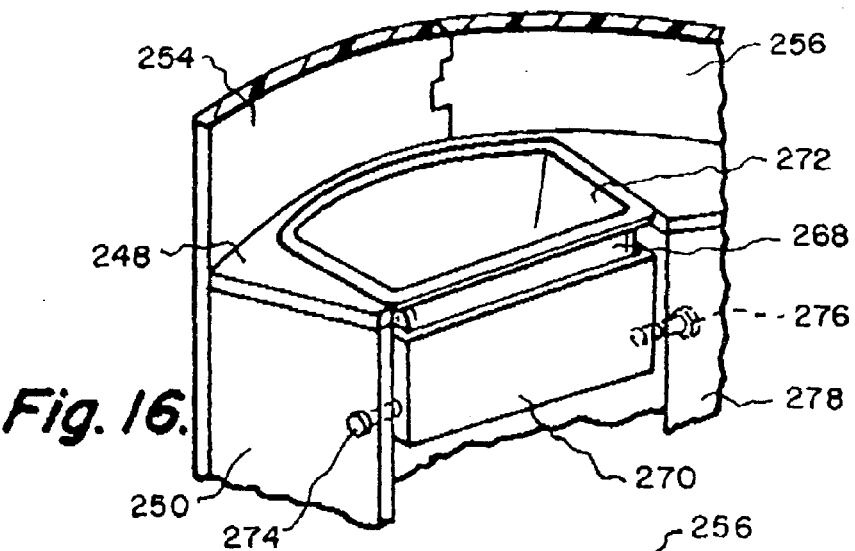
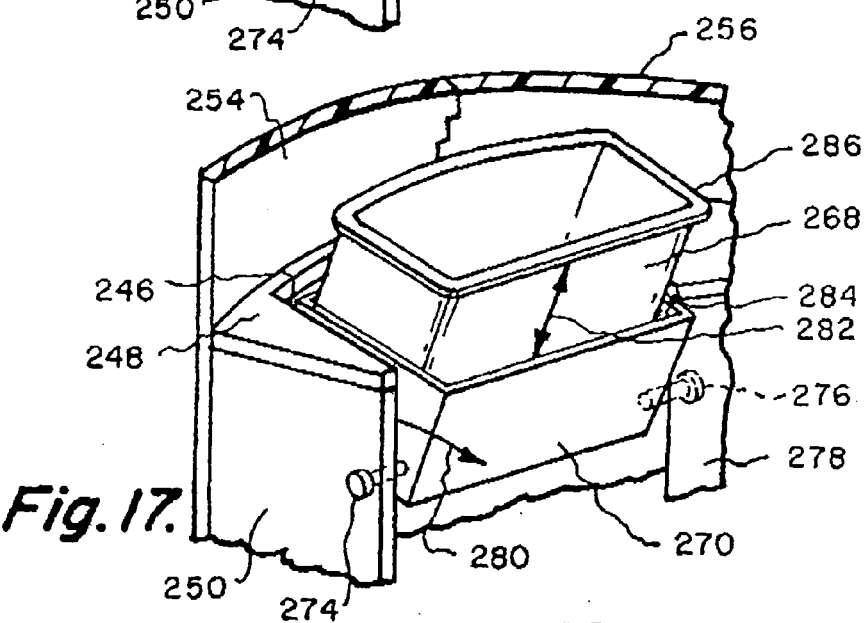
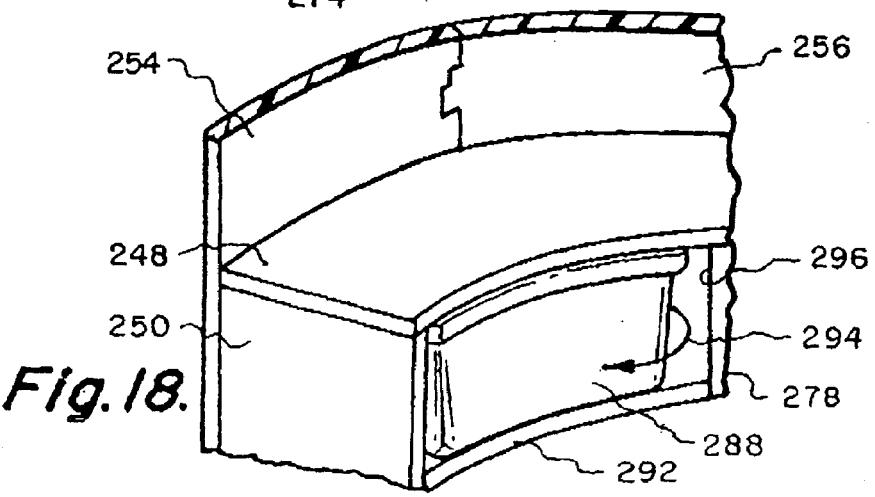

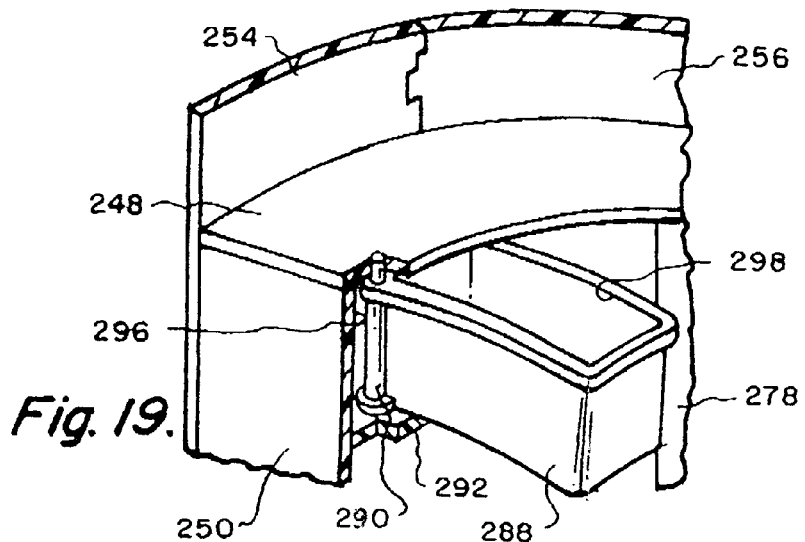
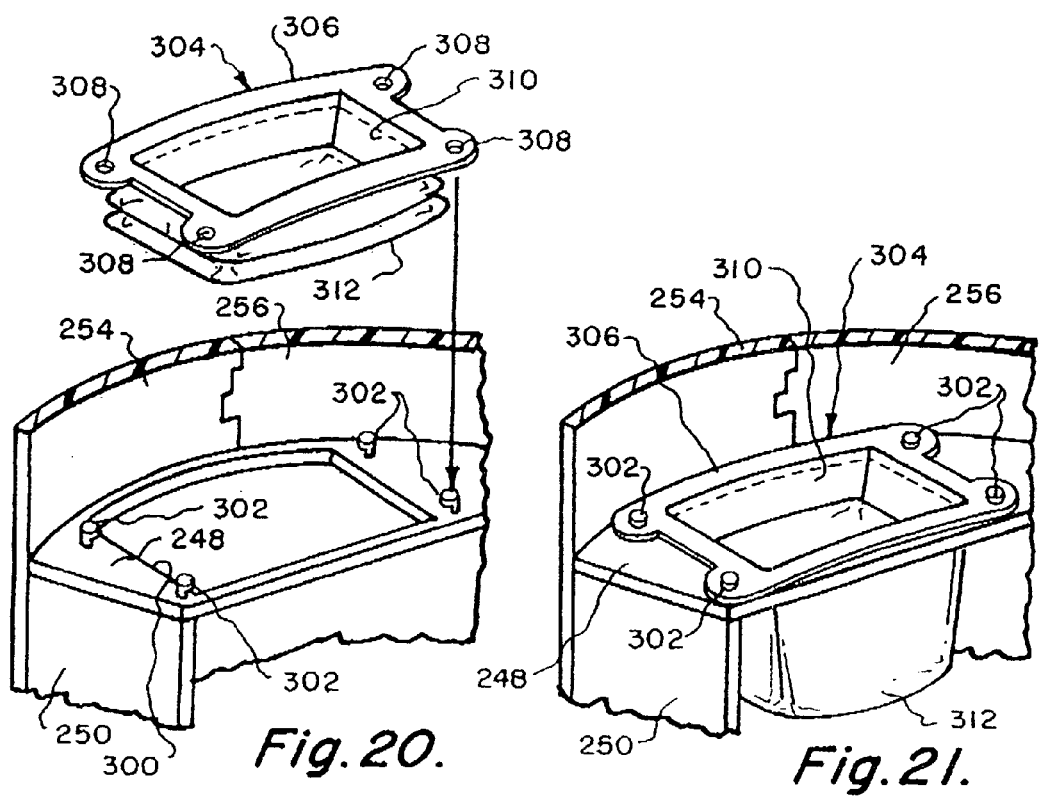

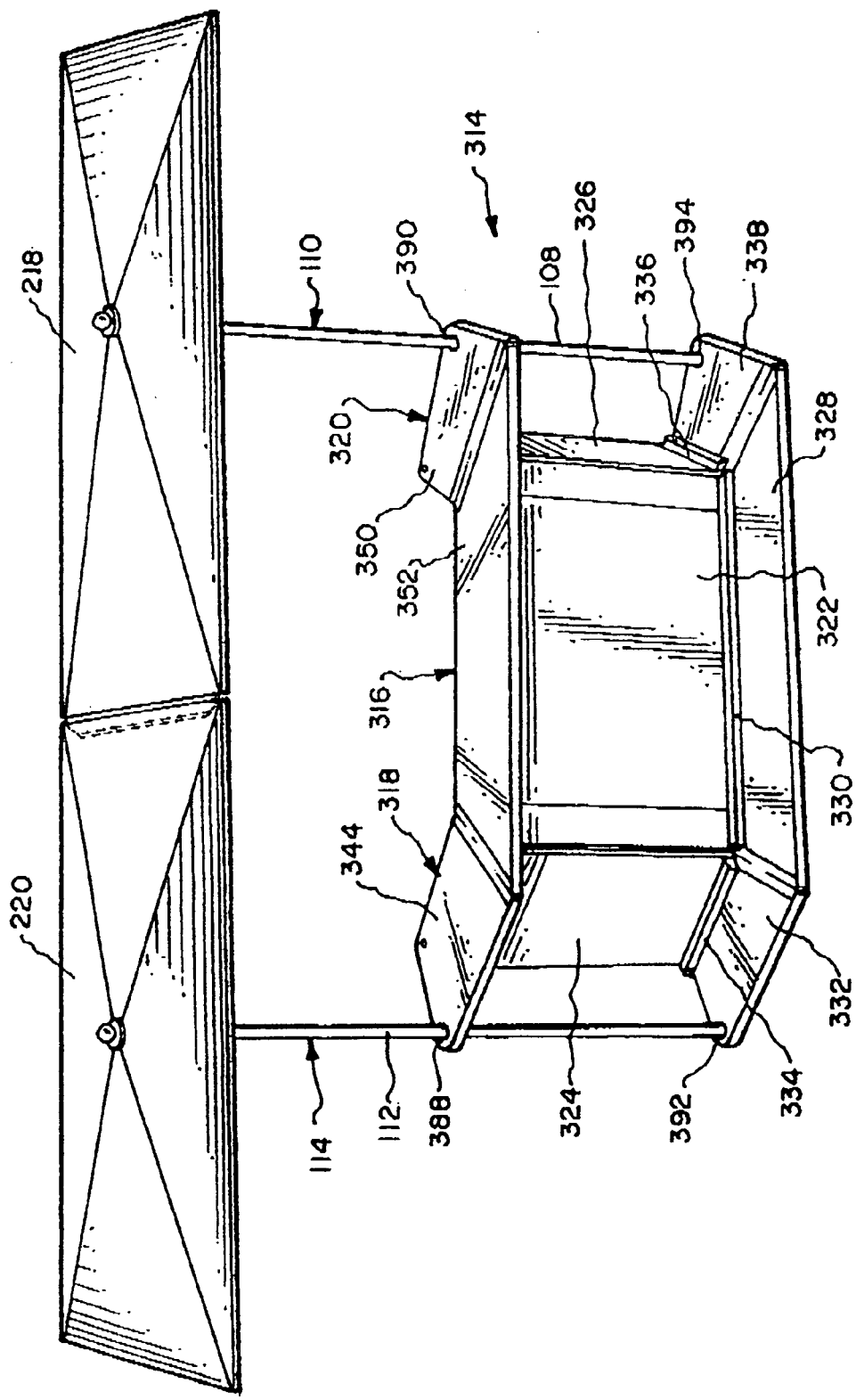

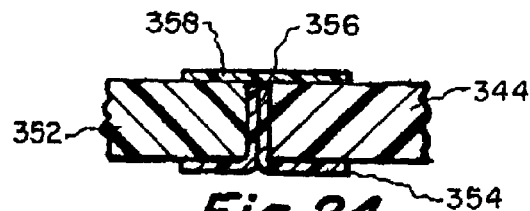
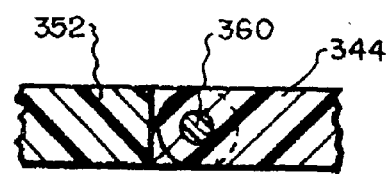
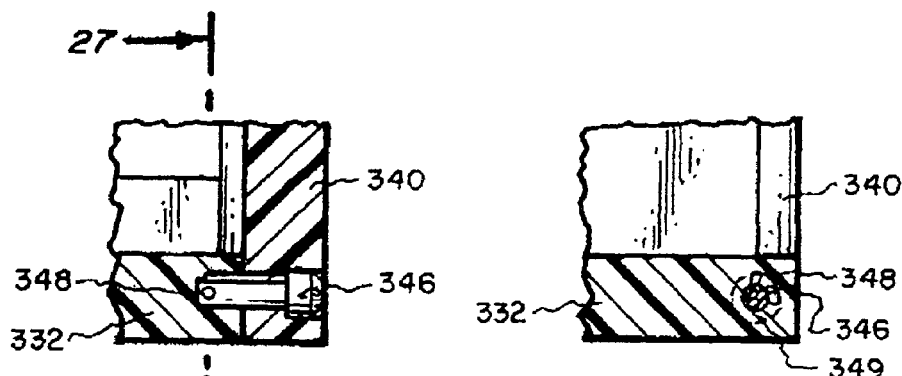
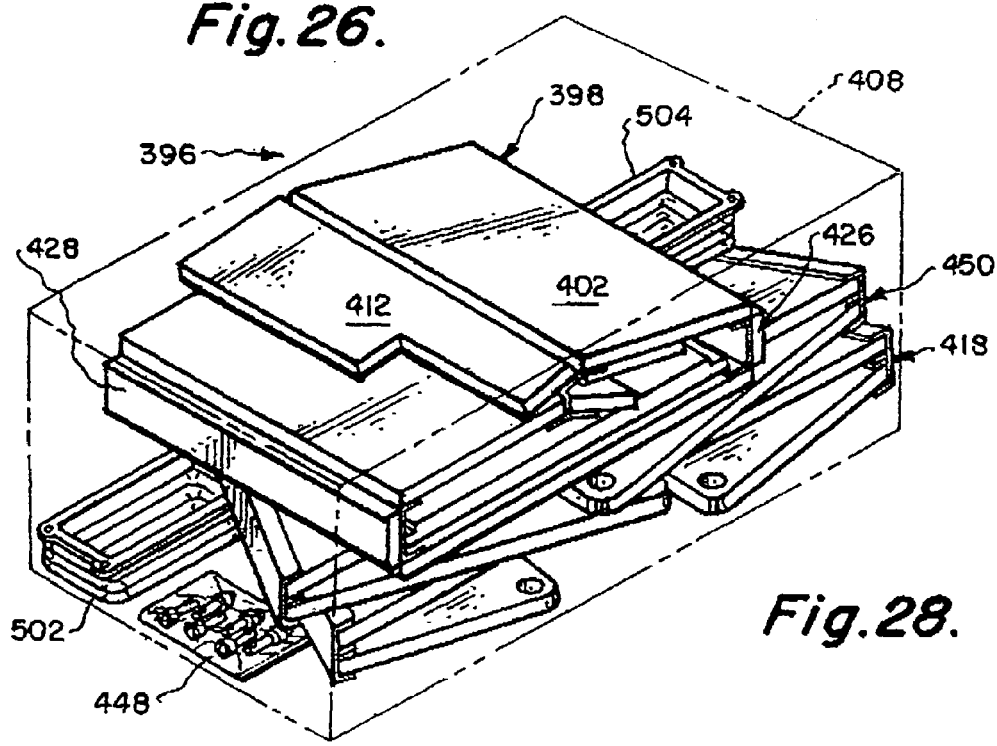

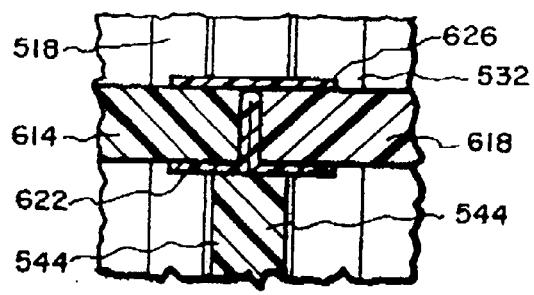
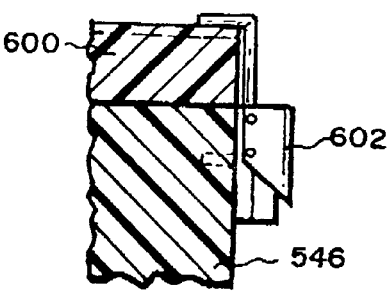
Fig. 36.  Fig. 37.
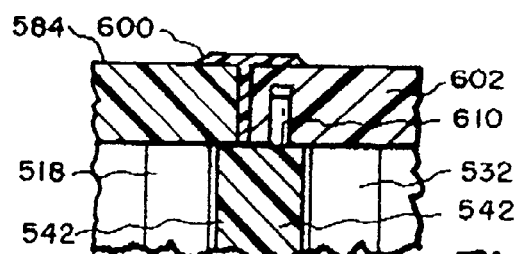
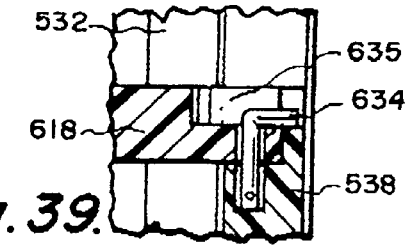
Fig. 38.  Fig. 39.
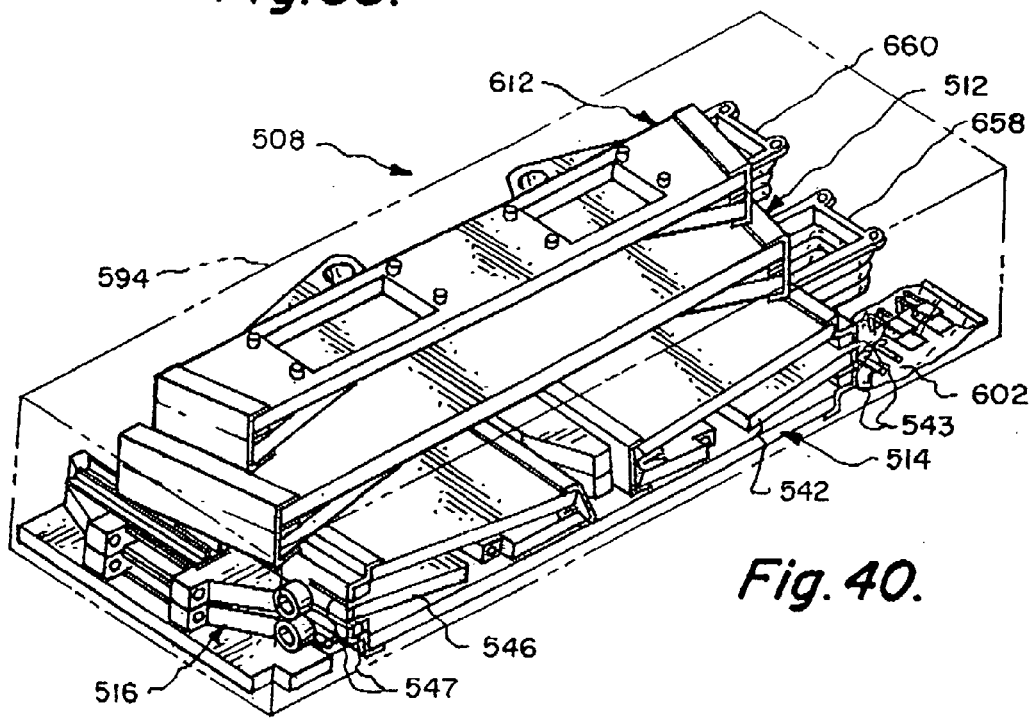
Fig. 40.

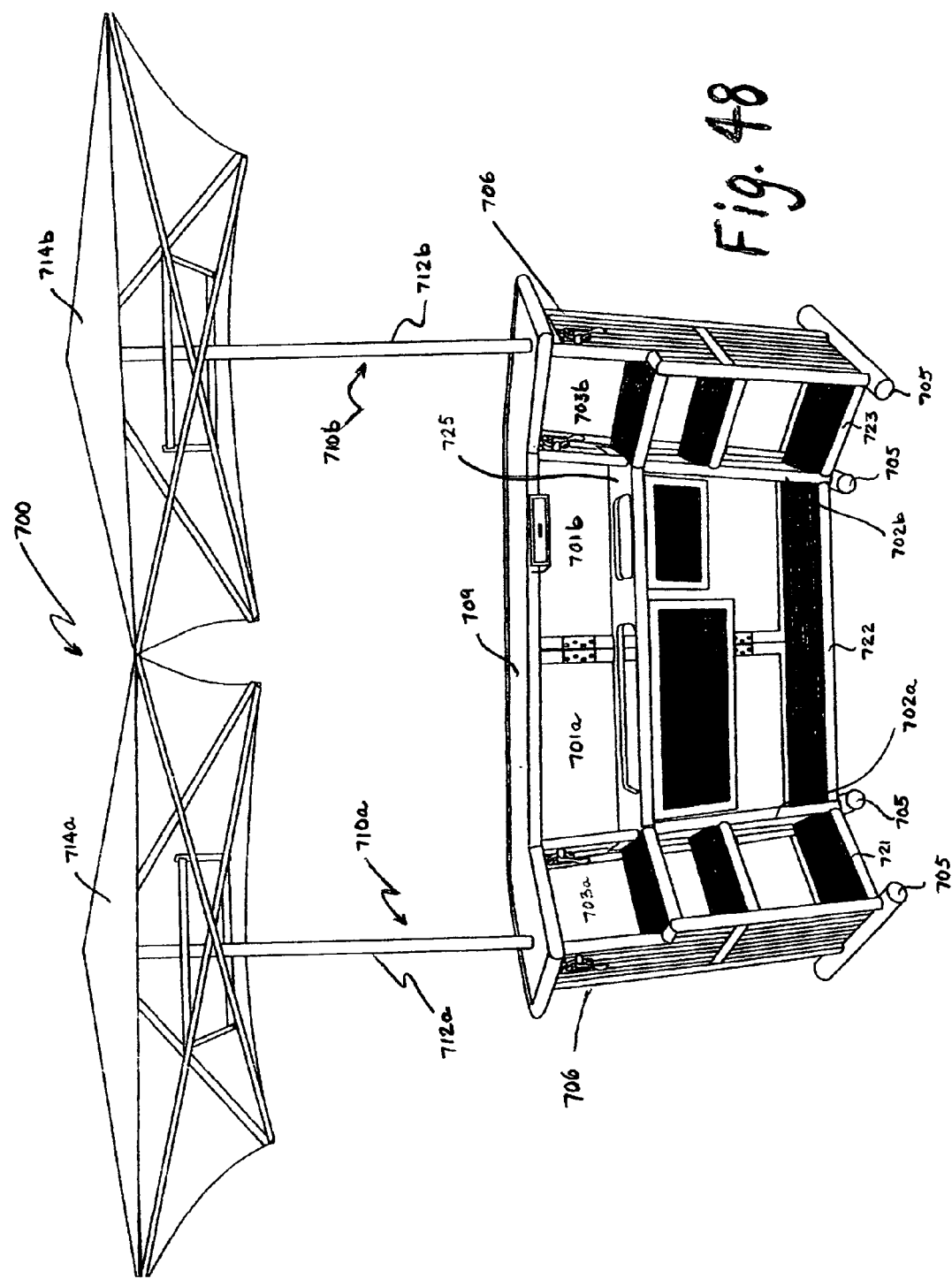

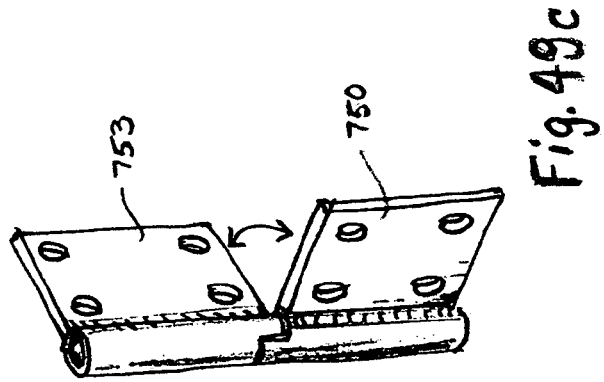
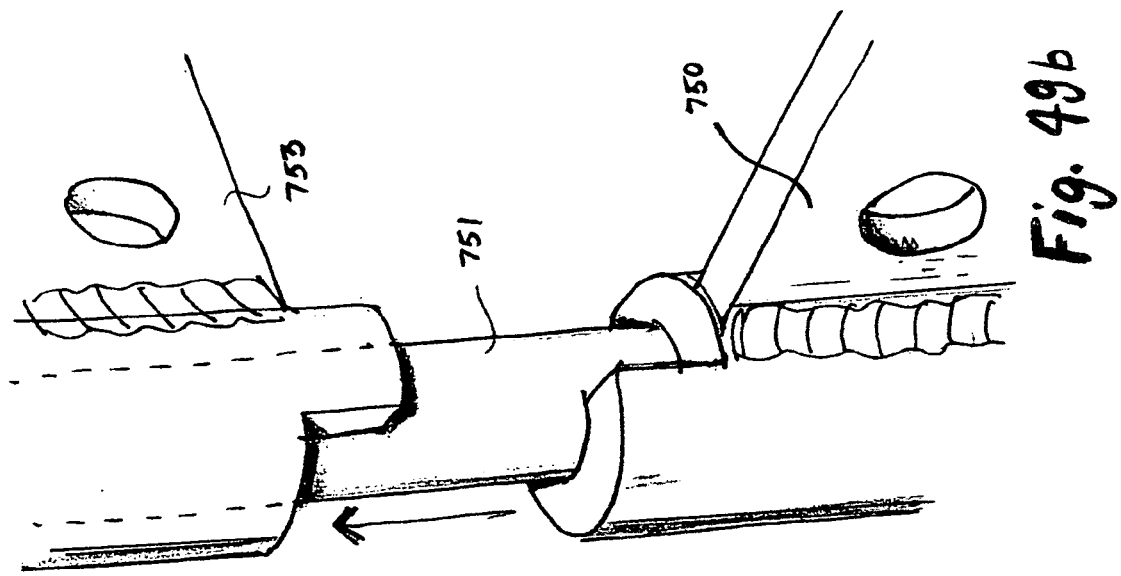
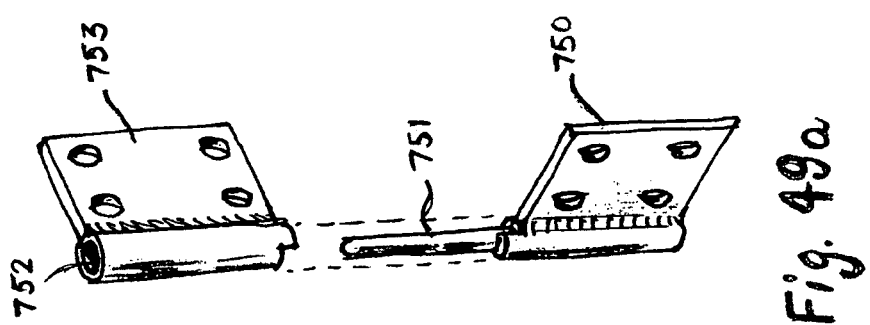

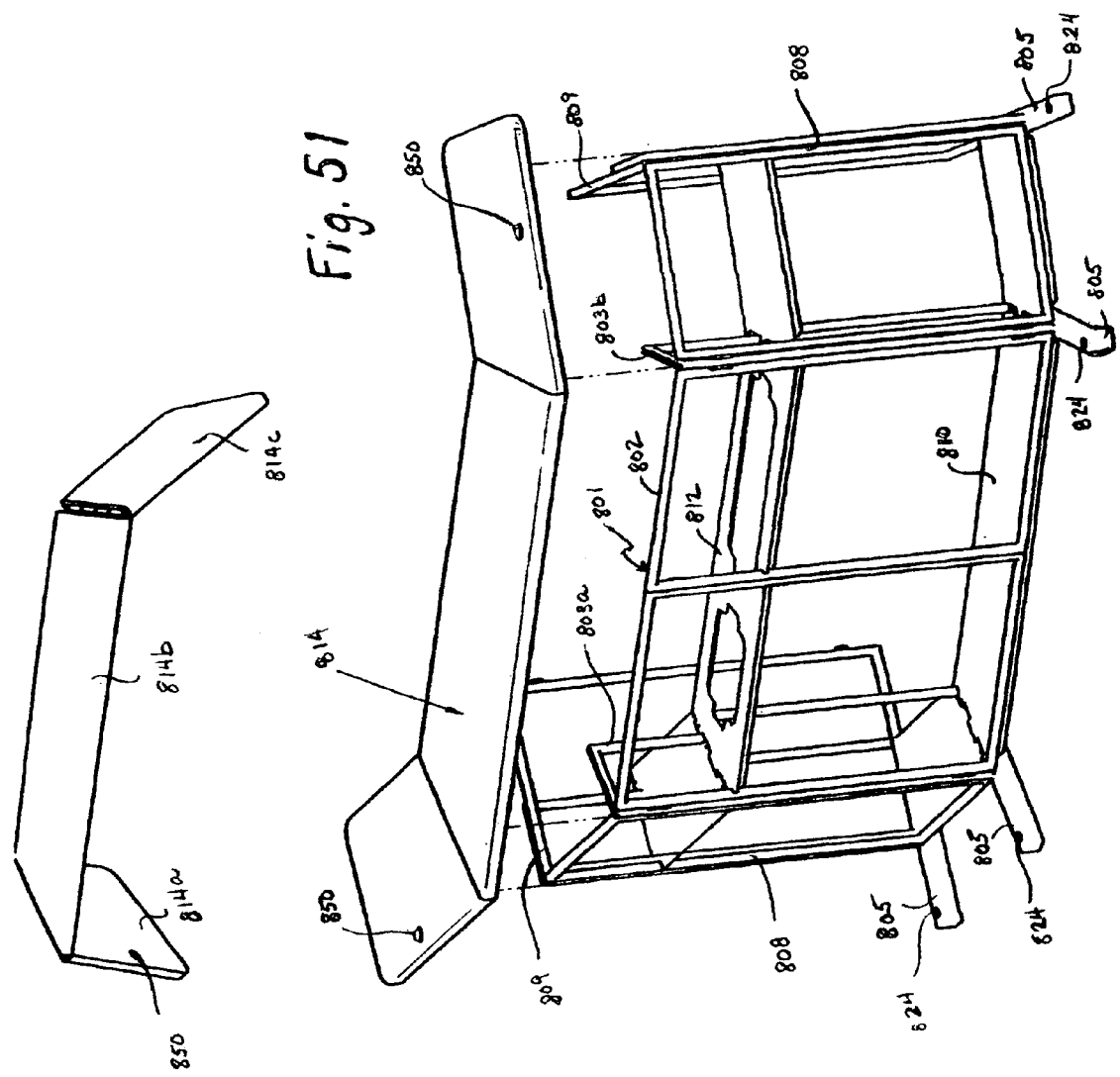

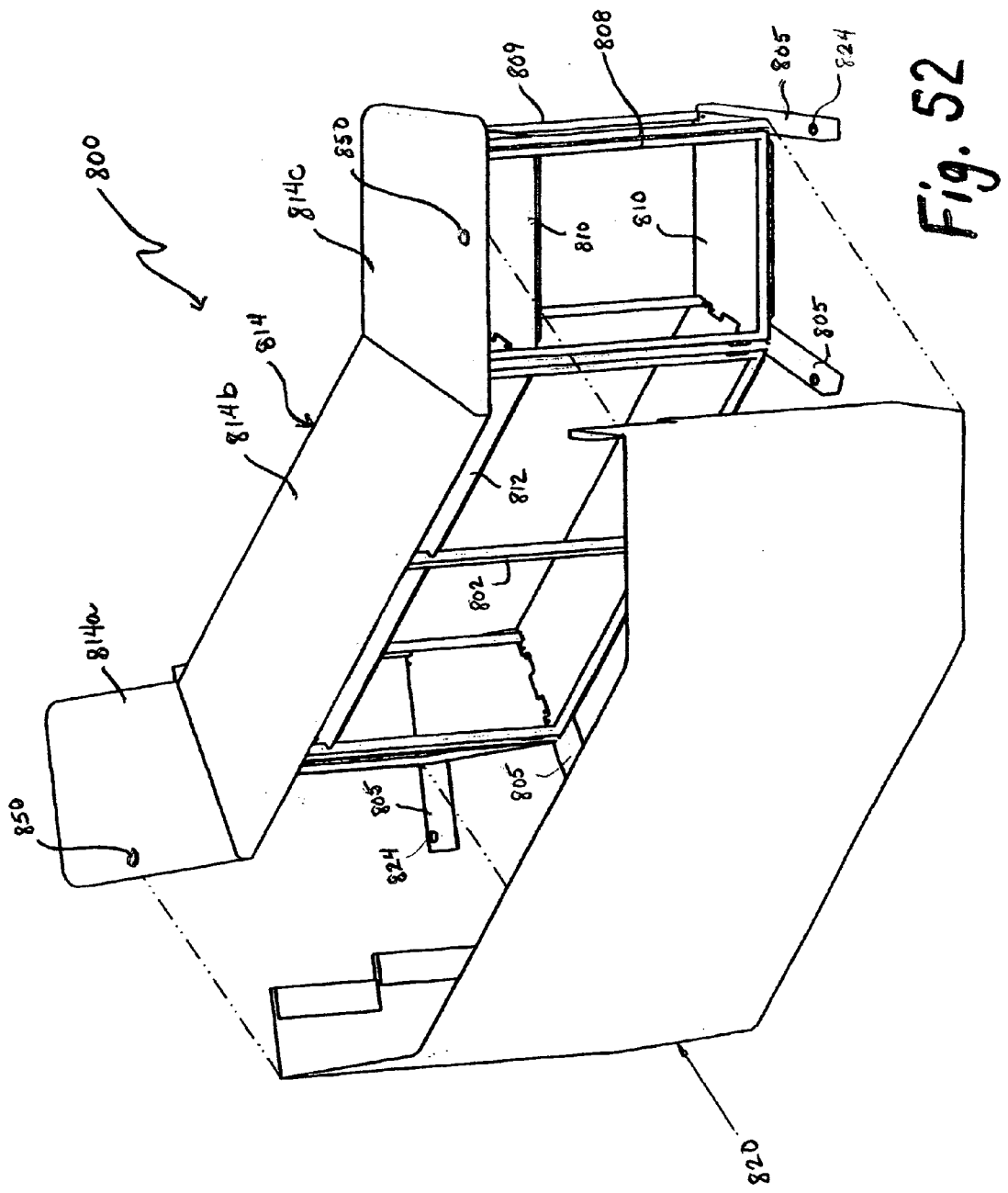

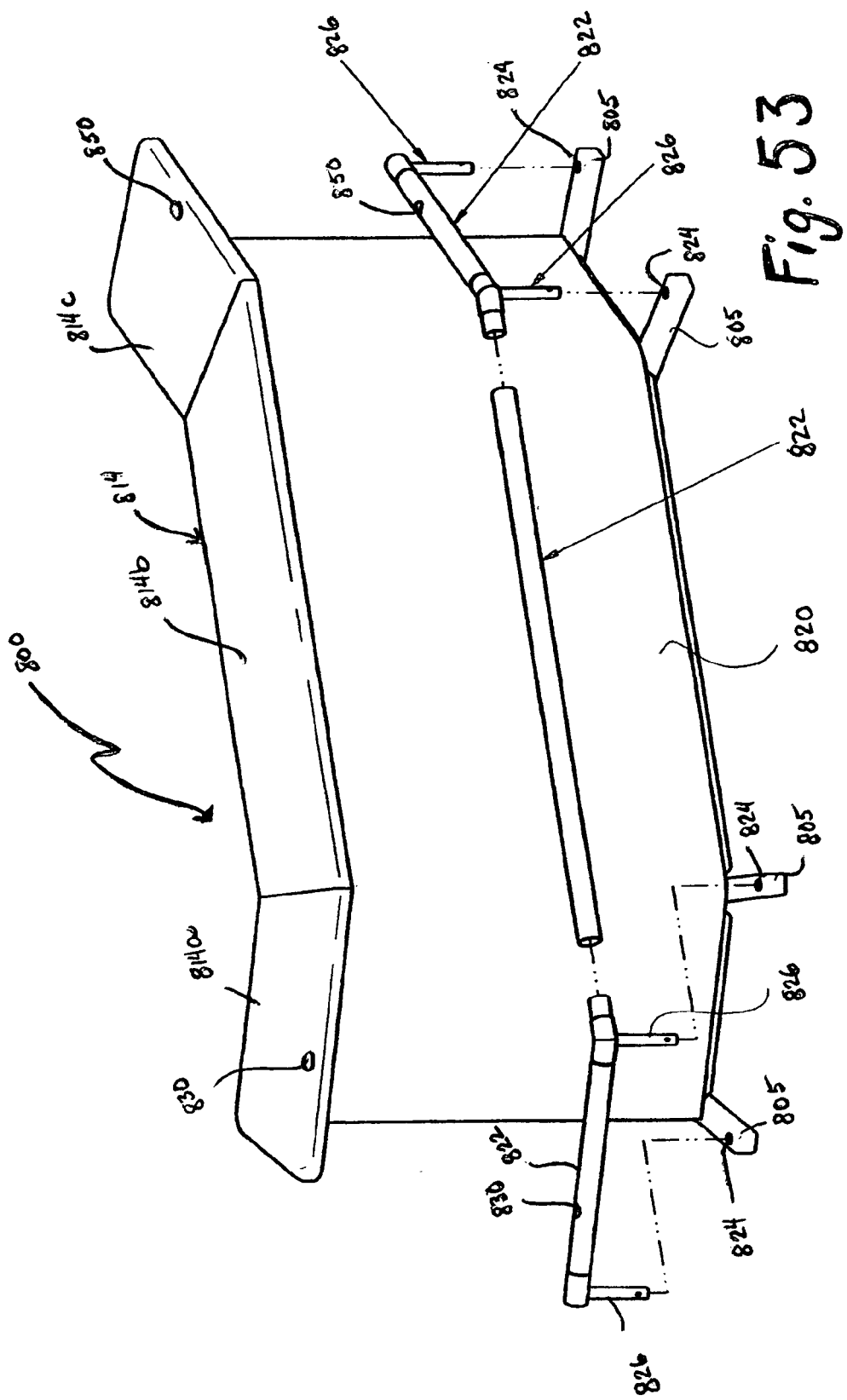

PORTABLE BAR WITH PORTABLE BARBECUE

RELATED APPLICATION

This application is a continuation of U.S. application Ser. No. 11/406,716, entitled "Portable Bar With Portable Barbecue" which was filed on Apr. 20, 2006, which is a U.S. application Ser. No. 11/252,823, entitled "Portable Bar With Advertising Materials" which was filed on Oct. 19, 2005, which is a continuation-in-part of U.S. application Ser. No. 11/101,876, entitled "Portable Bar With Drop-In Coolers And Umbrella Assembly" which was filed on Apr. 9, 2005 now abandoned, and which is a continuation of U.S. application Ser. No. 10/866,611, entitled "Portable Bar With Collapsible Components" which was filed on Jun. 14, 2004, and has now issued as U.S. Pat. No. 6,918,640 with an issue date of Jul. 19, 2005 and which is a continuation-in-part application of U.S. application Ser. No. 10/640,803, entitled "Portable Bar" which was filed on Aug. 13, 2003, and has now issued as U.S. Pat. No. 6,957,876 with an issue date of Oct. 25, 2005.

BACKGROUND OF THE INVENTION

1. Field of the Invention

This invention relates to a bar from which beverages are to be served and more particularly, a portable bar with an attachable and detachable cooking device such as a portable barbecue.

2. Description of the Related Art

Bar structures for serving of beverages have long been known. The typical bar is constructed as a rigid unit and is permanently installed in conjunction with a home or a place of business. A typical bar is generally no bigger than six to ten feet in length, which has a counter on its upper surface and shelving within its back surface.

With some homes and certain types of businesses, there is a need for use of a bar, not on a full time basis. It would therefore be desirable to construct a bar that can be collapsed so that the bar would occupy a substantially smaller amount of space to facilitate storage when not in use. There have been constructed portable bars in the prior art, but these bars have not included a shelf with a hole for housing a drop-in ice bucket, a retractable condiment tray in the counter or an attached umbrella assembly.

Bars are frequently set up in outdoor environments. In such an environment, the bar should be constructed to include some kind of umbrella to protect the bartender and customers from the sun and also from the rain. Prior to the present invention, it has not been known to provide a bar with an attached umbrella assembly.

SUMMARY OF THE INVENTION

In one embodiment, the present invention provides for a portable bar comprises a framework having a front and back side and comprises a central frame with opposing ends and at least two side frames situated on the opposing ends of the central frame and is perpendicular to the central frame, each of the side frames comprises at least one elongated foot member situated at a bottom end of the side frame; at least two side supporting frames, each frame is connected to the opposing ends of the central frame, the supporting frame comprising a central supporting frame and a side supporting frame, the side supporting frame comprises at least one elongated foot member situated at a bottom end of the side supporting frame; at least one supporting shelf and at least one shelf having an aperture for supporting a container, the shelves is situated on the back side of the framework; at least one counter attached to a top side of the framework and the supporting frames, at least a portion of the counter having an aperture for receiving a cooking apparatus; and at least one front panel situated on the front side of the framework.

In another embodiment, cooking apparatus comprises a barbecue and in still another embodiment, the cooking apparatus comprises a portable barbecue.

In yet another embodiment, the present invention also provides for a portable bar which comprises: a framework having a front and back side and comprising a central frame with opposing ends and at least two side frames being situated on the opposing ends of the central frame and is perpendicular to the central frame, each of the side frames comprising at least one elongated foot member situated at a bottom end of the side frame; at least two side supporting frames, each is connected to the opposing ends of the central frame, the supporting frame comprises a central supporting frame and a side supporting frame, the side supporting frame comprises at least one elongated foot member situated at a bottom end of the side supporting frame; at least one supporting shelf and at least one shelf having an aperture for supporting a container, the shelves are situated on the back side of the framework; at least one counter attached to a top side of the framework and the supporting frames, the counter having a first and second element, at least a portion of one of the counter elements having an aperture for receiving a cooking apparatus; and at least one front panel situated on the front side of the framework.

In still yet another embodiment, the present invention relates to a portable bar comprising: a framework having a front and back side and comprising a central frame with opposing ends and at least two side frames being situated on the opposing ends of the central frame and being perpendicular to the central frame, each of the side frames comprises at least one elongated foot member situated at a bottom end of the side frame; at least two side supporting frames, each being connected to the opposing ends of the central frame, the supporting frame comprises a central supporting frame and a side supporting frame, the side supporting frame comprises at least one elongated foot member situated at a bottom end of the side supporting frame; at least one supporting shelf and at least one shelf having an aperture for supporting a container, the shelves being situated on the back side of the framework; at least one counter attached to a top side of the framework and the supporting frames, at least a portion of the counter having an aperture for receiving a cooking apparatus; at least one cooking apparatus situated within the aperture of the counter during use and being removable from the aperture of the counter during storage or portability; and at least one front panel situated on the front side of the framework.

In a further embodiment, the present invention relates to a portable bar with portable barbecue comprising: a vertical panel having a front side, a back side and opposing ends; at least two side panels, one side panel connected to each of the opposing ends of the vertical panel and being perpendicular to the vertical panel, each of the side panels comprising at least one leg, the leg being a transversely located elongated foot member; at least two vertical support panels, each support panel being connected to the opposing ends of the vertical panel and the side panels, each of the vertical support panels comprising a front panel and a side support panel, the side support panel being connected to the front panel of the vertical support panel and comprising at least one leg; a counter being connected to and supported by the vertical panel and the vertical support panels, at least a portion of the counter comprising at least one aperture for receiving a cooking apparatus; and at least one horizontal shelf situated on the back side of the vertical panel.

In still a further embodiment, the portable bar of the present invention comprises: a vertical panel having a front side, a back side and opposing ends; at least two side panels, one side panel being connected to each of the opposing ends of the vertical panel and being perpendicular to the vertical panel, each of the side panels comprising at least one leg, the leg being a transversely located elongated foot member; at least two vertical support panels, each support panel being connected to the opposing ends of the vertical panel and the side panels, each of the vertical support panels comprising a front panel and a side support panel, the side support panel being connected to the front panel of the vertical support panel and comprises at least one leg; a counter connected to and supported by the vertical panel and the vertical support panels, at least a portion of the counter comprises at least one aperture for receiving a cooking apparatus; at least one cooking apparatus situated within the aperture of the counter during use and being removable from the aperture of the counter during storage or portability; and at least one horizontal shelf being situated on the back side of the vertical panel.

In yet a further embodiment, the portable bar comprises a main panel having a front side and a back side, said main panel comprising at least one vertical front panel having opposing sides and at least one side panel attached to each of the opposing sides of the front panel, each of the side panels comprising at least one elongated foot member, a portion of the foot member is situated on the front side of the main panel and another portion of the foot member being situated on the back side of the main panel; at least two supporting panels, one of the supporting panels is connected to the opposing sides of the vertical front panel, each of the supporting panels comprises a front supporting panel connected to a side supporting panel, the side supporting panel comprising at least one elongated foot member, the supporting panels having a front side and a back side, a portion of said foot member is situated on the front side of the supporting panel and another portion of the foot member being situated on the back side of the supporting panel; at least one counter attached to a top side of the main panel and the supporting panels, at least a portion of the counter comprises at least one aperture for receiving a cooking apparatus; at least one supporting shelf is situated on the back side of the main panel; and at least one shelf situated on the back side of the main panel, the shelf has an opening for supporting a container, the container is selected from a group consisting of an ice bucket, a chilling bucket, a cooler, an insulated compartment, a heated compartment, and a storage compartment.

In one embodiment, the present invention provides for a bar comprises a vertical panel having a front side, a back side and opposing ends; at least two vertical support panels, each support panel being connected to the opposing ends of the vertical panel; a counter being connected to and supported by the vertical panel and the vertical support panels; at least one horizontal shelf being situated on the back side of the vertical panel; an umbrella assembly comprising at least two umbrellas and two poles attached to the umbrellas, the assembly further comprising a connector for connecting the first and second umbrellas during an open position; and a cover attached to both umbrellas, the cover designed for advertising material.

In still another embodiment, the portable bar further comprises a wrap around advertising material, the wrap around advertising material being attached to the front side of the vertical panel.

In yet another embodiment, the wrap around advertising material being attached to the front side of the vertical panel and the front side of the vertical support panels. In still yet another embodiment, the portable bar further comprises advertising material and a transparent attaching means. In a further embodiment, the transparent attaching means is attached to the front side of the vertical panel thereby forming a space between the transparent attaching means and the vertical panel, the advertising material being inserted into the space.

In yet a further embodiment, the present invention relates to a portable bar comprising: a framework; a vertical panel attached to the framework forming a front side of the bar; a counter attached to the framework; at least one shelf attached to a back side of the bar; an umbrella assembly comprising at least one umbrellas and one poles attached to the umbrellas; and a cover attached to the umbrella, the cover designed for advertising material.

In yet a further embodiment, the portable bar further comprises a wrap around advertising material, the wrap around advertising material being attached to the front side of the bar. In another further embodiment, the portable bar further comprises advertising material and a transparent attaching means.

In another embodiment, the present invention provides for a collapsible, portable bar comprising: a main panel having a front side and a back side, the main panel comprising at least one vertical front panel having opposing sides and at least one side panel attached to each of the opposing sides of the front panel; at least two supporting panels, one of the supporting panels being connected to the opposing sides of the vertical front panel, each of the supporting panels comprising front supporting panel connected to a side supporting panel, the supporting panels having a front side and a back side; at least one counter attached to a top side of the main panel and the supporting panels; at least one supporting shelf being situated on the back side of the main panel; at least one shelf situated on the back side of the main panel, the shelf having an opening for supporting a container; an umbrella assembly comprising at least one umbrellas and one poles attached to the umbrellas; and a cover attached to the umbrella, the cover designed for advertising material.

In one embodiment of the present invention, a portable bar is provided and the portable bar comprises: a vertical panel having a front side, a back side and opposing ends; at least two side panels, one side panel is connected to each of the opposing ends of the vertical panel and is perpendicular to the vertical panel, each of the panels comprises at least one leg, the leg is a transversely located elongated foot member; at least two vertical support panels, each support panel is connected to the opposing ends of the vertical panel and the side panel, each of the vertical support panels comprises a front panel and a side support panel, the side support panel is connected to the front panel of the vertical support panel and comprises at least one leg; a counter is connected to and supported by the vertical panel and the vertical support panels; and at least one horizontal shelf is situated on the back side of the vertical panel.

In another embodiment, the vertical panel comprises at least two panel members, the panel members are connected to one another and are foldable onto one another for storage and shipment.

In still another embodiment, the shelf comprises at least three shelf members, a first shelf member being situated between each of the side panels, one of the second and third shelf members being situated between one of the side panels and one of the side support panels of each of the vertical support panels. In yet another embodiment, the shelf is situated near a bottom portion of the bar to thereby support the assembly of the vertical panel, the side panels and the vertical support panels.

In still yet another embodiment, the shelf comprises at least one hole, the hole is designed to support a container and the container is selected from a group consisting of an ice bucket, a chilling bucket, a cooler, an insulated compartment, a heated compartment, a storage compartment and mixtures thereof.

In a further embodiment, the leg of the side support panel being a transversely located elongated foot member. In still a further embodiment, the counter comprises at least three counter members, and the counter members are connected to one another and are foldable for storage and shipment.

In yet a further embodiment, the portable bar further comprises a foot stand connected to the legs of the side panels and the side support panels, the stand is situated on the front side of the vertical panel. In still yet a further embodiment, the foot stand and the counter comprises aligned apertures for supporting an umbrella assembly. In another further embodiment, the portable bar further comprises an umbrella assembly, the umbrella assembly comprises a pole and a canopy, and the umbrella assembly is attached to the bar.

In still another further embodiment, the portable bar further comprises at least two umbrella assembles, each of the umbrella assemblies comprises a pole and a canopy, each of the poles of the umbrella assemblies is designed to be inserted into the apertures of the foot stand and the counter during assembly. In yet another further embodiment, the portable bar further comprises a connecting flap, and the flap is attached to each of the canopies of the umbrella assemblies.

In still yet another further embodiment, the portable bar further comprises a means for attaching advertising material to the front side of the vertical panel and a front side of the vertical support panels. In another embodiment, the attaching means comprises a transparent material situated adjacent to the front side of the vertical panel and providing a space between the transparent material and the vertical panel to allow for insertions of advertising material.

In still another embodiment, the attachment of the vertical panel to each of the vertical support panel creates an angle from at least about 1 degree to about 90 degrees relative to a vertical line upon which the vertical panel is situated. In one embodiment, the angle is from about 40 degrees to about 45 degrees.

In a further embodiment, the present invention relates to a collapsible, portable bar comprising: a main panel having a front side and a back side, the main panel comprising at least one vertical front panel having opposing sides and at least one side panel attached to each of the opposing sides of the front panel, each of the side panels comprises at least one elongated foot member, a portion of the foot member being situated on the front side of the main panel and another portion of the foot member being situated on the back side of the main panel; at least two supporting panels, one of the supporting panels being connected to the opposing sides of the vertical front panel, each of the supporting panels comprises front supporting panel connected to a side supporting panel, the side supporting panel comprising at least one elongated foot member, the supporting panels having a front side and a back side, a portion of the foot member is situated on the front side of the supporting panel and another portion of the foot member being situated on the back side of the supporting panel; at least one counter attached to a top side of the main panel and the supporting panels; at least one supporting shelf is situated on the back side of the main panel; and at least one shelf situated on the back side of the main panel, the shelf having an opening for supporting a container, the container is selected from a group consisting of an ice bucket, a chilling bucket, a cooler, an insulated compartment, a heated compartment, a storage compartment and mixtures thereof.

In another embodiment, the collapsible, portable bar further comprises at least one umbrella assembly, the umbrella assembly being connected to the bar. In still another embodiment, the attachment of the main panel to each of the supporting panel creates an angle from at least about 1 degree to about 90 degrees relative to a vertical line upon which the main panel is situated.

In yet another embodiment, the present invention provides for a portable bar with umbrella assembly, the bar comprises: a vertical panel having a front side, a back side and comprises at least three members, the members comprise a main central panel and two supporting panels connected to opposing sides of the main central panel; a plurality of side panels, at least one side panel is attached perpendicular to the main central member of the vertical panel and at least one side panel is connected to the supporting panels, the side panels comprises at least one elongated foot member, a portion of the foot member is situated on the front side of the vertical panel and another portion of the foot member being situated on the back side of the vertical panel; a counter is attached to a top side of the vertical panel and having at least one aperture; at least one umbrella assembly comprising a pole and a canopy, the pole is designed to fit within the aperture of the counter during assembly; and at least one shelf is situated on the back side of the vertical panel.

In still yet another embodiment, the portable bar further comprises a means for attaching advertising material to the front side of the vertical panel and a front side of the supporting panels. For purposes of this invention, the attaching means includes, but is not limited to staples, pins, hooks, Velcro, tape, adhesives, etc.

In a further embodiment, the present invention relates to a portable bar comprising: a framework having a front and back side and comprising a central frame with opposing ends and at least two side frames being situated on the opposing ends of the central frame and being perpendicular to the central frame, each of the side frames comprising at least one elongated foot member situated at a bottom end of the side frame; at least two side supporting frames, each being connected to the opposing ends of the central frame, the supporting frame comprising a central supporting frame and a side supporting frame, the side supporting frame comprising at least one elongated foot member situated at a bottom end of the side supporting frame; at least one supporting shelf and at least one shelf having an aperture for supporting a container, said shelves being situated on the back side of the framework; at least one counter attached to a top side of the framework and the supporting frames; and at least one front panel situated on the front side of the framework.

In another embodiment, the portable bar further comprises a foot stand connected to the foot members of the side frame and the side supporting frames, and the stand is situated on the front side of the framework. In still another embodiment, the container is selected from a group consisting of an ice bucket, a chilling bucket, a cooler, an insulated compartment, a heated compartment, a storage compartment and mixtures thereof.

In yet another embodiment, the portable bar further comprises an umbrella assembly, the umbrella assembly comprises a pole and a canopy, and the umbrella assembly is attached to the bar.

In still another embodiment, the portable bar further comprises a foot stand connected to the foot members of the side frame and the side supporting frames and at least two umbrella assembles, each of the umbrella assemblies comprises a pole and a canopy, the foot stand and the counter having at least one aperture, each of the poles of the umbrella assemblies is designed to be inserted into the apertures of the foot stand and the counter during assembly.

In still yet another embodiment, the counter comprises at least two foldable members, and the members are connected to one another and are in an extended state during use and a folded state during storage and shipment. In a further embodiment, the portable bar further comprising at least one weight attached to the foot members, and the foot members are hollow and designed to receive the weight. In a further embodiment, the front panel comprises a fabric wrap designed to be attached to the framework.

In one embodiment, the present invention relates to a portable bar, which has a base adapted to rest on a supporting surface. A counter is located parallel to the base and spaced therefrom and the counter is horizontally located. The counter is to be used by a bartender and by consumers standing directly adjacent the counter. The back surface of the bar includes a shelf. A bar wall separates and connects the base to the counter with the bar wall being formed of a plurality of wall panels interlocked together into a single unit. The bar wall has a front surface and a rear surface with this rear surface being located at the back. The wall panels are collapsible to produce disassembly of the bar to occupy substantially less space facilitating storage of the bar.

A further embodiment of the present invention is where the first basic embodiment is modified by the disassembly of the bar wall being achieved by the panels being completely separatable.

A further embodiment of the present invention is where the first basic embodiment is modified by the base being hollow including a water receiving chamber which is to function to add weight to the bar to make it stable. A further embodiment of the present invention is where the first basic embodiment is modified by the bar wall having a curved configuration.

A further embodiment of the present invention is where the first basic embodiment is modified by there being included a weight tank mounted on the front surface of the bar wall located directly adjacent the base with the weight tank being able to contain water therefore adding further weight and stability to the portable bar. A further embodiment of the present invention is where the first basic embodiment is modified by there being included an ice bucket which is dropped in a hole formed within the shelving of the bar.

A further embodiment of the present invention is where the just previous embodiment is modified by the ice bucket having a rigid border frame from which extends a flexible walled collapsible container. The rigid border frame is to be supported on the shelving. A further embodiment of the present invention is where the just previous embodiment is modified by there being formed hand access cavities within the shelving located directly adjacent the hole for the ice bucket. These hand access cavities facilitate insertion of a user's hands to affect removal of the ice bucket from the shelving.

A further embodiment of the present invention is where the first basic embodiment is modified by there being included a cutting board in conjunction with the bar with this cutting board being movable between a retracted position and an extended position.

A further embodiment of the present invention is where the first basic embodiment is modified by there being included a condiment tray in conjunction with the counter of the bar with this condiment tray being movable between a retracted position and an extended position. A further embodiment of the present invention is where the first basic embodiment is modified by there being included an umbrella assembly in conjunction with the bar. In a further embodiment of the present invention, the umbrella assembly is formed of two separate umbrellas and the canopies are attached together. A further embodiment of the present invention is where the first basic embodiment is modified by the counter being defined as having a guide locator which connects with the bar wall that defines the correct position of the bar wall relative to the counter. A further embodiment of the present invention is where one embodiment is modified at the base, the base comprising a plurality of spaced apart transversely located elongated foot members.

A second basic embodiment of the present invention comprises a portable bar, which is to be constructed of a plurality of interconnected members, which produces a horizontal shelf located at a back side of a vertical wall. The horizontal includes a first hole. A first ice bucket is to be connectable with this first hole. A further embodiment of the present invention is where the second basic embodiment is modified by the first hole being defined as an enclosing hole. A further embodiment of the present invention is where the second basic embodiment is modified by the first hole being defined as having an open sidewall.

A further embodiment of the present invention is where the second basic embodiment is modified by the enclosing hole of the first hole to be utilized with an ice bucket which is dropped in vertically with an interengagement in the form of a rail mounted in a groove occurring between the first ice bucket and the shelf. A further embodiment of the present invention is where the first aperture of the second basic embodiment is modified and the first ice bucket is slid in horizontally and is supported on a pair of spaced apart rails. A further embodiment of the present invention is where the second basic embodiment is modified by the first ice bucket being removably mounted in a box, which is pivotally mounted to the shelf.

A further embodiment of the present invention is where the second basic embodiment is modified by the first ice bucket being pivotally mounted directly to the shelf with pivoting occurring about a vertical axis. A further embodiment of the present invention is where the second basic embodiment is modified by the ice bucket being defied as having a collapsible sidewall. A further embodiment of the present invention is where the second basic embodiment is modified by there being a second ice bucket connecting with the shelf. A further embodiment of the present invention is where the second basic embodiment is modified by there being included a separate chilling bucket in conjunction with the first ice bucket.

A third basic embodiment of the present invention comprises a portable bar, which is constructed of a plurality of interconnected members, and the members include a counter spaced from a supporting base. A cutting board is movably mounted on one of the members. The cutting board is moved between a retracted position and an extended position. A further embodiment of the present invention relates to a cutting board being slidably movable on the counter. A further embodiment of the present invention is where the third basic embodiment is modified to include also a condiment tray, which is movable relative to the interconnected members of the portable bar from a retracted position to an extended position. A further embodiment of the present invention relates to a condiment tray being pivotally movable relative to the portable bar.

A fourth embodiment of the present invention comprises a portable bar constructed of a plurality of disassemblable interconnected members, which produce a horizontal shelf. The shelf includes a pair of spaced apart holes each of which is to separately connect with an ice bucket. A further embodiment of the present invention is where the just previous embodiment is modified by each ice bucket having a collapsible sidewall.

A fourth embodiment of the present invention comprises a portable bar which has a base and a counter with a sidewall interconnecting the base and the counter. An umbrella assembly is to connect by a connection means with both the base and the counter. The umbrella assembly has a canopy arrangement, which is to be located over the counter and spaced therefrom thereby covering the counter. A further embodiment relates to an umbrella assembly comprising two separate umbrellas releasably interconnected together. A further embodiment of the present invention is where the just previous embodiment is modified by the connection means comprising a pair of aligned holes formed in the base and the counter with there being a separate pair of aligned holes for each umbrella.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 1 is an overall frontal isometric view of a first embodiment of portable bar of this invention;

FIG. 2 is a cross-sectional view taken along line 2—2 of FIG. 1 showing in more detail the attachment arrangement between the canopies of the pair of umbrellas that are utilized in conjunction with the first embodiment of this invention;

FIG. 16 is a view similar to FIG. 15 but of a different embodiment of ice bucket that is mounted in conjunction with the shelving of the portable bar of this invention;

FIG. 17 is a view similar to FIG. 16 but showing the ice bucket in a partially retracted position;

FIG. 18 is view similar to FIG. 17 but of a further embodiment of construction of ice bucket that is utilized in conjunction with the shelving of the portable bar of this invention showing the ice bucket in a completely closed position;

FIG. 19 is a view similar to FIG. 18 but showing the ice bucket in an expanded position, which provides access to the internal compartment of the ice bucket;

FIG. 20 is an isometric view of an ice bucket with a collapsible sidewall showing how such could be mounted in conjunction with the shelving of the portable bar of the present invention showing the ice bucket in a completely collapsed configuration;

FIG. 21 is an isometric view of the embodiment of FIG. 20 showing the sidewall of the ice bucket expanded and completely installed in conjunction with the shelving of the portable bar of the present invention;

FIG. 22 is a frontal isometric view of a second embodiment of portable bar of this invention, which is constructed differently from the first embodiment;

FIG. 24 is a cross-sectional view through the hinging seam cover that is utilized to interconnect the different sections of the counter of the second embodiment of portable bar of this invention taken along line 24—24 of FIG. 23;

FIG. 25 is a cross-sectional view similar to FIG. 24 showing a different form of hinging connection that could be utilized between the different members that make up the counter within the second embodiment of this invention;

FIG. 26 is a cross-sectional view taken along line 26—26 of FIG. 23, which shows in detail the fastener that can be utilized to mount together a vertical sidewall in conjunction with the base of the second embodiment of portable bar of this invention;

FIG. 27 is a cross-sectional view taken along line 27—27 of FIG. 26;

FIG. 28 is an isometric view showing a disassembled third embodiment of portable bar of this invention depicting the location of such within a box container;

FIG. 36 is a cross-sectional view showing the hinging type connection that is utilized between the different members that make up the shelf within the fourth embodiment of the present invention taken along line 36—36 of FIG. 35;

FIG. 37 is a cross-sectional view of an attaching clip that is used to secure the counter to a vertical wall of the fourth embodiment of portable bar of this invention taken along line 37—37 of FIG. 35;

FIG. 38 is a cross-sectional view taken through a point of interconnection between two separate members of the shelf of the fourth embodiment of portable bar of this invention taken along line 38—38 of FIG. 35;

FIG. 39 is a cross-sectional view showing a different form of connection that is utilized in conjunction with the vertical wall and a shelf of the fourth embodiment of portable bar of this invention taken along line 39—39 of FIG. 35;

FIG. 40 is an isometric view showing a disassembled fifth embodiment of portable bar of this invention also being depicted as being contained within a box storage container;

FIG. 48 is the backside view of FIG. 47 showing the assembly of the shelves and counter of the portable bar of the present invention;

FIGS. 49a, b and c are perspective views of the connecting and locking mechanisms of the panels of the portable bar of the present invention;

FIG. 51 is a perspective frontal view of the further assembly of the portable bar shown in FIG. 50 showing the framework, supporting frames, shelves and counter;

FIG. 52 is a perspective frontal view of the further assembly of the portable bar shown in FIG. 51 showing the attachment of the front panel (fabric wrap) onto the framework of the portable bar;

FIG. 53 is a perspective view of the front of the portable bar showing the installment of the foot stand;

Figure 3:
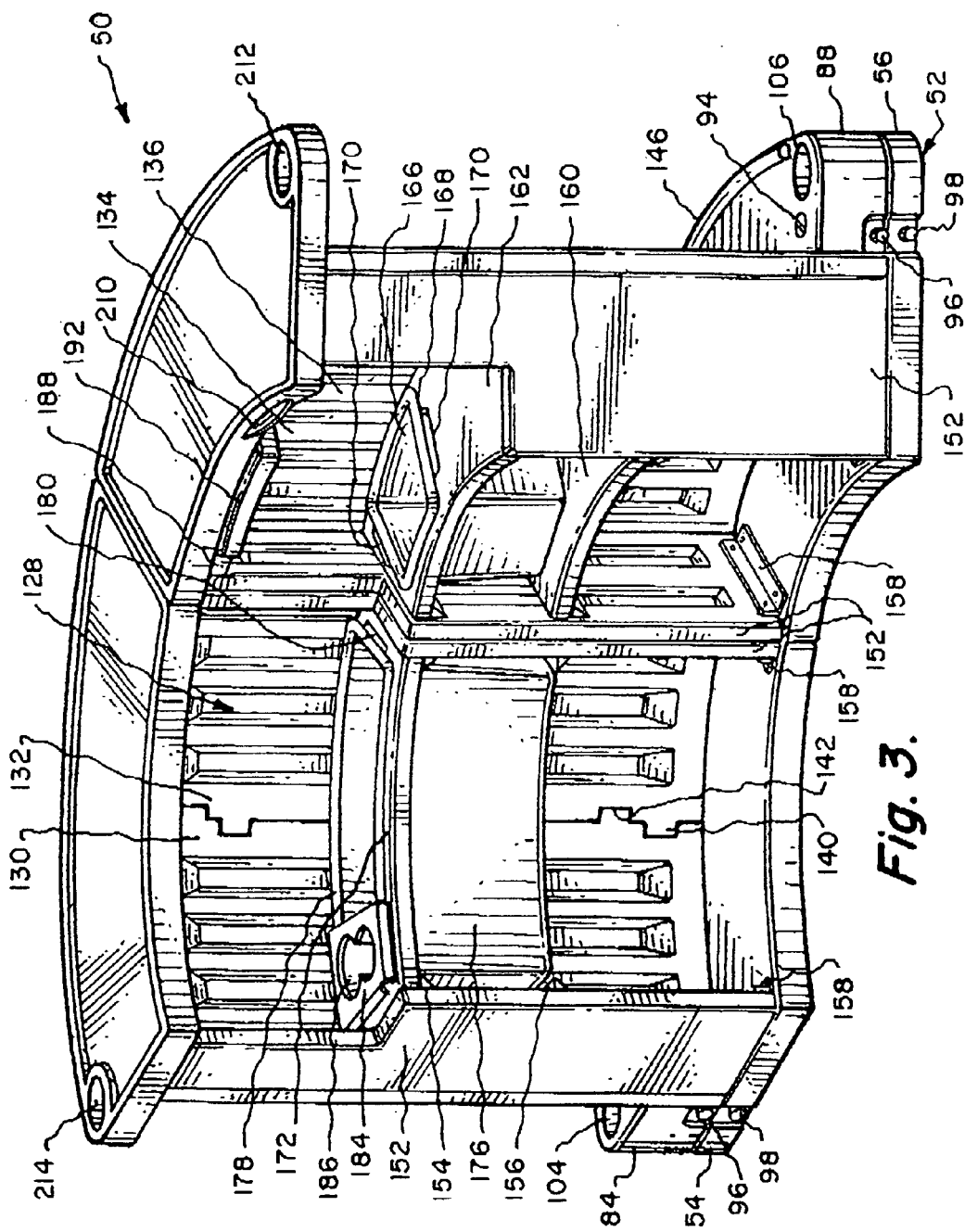
FIG. 3 is a back isometric view of the first embodiment of portable bar of this invention.
Figure 4:
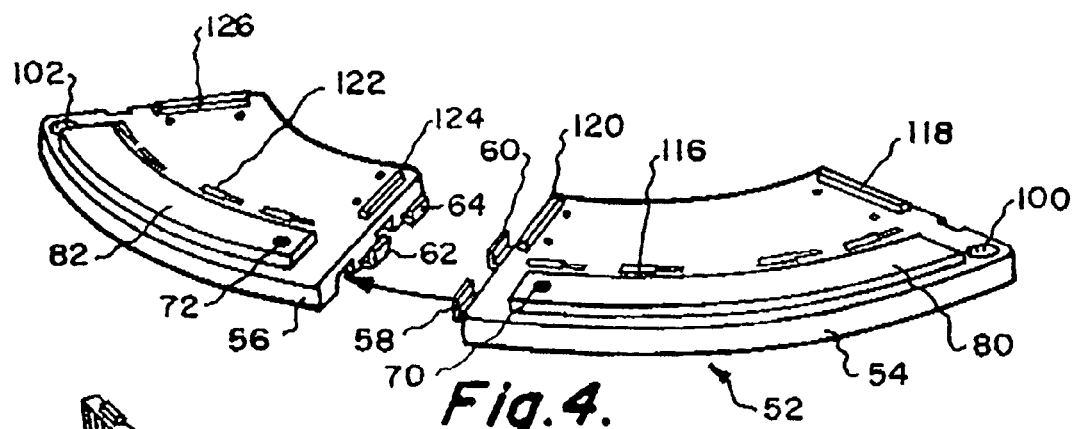
FIG. 4 is an isometric view of the base that is utilized in conjunction with the first embodiment of portable bar of this invention showing the interlocking connecting arrangement between the different parts that make up the base.
Figure 5:
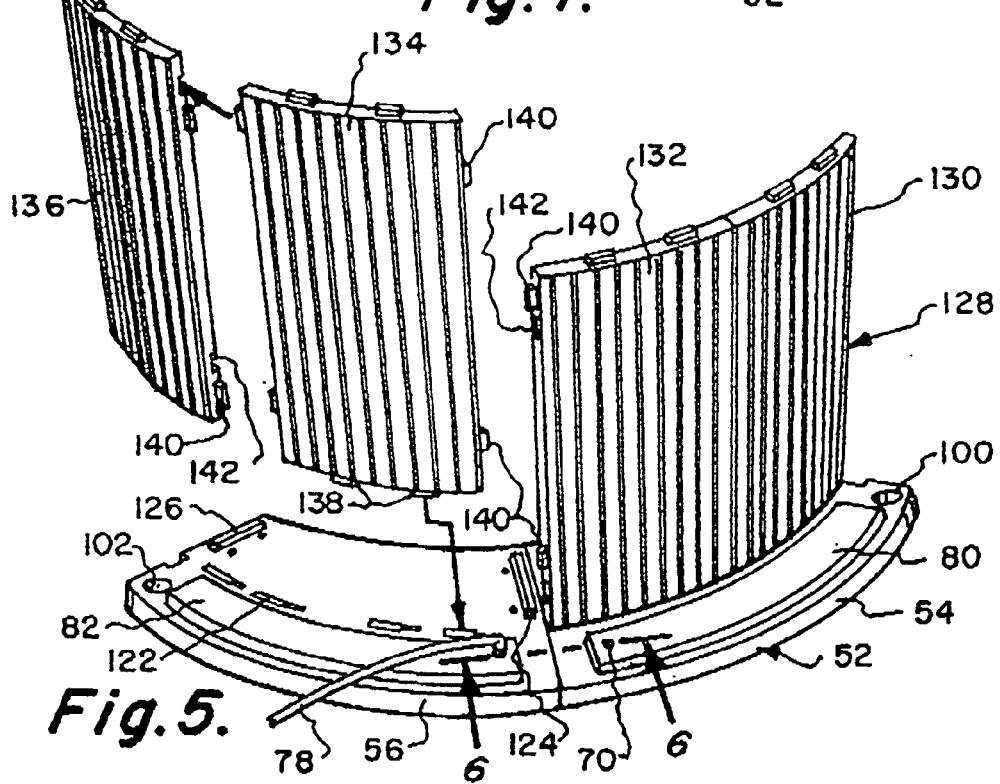
FIG. 5 is an isometric partial assembly drawing depicting mounting of the bar wall in conjunction with the assembled base.
Figure 6:
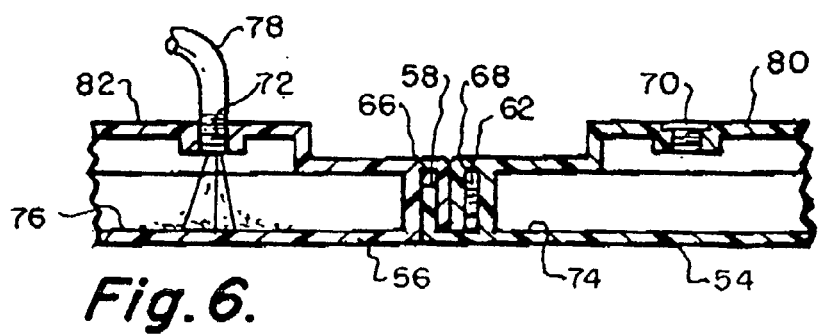
FIG. 6 is a cross-sectional view taken along line 6—6 of FIG. 5 depicting the filling of the base with water in order to provide weight for stability.
Figure 7:
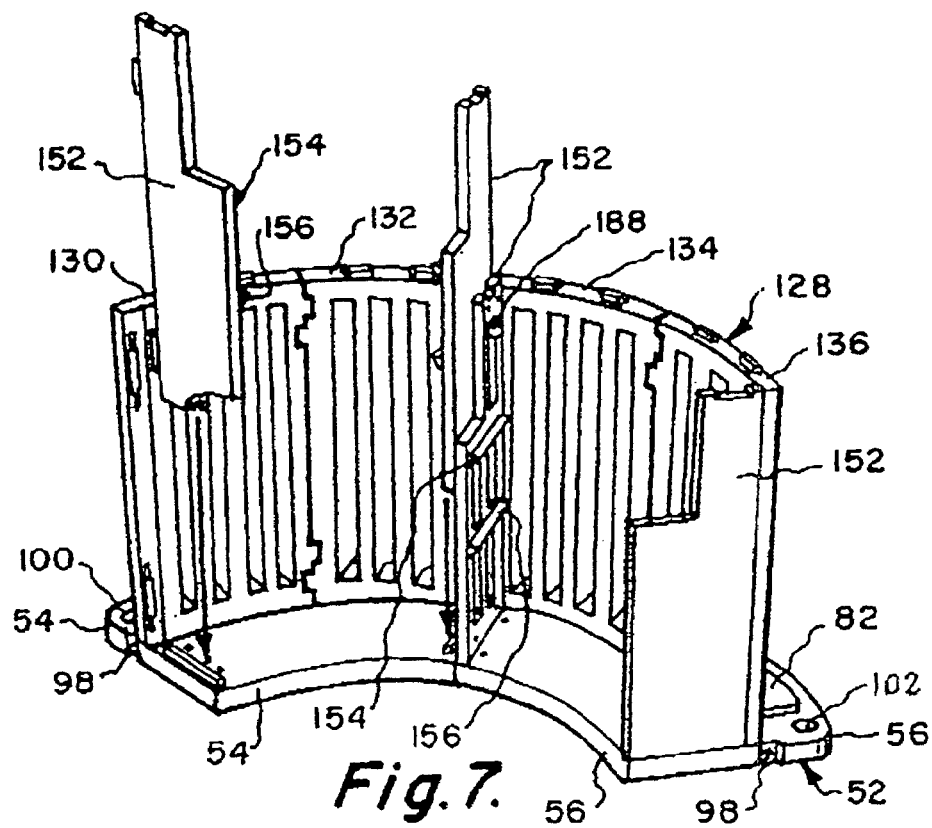
FIG. 7 is a rear isometric view of the portable bar of the present invention showing the portable bar in an upside down configuration depicting connection with vertical walls that are utilized in conjunction with the portable bar of the present invention.
Figure 8:
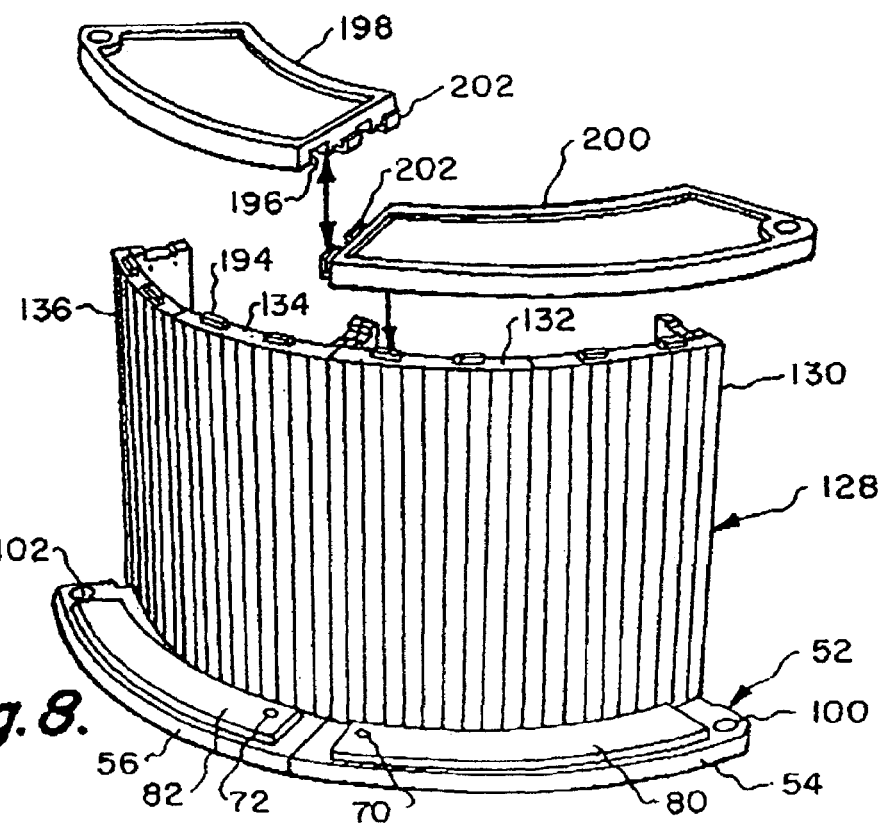
FIG. 8 is a frontal isometric view of the first embodiment of portable bar of this invention depicting the connection of the counter in conjunction with the bar wall and showing the portable bar in its upright configuration.
Figure 9:
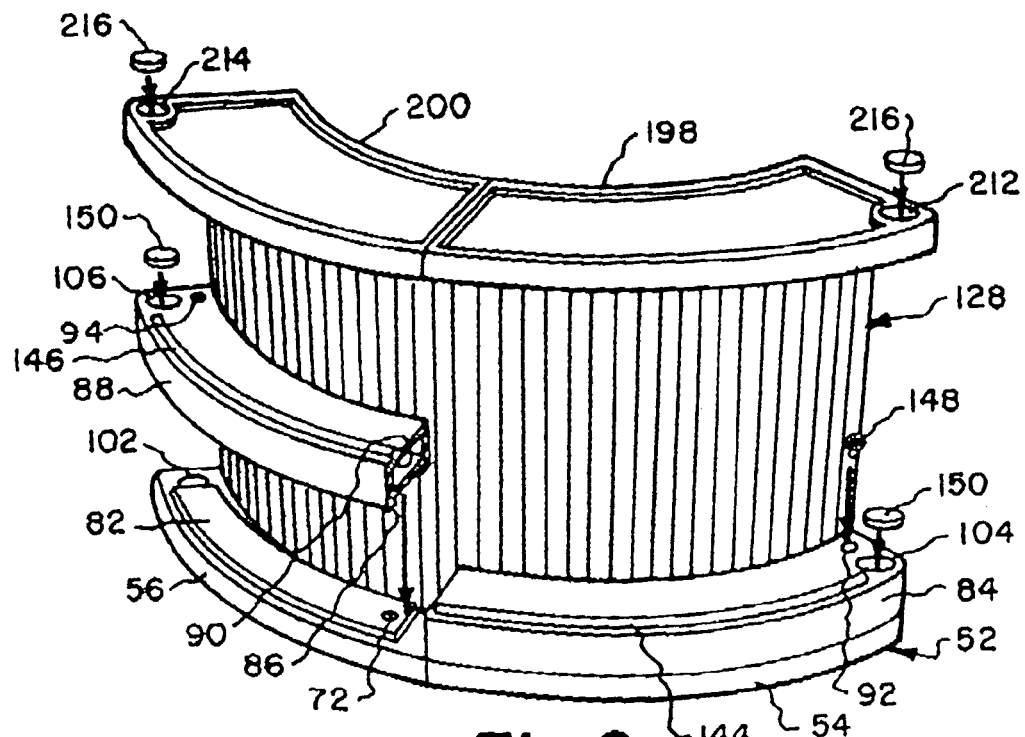
FIG. 9 is a view similar to FIG. 8 but showing the addition of a weight tank in conjunction with the base and located against the front surface of the bar wall.
Figure 10:
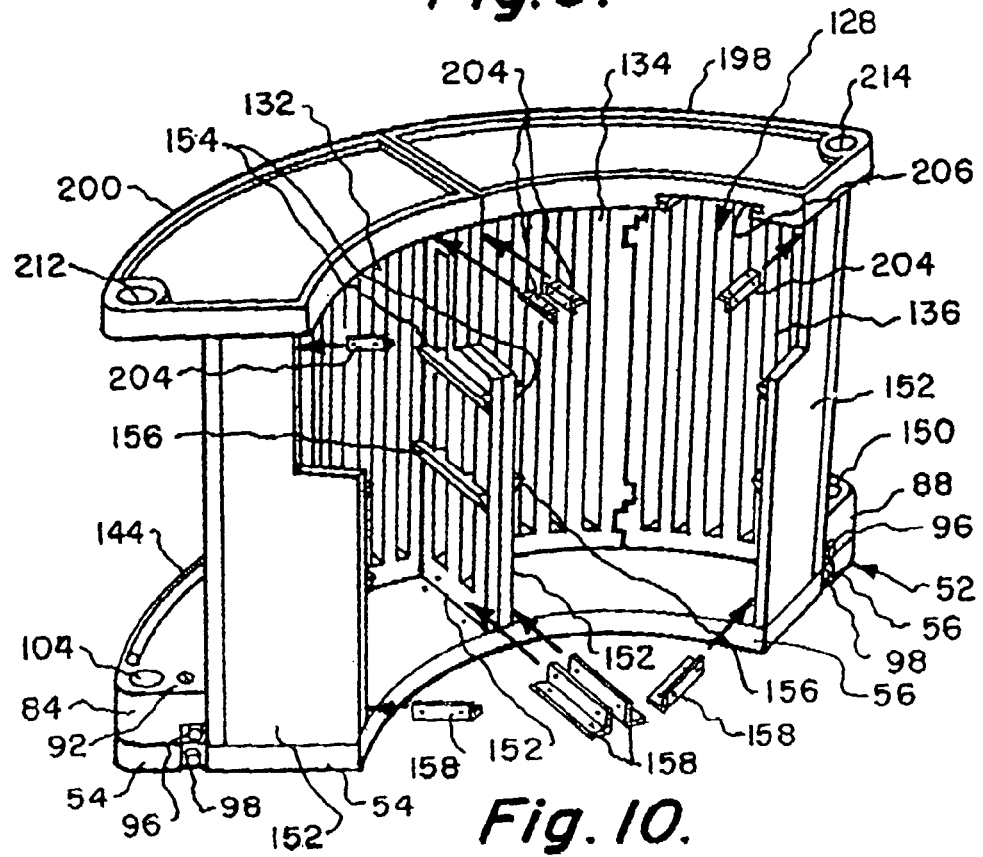
FIG. 10 is a rear isometric view of the first embodiment of portable bar of FIG. 9 showing the uses of the different brackets that are used to mount the vertical wall members of the portable bar in the desired position.
Figure 11:
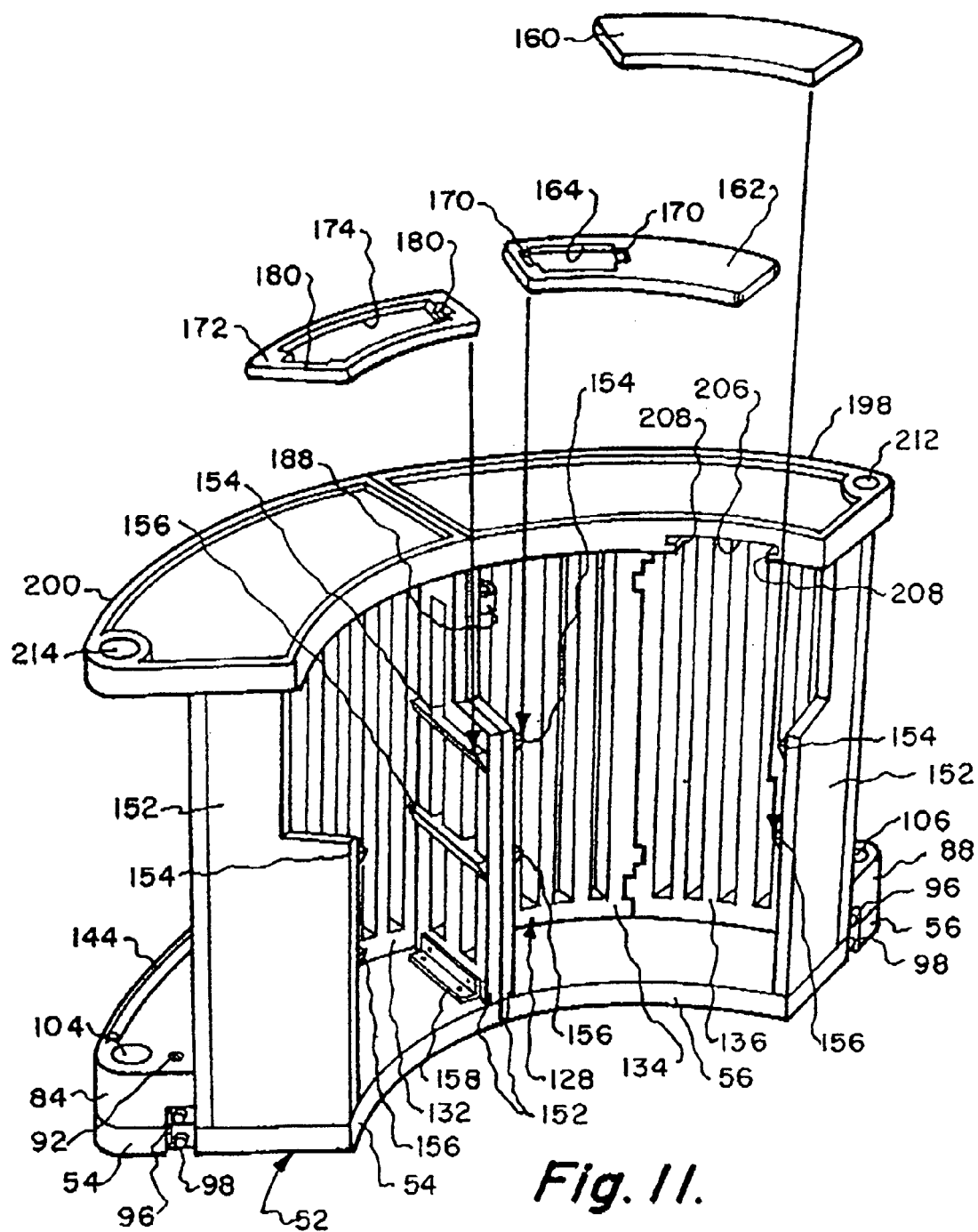
FIG. 11 is a view similar to FIG. 10 but now depicting the installation of the shelving in conjunction with the vertical wall members.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Referring particularly to FIGS. 1–12 of the drawings, there is shown the first embodiment 50 of portable bar of this invention. Generally, the first embodiment 50, as well as all embodiments within this patent application, will be constructed of a plastic material. However, it is to be within the scope if this invention that other materials of construction could be used. The first embodiment 50 has a base 52 which is formed of two members or section 54 and section 56. Each of the sections 54 and 56 are of a similar size and a similar configuration. At one end of section 54 there is mounted a pair of hooks 58 and 60. At one end of section 56 includes a pair of hooks 62 and 64. The sections 54 and 56 are to be aligned and located in an edge abutting position with hooks 58 and 60 engaging with a slot 66 formed in the undersurface of section 56, and hooks 62 and 64 engaging with the slot 68 formed within the undersurface of section 54. Spacing of the slots 66 and 68 from their respective engaging edge of their sections 54 and 56 is such that the engaging edge of the sections 54 and 56 are snugly located against each other so in essence the sections 54 and 56 form a single solid base 52.

It is desirable for the base 52 to have weight so the first embodiment 50 of portable bar of this invention will not likely tip over or be blown over by wind. In order to achieve this stability, it is included within section 54 a fill hole 70 with a similar fill hole 72 being formed within section 56. Section 54 has a hollow interior chamber 74 with section 56 having a similar hollow interior chamber 76. Fill holes 70 and 72 are to be engagable with a water hose 78 to which water is to be supplied to fill the chambers 74 and 76. This will provide a significant amount of additional weight that will keep the first embodiment 50 from tipping over.

The upper surface of section 54 also includes a curved plateau 80 with section 56 having a similar curved plateau 82. The fill hole 70 is actually formed within the plateau 80. The fill hole 72 is actually formed within the plateau 82. The plateau 80 is to interlockingly engage within a similarly sized recess, which is not shown, formed within the bottom wall of a weight tank 84. The plateau 82 is to matingly connect with a similarly sized recess 86 formed within the bottom wall of a weight tank 88. Weight tanks 84 and 88 are also hollow with only the hollow interior chamber 90 being shown for weight tank 88. Included within the upper surface of the weight tank 84 is a fill hole 92. A similar fill hole 94 is formed within the upper surface of the weight tank 88. Water is to be supplied within the interior chambers, such as interior chamber 90, to their respective fill holes 92 and 94 in order to supply additional weight to the first embodiment 50 of portable bar of this invention. Also, the weight tanks 84 and 88 function as foot rests for customers that may be seated across the front surface of the portable bar. It is to be understood that the weight tanks 84 and 88 merely rest on their respective sections 54 and 56. It is also to be understood that the fill holes 70 and 72 as well as fill holes 92 and 94 will normally include a plug that will seal their respective fill hole when water is not being added. When it is desired to remove water from the sections 84 and 88, there is included a drain plug 96 that when removed will drain the water out of the weight tanks 84 and 88. It is to be understood that there is a separate drain plug 96 for each of the weight tanks 84 and 88. Also, for the base sections 54 and 56, there is included within each a similar drain plug 98 for the same purpose.

Formed within section 54 directly adjacent its outer edge is a hole 100. A similar hole 102 is formed directly adjacent the outer edge of the section 56. The hole 100 is to align with a similar sized hole 104 formed within the weight tank 84. In a similar manner, the hole 102 aligns with a similar sized hole 106 formed within the weight tank 88. The aligned holes 100 and 104 are to function to receive the shank 108 of an umbrella 110. The aligned holes 102 and 106 are to function to receive the shank 112 of an umbrella 114.

Mounted on the upper surface of the base section 54 are a series of slots 116 and a pair spaced apart rails 118 and 120. In a similar manner, mounted within the upper surface of section 56 are a series of slots 122 and a pair of spaced apart rails 124 and 126. A bar wall 128 is constructed of four in number of interconnected panels 130, 132, 134 and 136. The panels 130–136 are basically identical in configuration. The lower edge of each of the panels 130–136 includes a pair of hooks 138. The hooks 138 of the panels 130 and 132 are to lockingly engage with the slots 116. The holes 138 of the panels 134 and 136 are to lockingly engage with the slots 122. The side edges between the panels 134 and 126 lock together by protrusions 140 each of which that fits within a recess 142. Similar protrusions 140 and recess 142 interconnect between the sidewalls of the panels 130 and 132. A similar pair of protrusions 140 is mounted on the opposite sidewalls of each of the panels 132 and 134, which interlock together. The result is that the bar wall 128 will assume a single interlocked unit when such are interlock together and will be locked to the base 52.

As previously mentioned, the upper surface of the weight tanks 84 and 88 can be used as a footrest by customers located adjacent the front surface of the first embodiment 50 of portable bar. To facilitate the placing of one's foot on the weight tanks 84 and 88, the upper surface of the weight tank 84 includes a longitudinal curved ridge 144 with the weight tank 88 including a similar longitudinal curved ridge 146.

The fill holes 92, 94, 70 and 72 will normally be closed by plug 148 when not in use. The holes 104 and 106, when not engaged with umbrella shanks 108 and 112 respectively, will normally also be closed by a cap 150.

There are four in number of identical vertical walls 152. Each wall 152 has a smooth outer surface and a recessed inner surface. Mounted across the recessed inner surface of each vertical wall 152 is a pair of spaced apart horizontal rails 154 and 156. A vertical wall 152 is to lockingly engage with each of the rails 118, 120, 124 and 126. At the juncture of each wall 152 with base 54 and 56, there is to be mounted an L bracket 158. The L bracket 158 is to be screw fastened into place.

Resting between a pair of directly adjacent vertical walls 152 and resting on the rails 156 is a lower shelf 160. Resting between the directly adjacent walls 152 and mounted between a pair of the rails 154 is an upper shelf 162. The upper shelf 162 has an enlarged hole 164. Mounted in conjunction with enlarged hole 164 is an ice bucket 166. Ice bucket 166 is intended to support fresh ice. However, what is actually supported by the bucket 166 is deemed to be a matter of choice. The bucket 166 has an enclosing enlarged rigid frame 168 which will rest directly on the upper surface of the upper shelf 162. Recesses 170 are formed on opposite sides of the bucket 166, which function as hand access cavities in order to facilitate removal of the bucket 166 from the enlarged hole 164.

The shelves 160 and 162 can function to store items such as glasses, silverware and the like. There is an additional shelf 172 that is to be supported between another directly adjacent pair of the vertical walls 152 with the shelf 172 in alignment with the shelf 162. There may be included a shelf, which is not shown, similar to shelf 160 between a similar pair of vertical walls 152 located perpendicular to the shelf 172. The shelf 172 has an enlarged hole 174 whose function is to facilitate the insertion of ice bucket 176. Ice bucket 176 has an enclosing enlarged rigid frame 178 which will rest on the shelf 172. The shelf 172 also includes hand access cavities 180 so as to permit one's hand to be inserted on each side of the ice bucket 176 to facilitate its removal from the hole 174. The ice bucket 176 is used to facilitate cooling of bottles, such as beer and soda. Also, there may be inserted within the internal chamber 182 of the ice bucket 176 a separate wine chilling container 184. The chilling container 184 has a pair of chambers 186 each of which is to contain a wine bottle, which is not shown. The ice, which is contained within the internal chamber 182, will function to cool that wine bottle through the wall of the chilling container 184.

Mounted one of the vertical walls 152 is a female plug 188. The female plug 188 is to connect with a male plug 190, which is mounted on a condiment tray 192. The condiment tray 192 is to be movable from a retracted position, shown in FIG. 3, to an extended position, which is shown generally in FIG. 12 by the male plug 190 pivoting relative to the female plug 188. With the condiment tray 192 in the extended position, condiments can be supplied and contained within the different compartments formed within the condiment tray 192.

The upper edge of each of the panels 130, 132, 134 and 136 includes a series of protuberances 194. These protuberances 194, as well as the upper edge of each of these panels, are to connect with a longitudinal curved groove 196, which is formed within counter sections 198 and 200. The abutting edges of each of the counter sections 198 and 200 include hooks 202 with these hooks to fit within appropriate recesses and grooves within the opposite counter sections 198 and 200 in order to lock together the counter sections 198 and 200 into a single unit. With the counter sections 198 and 200 in their proper position on the panels 130–136, there is to be inserted a series of L-shaped brackets 204 which are to be used in conjunction with fasteners, which are not shown, to securely fix in position the counter sections 198 and 200 on the vertical walls 152.

Figure 12:
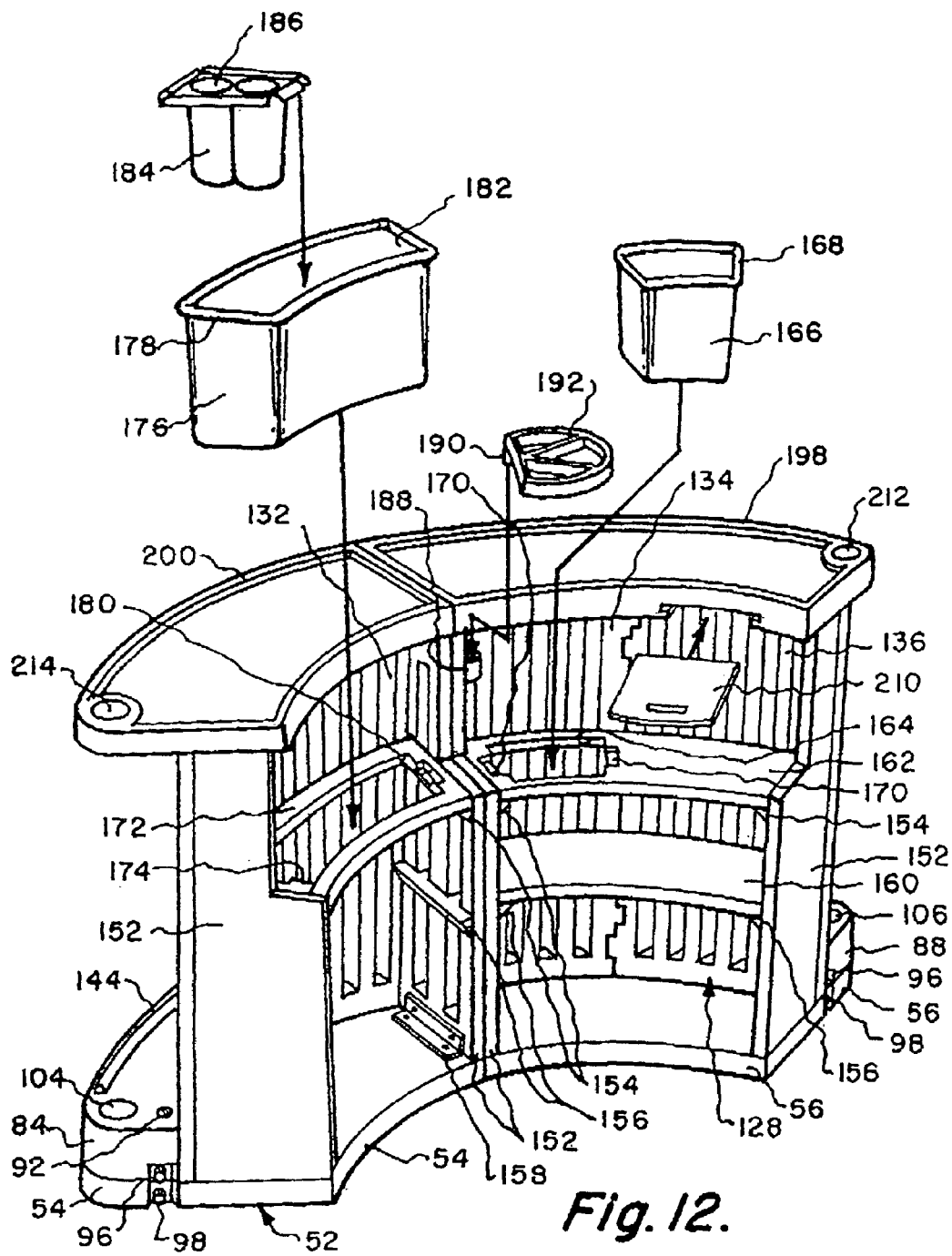
FIG. 12 is a view similar to FIG. 11 but showing the installation of the ice buckets, condiment tray, cutting board and chilling container in conjunction with the first embodiment of portable bar of this invention.

Formed within counter sections 198 is an enlarged slot 206, which has formed a guide rail 208 at each side. A cutting board 210 is to be slidingly supported on the guide rails 208 with the cutting board 210 functioning to be movable from a retracted position, which is shown in FIG. 3, to an extended position, which is generally represented in FIG. 12, and to be used by a bartender to facilitate cutting of vegetables or fruits thereon.

Directly adjacent the outer edge of each of the counter sections 198 and 200 includes through holes 212 and 214 respectively. The through hole 212 is to have passed therethrough the shank 112 of the umbrella 114. The through hole 214 is to function to have the shank 108 of the umbrella 110 to be conducted therethrough. The through holes 212 and 214 may be closed by a cap 216 when the umbrellas 110 and 114 are not inserted within the holes.

The umbrella 110 has mounted on its outer end a canopy 218. The umbrella 114 has mounted on its outer end a canopy 220. Canopy 220 has an extension 222. The extension 222 is to either have a male or female securing pad 224 mounted thereon. A similar opposite gender securing pad 226 is to be mounted on the canopy 218. When the pads 224 and 226 are secured together, the canopies 218 and 220 combine to form a single, continuous umbrella covering for the first embodiment 50 of portable bar of this invention.

Figure 13:
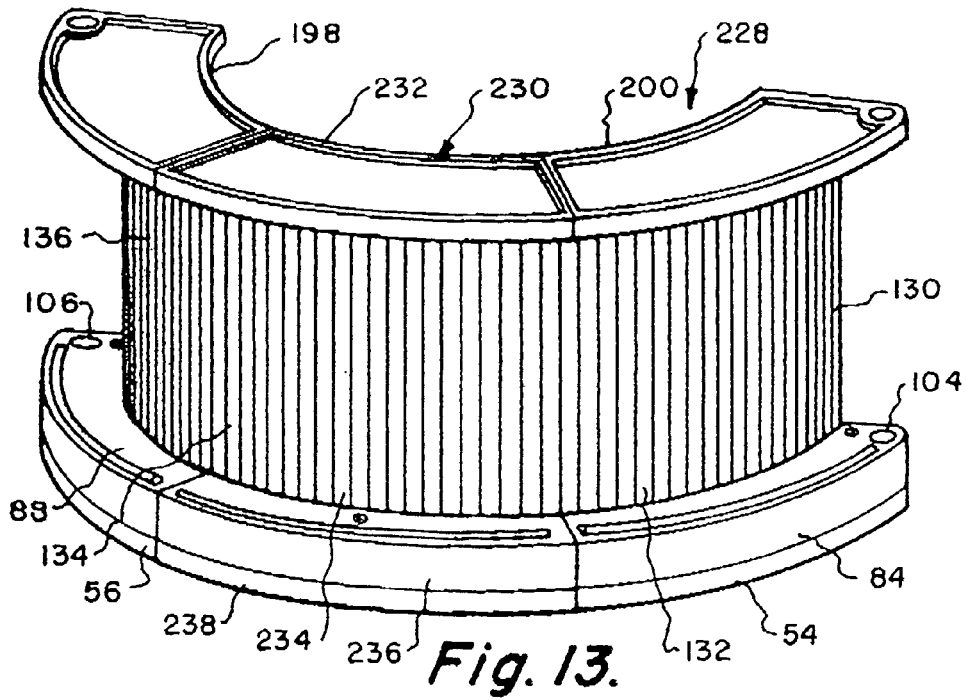
FIG. 13 is a frontal isometric view of a modified form of first embodiment of this invention, which includes an additional center section within the portable bar to expand the portable bar to a greater length.

Referring particularly to FIG. 13 of the drawings, there is shown a modified form 228 of portable bar. The modified form 228 of the portable bar is similar to the first embodiment 50 and like numerals have been employed to refer to like parts. The only difference between the first embodiment 50 and the modified embodiment 228 is that there is included an additional center section 230 between panels 132 and 134. This center section 230 is constructed in the same manner as similar sections were constructed in the first embodiment 50. The center section 230 includes a counter 232, which is mounted on a pair of wall panels that form the sidewall 234. At the base of the sidewall 234 there is mounted a weight tank 236, which is mounted on a base 238. The different sections are interlockingly connected together. It is to be understood that on the backside of the modified form 228 of portable bar there will be included additional shelving, which is not shown. It is to be noted that the first embodiment 50 is basically in the shape of an arc that occupies about forty-five degrees. Adding of the center section 230 means that the modified form 230 of portable bar occupies about ninety degrees. Using of the portable bar shown in FIG. 13 would be in environments where a longer length bar would be required.

Figures 14, 15:
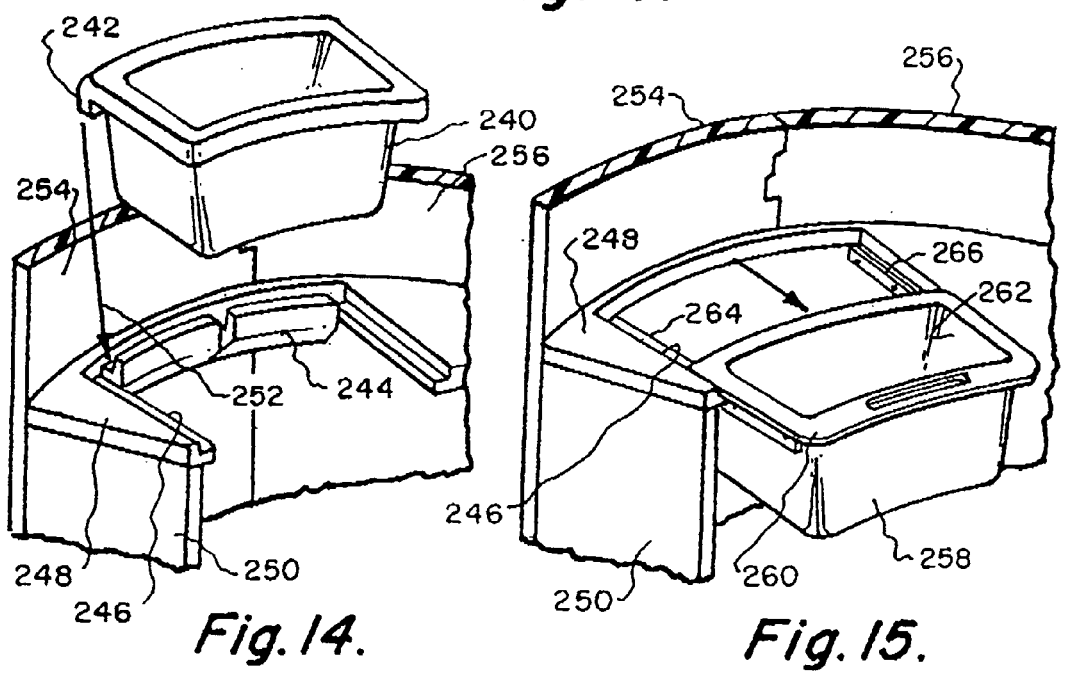
FIG. 14 is an isometric view of a modified form of the shelving that was shown in the first embodiment of this invention with a different construction of ice bucket that is utilized in conjunction with the shelving and showing the ice bucket exploded from the shelving.
FIG. 15 is an isometric view of a portion of the shelving included within the portable bar of this invention where a different form of ice bucket is utilized in conjunction with the shelving showing the ice bucket in a not completely installed position.

Reference now is to be to FIGS. 14–21 of the drawings. Within the first embodiment 50 of this invention, the ice bucket 176 is shown as being movable into and out of an enclosed hole 174. This movement occurs in a vertical direction. This same type of installing and removing action for ice bucket 240 is shown in FIG. 14. Ice bucket 240 has a longitudinal groove 242 located at its aft edge. This groove 242 is to engage with a rail 244, which is located at the aft edge of the aperture 246. The aperture 246 is mounted within a shelf 248, which is basically similar to shelf 172. The shelf 248 is mounted between vertical walls 250 with only one such vertical wall 250 being shown in FIG. 14. The ice bucket 240 is merely to be dropped in place as indicated by arrow 252 which will result in the rail 244 connecting with the groove 242 which will function to hold the ice bucket 240 in position. The aperture 246 is not completely enclosed as is hole 174 but has one open side. The shelf 248 abuts up against a pair of panels 254 and 256, which form in part the sidewall of the portable bar within which the ice bucket 240 is utilized.

Instead of utilizing the groove 242 and rail arrangement 244 of FIG. 14, a different form of ice bucket could be utilized. Ice bucket 258 has a peripheral flange 260 surrounding the access opening into the internal compartment 262 of the ice bucket 258. Like numerals have been utilized within FIG. 15 referring to similar parts that were denoted in FIG. 14. However, the rail 244 of FIG. 14 is eliminated with the side rails 264 and 266 being used with the peripheral flange 260 to be slid into and out of an installed position and an uninstalled position relative to the shelf 248. The in and out movement of the ice bucket 258 in the structure of FIG. 15 is ninety degrees displaced from the direction of arrow 252.

Referring particularly to FIGS. 16 and 17, again like numerals have been utilized to refer to like parts relative to FIG. 14. In the version of FIGS. 16 and 17, the ice bucket 268 rests within a box 270. The ice bucket 268 is removable from the box 270 for the typical procedure of refilling the internal compartment 272, emptying of water from the internal compartment 72, cleaning of the compartment 272 or merely as desired to place the ice bucket 268 at another location. The box 270 is mounted on a pair of pins 273 and 276 with pin 274 being mounted within vertical wall 250 and pin 276 being mounted within vertical wall 278. The box 270 can be pivoted to an inclined position, as shown in FIG. 17, by arrow 280 which will make it easier to remove the ice bucket 268, as indicated by arrow 282. Also, arrow 282 indicates the reinstalling of the ice bucket 268 in conjunction with box 270. It is to be understood that the ice bucket 268 is installed within an internal chamber 284 of the box 270. The peripheral flange 286 or enclosing rigid frame of ice bucket 268 will rest directly on shelf 248.

Referring particularly to FIGS. 18–19, again, like numerals have been employed to like parts relative to FIG. 14. Also, vertical wall 278 of FIGS. 16–17 is utilized in FIGS. 18–19. Ice bucket 288 is mounted a vertically oriented pin 290. This pin 290 is mounted within recesses or holes formed within shelf 248 and a lower shelf 292. Lower shelf 292 is located parallel to shelf 248. Ice bucket 288 is pivotable in the direction of arrow 294 from a compartment 296 formed between shelves 248 and 292. Ice bucket 288 is shown in the extended position in FIG. 19, which would also be the usable position, for extracting ice from the internal compartment 298 of ice bucket 288 and with it being understood that ice bucket 288 can also be pivoted in a direction opposite to arrow 294 to be confined within compartment 296, as shown in FIG. 18.

Referring particularly to FIGS. 20–21, again like numerals have been utilized to refer to like parts. The enlarged aperture 300 that is formed within shelf 248 is basically similar to the enclosed aperture 174 of fist embodiment 50. Mounted on shelf 248 directly adjacent the enlarged aperture 300 are four in number of pins 302. Each pin 302 is mounted generally directly adjacent a corner of the basically rectangularly shaped enlarged aperture 300. An ice bucket 304 has a peripheral flange 306 within which are formed four in number of holes 308 with each hole 308 being located generally directly adjacent a corner of the rectangularly shaped internal compartment 310 of ice bucket 304. When ice bucket 304 is dropped vertically in conjunction with enlarged aperture 300, each pin 302 will be located within a hole 308. In this way, ice bucket 304 will be held in position on shelf 248. The main distinction of ice bucket 304 is that sidewall 312 is capable of collapsing, as depicted in FIG. 20. The movement of sidewall 312 to the collapsed position or to the extended position, as shown in FIG. 21, is accomplished manually. The reason that sidewall 312 is collapsible is to facilitate storage when the portable bar is not being used. Sidewall 312 is to be constructed of thick wall plastic sheeting.

Referring particularly to FIGS. 22–27, there is shown a second embodiment 314 of portable bar of this invention. The bar 314 is similar to first embodiment 50 of this invention. One major difference is that instead of the outer surface of the bar being arcuate, it can be seen that there are three individual sections, a center section 316, a right section 318 and a left section 320. The outer surface of each of the sections 316, 318 and 320 are basically straight or flat. That is, sidewall 322 of center section 316 is planar. Also sidewall 324 of section 318 is planar as well as sidewall 326 of section 320. Again, it is to be reminded that second embodiment 314 will more than likely be constructed of plastic, which would be the same material as all the embodiments of this invention.

Sidewalls 322, 324 and 326 are all constructed of sheet material. Sidewall 322 is fixedly mounted at its lower surface to a base 328. Base 328 is basically planar except for a longitudinal raised member 330. Sidewall 322 is to abut against raised member 330 which will function as a location-determining device between sidewall 322 and base 328. Sidewall 324 is also fixedly mounted to a substantially planar base 332 with this base also having a longitudinal raised member 334. Sidewall 324 is to be fixedly secured and abut against raised member 334. Members 330 and 334 function as guide locators.

Similarly, sidewall 326 is to abut against a raised member 336 about substantially planar base 338. The exterior lateral edge of sidewall 334 is fixedly secured to a vertical wall 340. The outer lateral edge of sidewall 326 is fixedly secured to a vertical wall 342. Both vertical walls 340 and 342 are basically planar. The upper edge of sidewall 340 is fixedly mounted to counter section 344. Sidewall 340 is to be fixedly secured to base 332 by means of enlarged headed bolt 346. Bolt 346 has a camming pin 348 at its outer end. Camming pin 348 is to ride within a groove 349 formed in base 332 which when bolt 346 is turned, sidewall 340 is snugly tightened against base 332. This similar fastener arrangement is to be utilized between counter section 344 and sidewall 340, counter section 350 and sidewall 342 and also between sidewall 342 and base 338.

In between counter sections 344-350 is a large counter section 352. At each longitudinal end of counter section 352 there is mounted a hinge plate 354. Hinge plate 354 has a center, overlapping, transverse extension 356. Extension 356 is to be located between the edge surfaces of counter sections 344 and 352. When counter sections 344, 350 and 352 are disconnected from the sidewalls 322, 324 and 326, counter section 334 is permitted to fold over into juxtaposition with section 352 with also the same being true for counter section 350. This would be the collapsing position of the counter sections for storage. When the counter sections 344 and 350 are located in alignment with counter 352, there is a cover plate 358 that covers the seam between the sections 344 and 352 and the seam between sections 350 and 352. The portion of cover plate 358 that is mounted on section 352 is adhesively secured or otherwise permanently affixed to section 352. Cover plate 358 is not attached either to section 344 or section 350 which will permit the hinging movement to occur from the usage position to the stowage position.

Referring particularly to FIG. 25, instead of using the double over flap extension 356, section 354 can be hingedly connected to section 352 by means of a pivot joint, which utilizes a pivot pin 360. It is to be understood that a similar pivot pin arrangement could be utilized between sections 350 and 352.

Mounted across the back side of sections 322, 324 and 326 are a series of shelves 362, 364 and 366 respectively. Shelves 364 and 366 could be used to facilitate the storage of items the same as the upper surface of bases 328, 332 and 338. However, shelf 362 is to have a couple of enlarged opening, which are not shown, within which is to be mounted a pair of ice buckets 368 and 370. Ice buckets 368 and 370 could be mounted in any way desired with the way being shown in FIG. 23 being equivalent to what is depicted in FIGS. 20–21. Ice buckets 368 and 370 could have collapsible sidewalls if such are desired. Shelf 362 is to be bracingly supported in its horizontal position by means of braces 372, 374 and 376. Interconnecting bases 328 and 338 and 328 and 332 is a hinge plate, which permits the different members to pivot one another to be folded into a smaller space for storage. It is not necessary to use a cover plate 58 in conjunction with the bases since the bottom of the base is only going to rest on a supporting surface, which normally would be cement or a lawn. In order to keep sidewalls 322, 324 and 326 abuttingly against raised members 330, 334 and 336, on the backside of sidewalls 322 and 324 there is to be located elongated members 378 and 380 respectively. An appropriate fastening means will be utilized in conjunction with raised members 378 and 380 to fix such in position relative to bases 328 and 332. It is to be understood, although it cannot be observed in the drawings, that there is a similar elongated member for sidewall 326.

Each of the shelves 362, 364 and 366 are to be secured to their respective sidewall 322, 324 and 326 by flexible attaching strips 382, 384 and 386. These attaching strips 382, 384 and 386 will permit the shelves 362, 364 and 366 to be folded up against their respective sidewall 322, 324 and 326 when the second embodiment 314 of the portable bar is located in a storage position. A desirable material of construction for attaching strips 382, 384 and 386 could be a fabric or a thin plastic. Attaching strips 382, 284 and 386 could be applied by adhesive.

Counter section 344 includes a through hole 388 and counter section 350 includes a similar through hole 390. Base 332 also includes a through hole 392 as does base 338 with through hole 394. Umbrella 110 is capable of connecting between through holes 390 and 394 with umbrella 114 capable of connecting between through holes 388 and 392.

Referring particularly to FIGS. 28–33, there is shown a third embodiment 396 of portable bar of this invention. Third embodiment 396 utilizes a sidewall 398, which is composed of a plurality of interconnected planar panels, such as center panel 400, right side panel 402 and left side panel 404. Panels 400 and 402, 400 and 404 are interconnected by a hinge strip 406 which is similar to hinge plate 354 with the exception there is no extension 356. Panels 402 and 404 are readily able to be pivoted to an annular position relative to center panel 400 and can be folded up alongside of center panel 400 when in the collapsed and stored position, such as within a storage container 408, as shown in FIG. 28. The outer transverse edge of right side panel 402 is attached by a hinge strip 410 to a vertical wall 412. The outer lateral edge of left side panel 404 is connected by a hinge strip 414 to a vertical wall 416. Vertical walls 412 and 416 are basically identical. Hinge strips 410 and 414 are identical to hinge strip 406. Vertical walls 412 and 416 can be readily pivotally moved relative to their respective side panels 401 and 404.

Center section 400 includes a pair of side strips 426 and 428. Hinge strips 406 are extended so that they cover side strips 426 and 428 and are secured directly to center panel 400. Side strips 426 and 428 will be aligned with center panel 400 when the third embodiment 396 of portable bar of this invention is assembled for usage. However, when the portable bar is to be disassembled, strips 426 and 428 will assume a right angle position relative to center section 400 which will then provide adequate space for side panels 402 and 404 to be folded over onto center section 400.

There is a base 418 that is formed of a plurality of interconnected members, which are basically planar in configuration and comprise a center section 420 and side sections 422 and 424. Side section 422 is pivotally mounted relative to center section 420 by means of hinge plate 430 and cover plate 432, which is basically identical to previously discussed hinge plate 354 and cover plate 358. Side panel 424 is similarly mounted by hinge plate 430 and cover plate 432 and also to center section 420. When side sections 422 and 424 are folded over in juxtaposition with center section 420, there is an extension 434 which is basically similar to previously described extension 356 which unfolds and covers each side edge of base 418. Mounted on the upper surface of center section 420 is a pair of slightly spaced apart longitudinal rails 436 and 438. Mounted on the upper surface of side section 422 is also a similar pair of slightly spaced apart longitudinal rails 440 and 442. The same is true for side panel 424, which includes spaced apart rails 444 and 446. In the space provided between rails 446 and 438 there is to be located the lower edge of center panel 400. In the space provided between rails 440 and 442 there is to be located the lower edge of side panel 402. In the space provided between rails 444 and 446 there is to be located the lower edge of side panel 404. Rails 436, 438, 440, 442, 444 and 446 function as guide locators. This mounting arrangement is clearly shown in FIG. 31. A pair of large headed bolts, which are basically similar to large headed bolt 346, will be used to fixedly secure rail 442 to side panel 402 and rail 446 to side panel 404. Thereby sidewall 398 is now permanently affixed to base 418. Vertical walls 412 and 416 are then bent at a right angle relative to their respective side panels 402 and 404. A pair of large headed bolts 448 are then used to secure vertical walls 412 and 416 to their respective side sections 422 and 424.

A counter 450 is then unfolded with side sections 452 and 454 being located in alignment with center section 456. Side sections 452 and 454 are connected in a similar manner to center section 456 by using of hinge plate 430 and cover plate 432. The lower surface of center section 456 has a pair of slightly spaced apart rails 458 and 460. Side sections 452 and 454 each have a pair of spaced apart rails 462 and 464. The top edge of center panel 400 is to be located in a space between rails 458 and 460 and the top edge of side panel 404 is to be located in a space between rails 462 and 464 that are mounted on side section 454, and the top edge of side panel 402 is to be located in a space between side rails 462 and 464 that are mounted on side section 452. Rails 458, 460, 462 and 464 also function as a guide locator. Again, large headed bolts 448 will be used to secure side section 452 to vertical wall 412 and side section 454 to vertical wall 416.

Included within side section 452 is a through hole 456, which is to be in alignment with a through hole 468 formed on side section 422. Side section 454 includes a similar through hole 470, which is to be in alignment with a through hole 472 formed within side section 424. Each pair of through holes 468 and 470 is to connect with a shank of an umbrella, which is not shown, with the same being true for the aligned pair of through holes 470 and 472. The umbrella arrangement will be similar to what is shown in FIG. 1.

Figure 23:
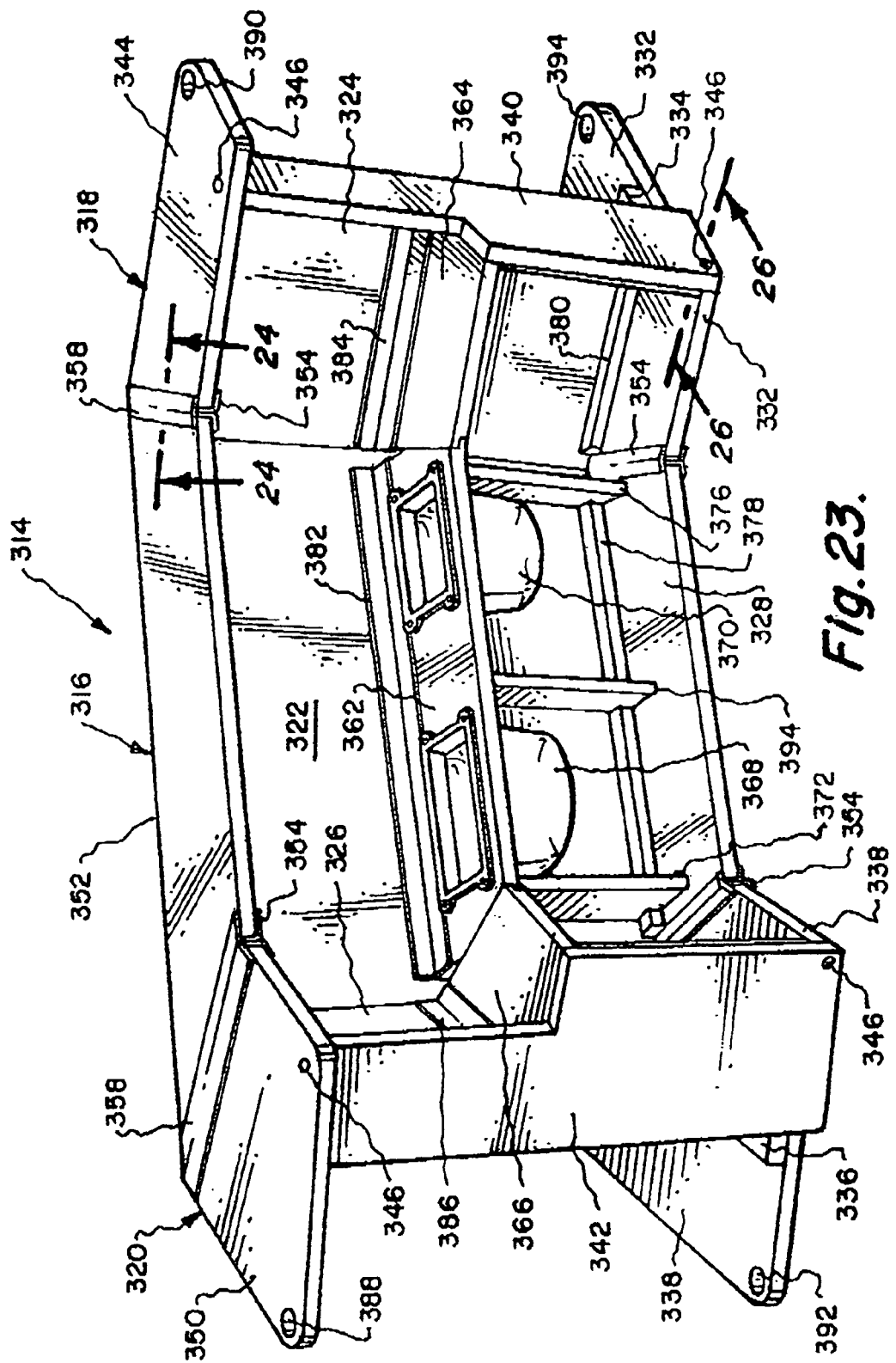
FIG. 23 is an isometric view of the rear portion of the second embodiment of portable bar of this invention.
Figure 29:
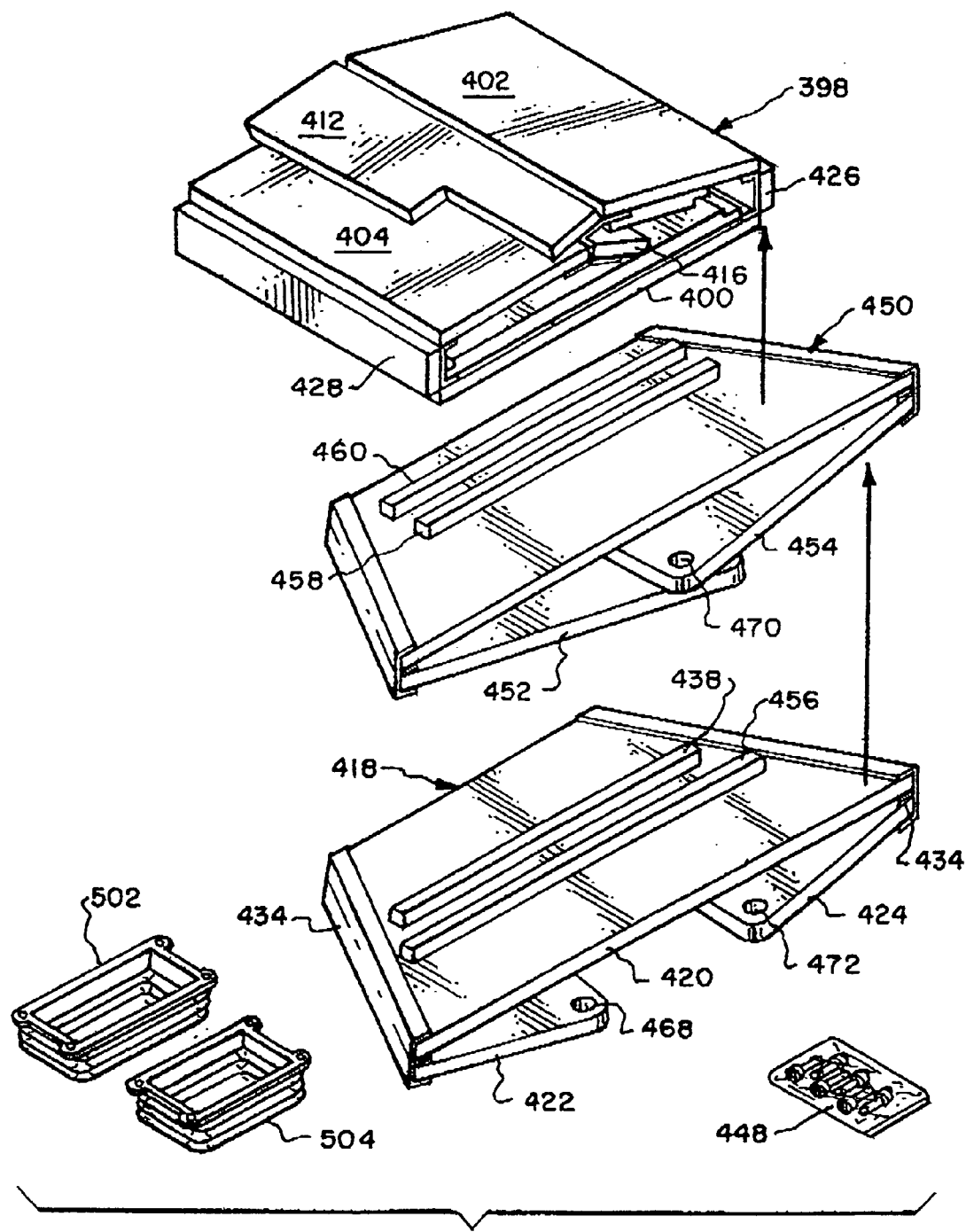
FIG. 29 is an exploded isometric view depicting removal of the bar wall from the sections of the counter of the third embodiment of this invention showing collapsible ice buckets that can be utilized in conjunction with the third embodiment of portable bar.
Figure 30:
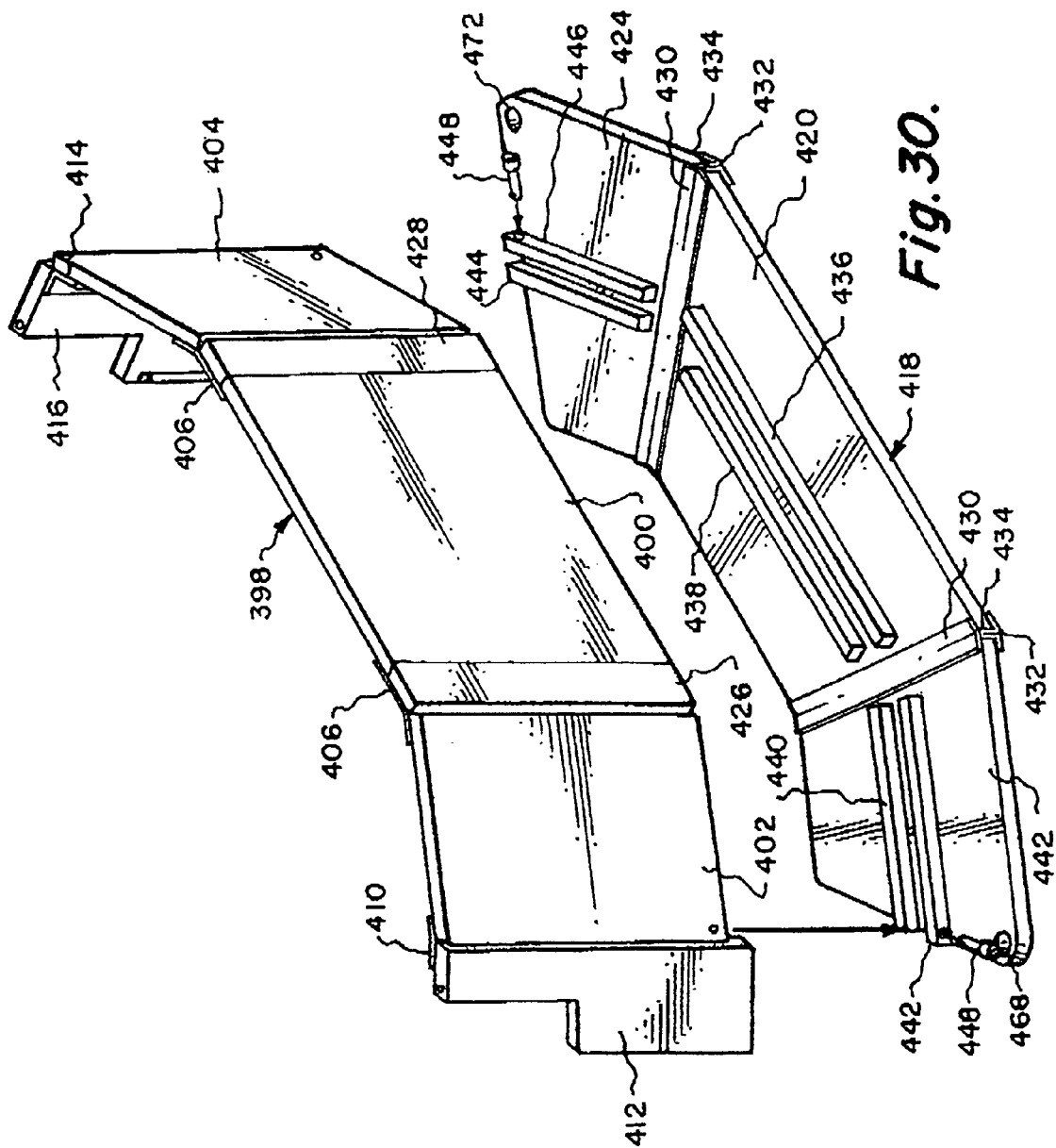
FIG. 30 is an isometric view depicting the installation of the bar wall in conjunction with the base of the third embodiment of portable bar of this invention.
Figure 31:
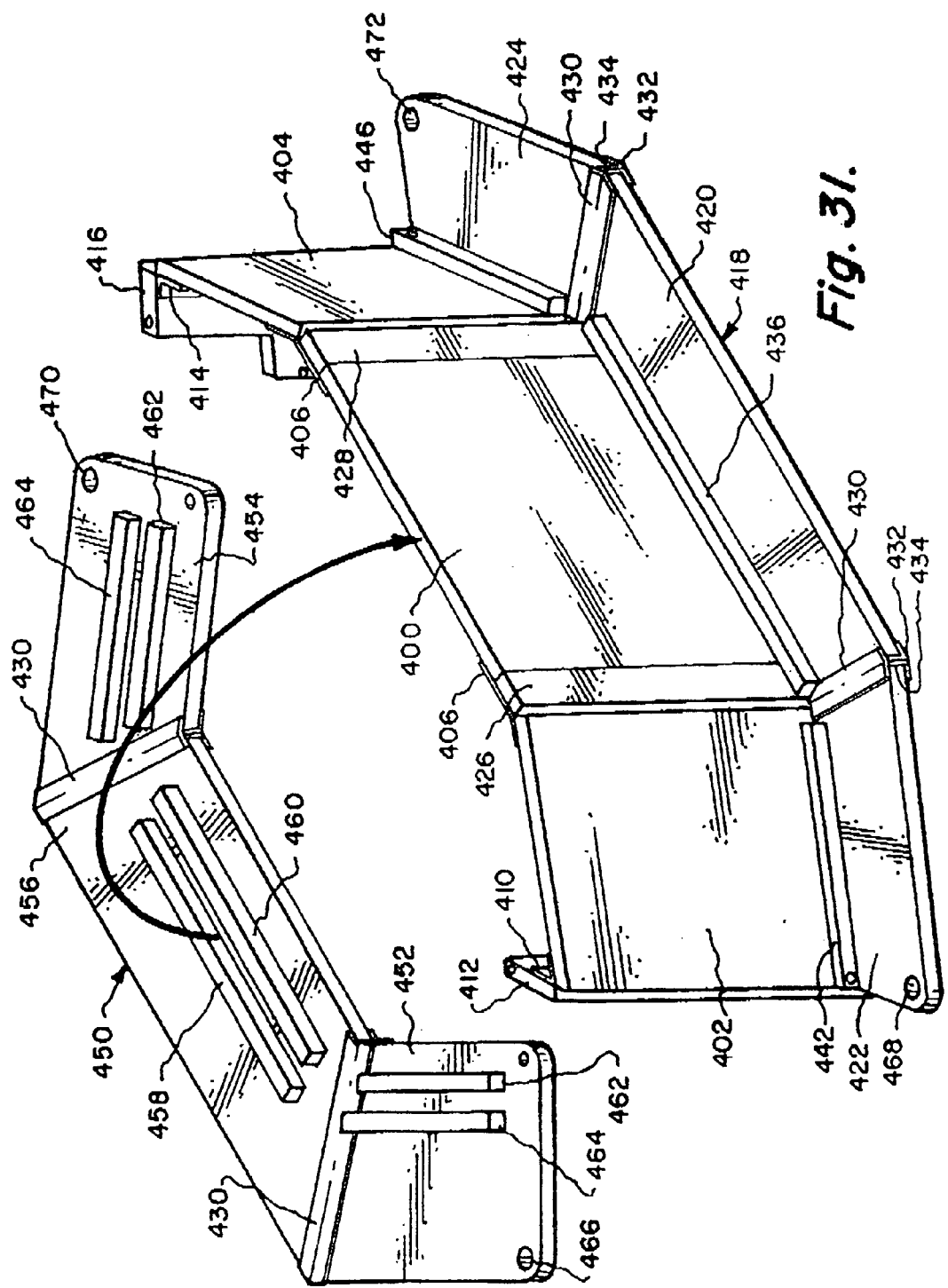
FIG. 31 is an isometric view of the third embodiment of portable bar of this invention depicting the mounting thereon of the counter in conjunction with the bar wall.
Figure 32:
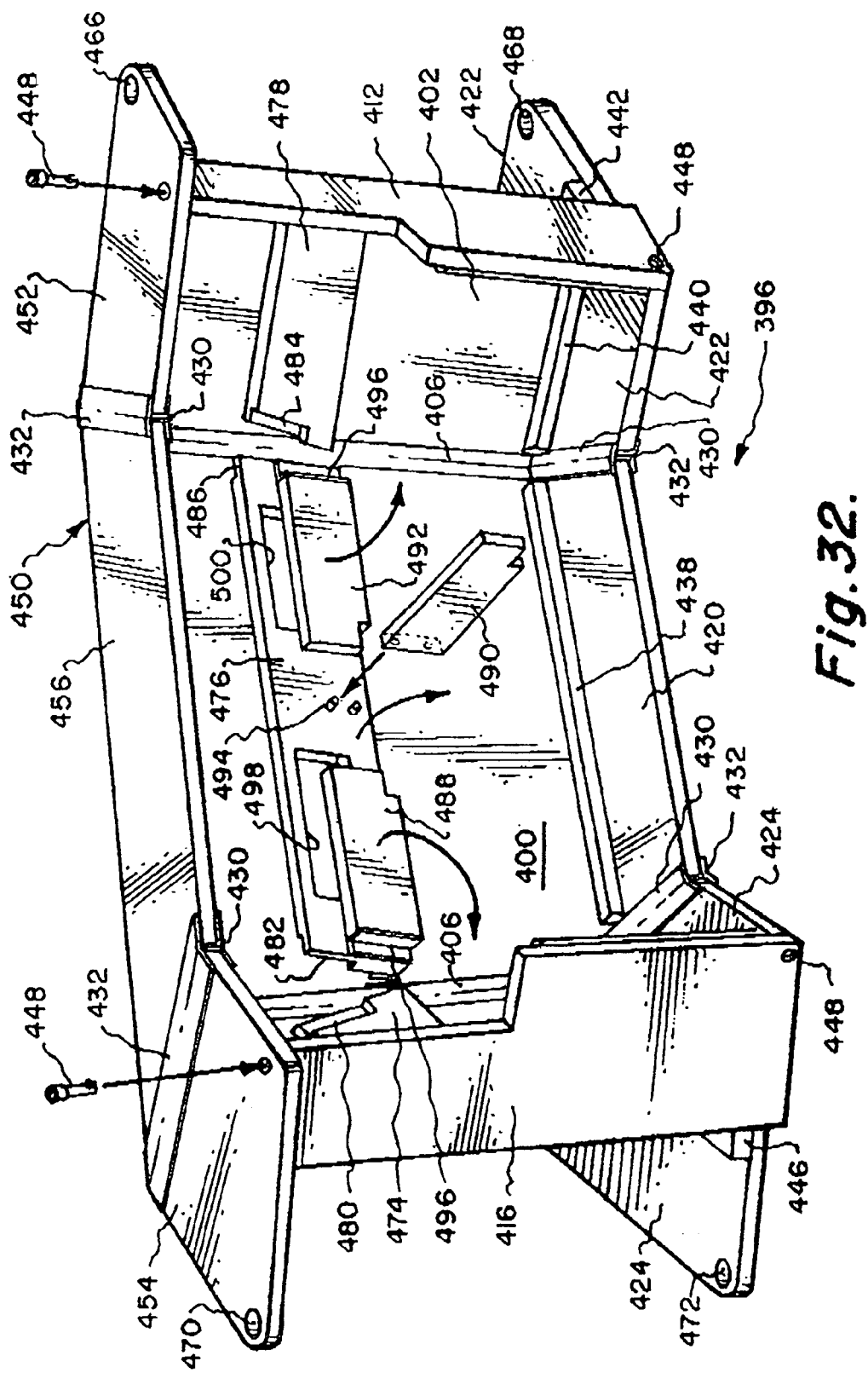
FIG. 32 is an isometric view showing the rear of the third embodiment of portable bar of this invention and depicting the forming of the shelving.
Figure 33:
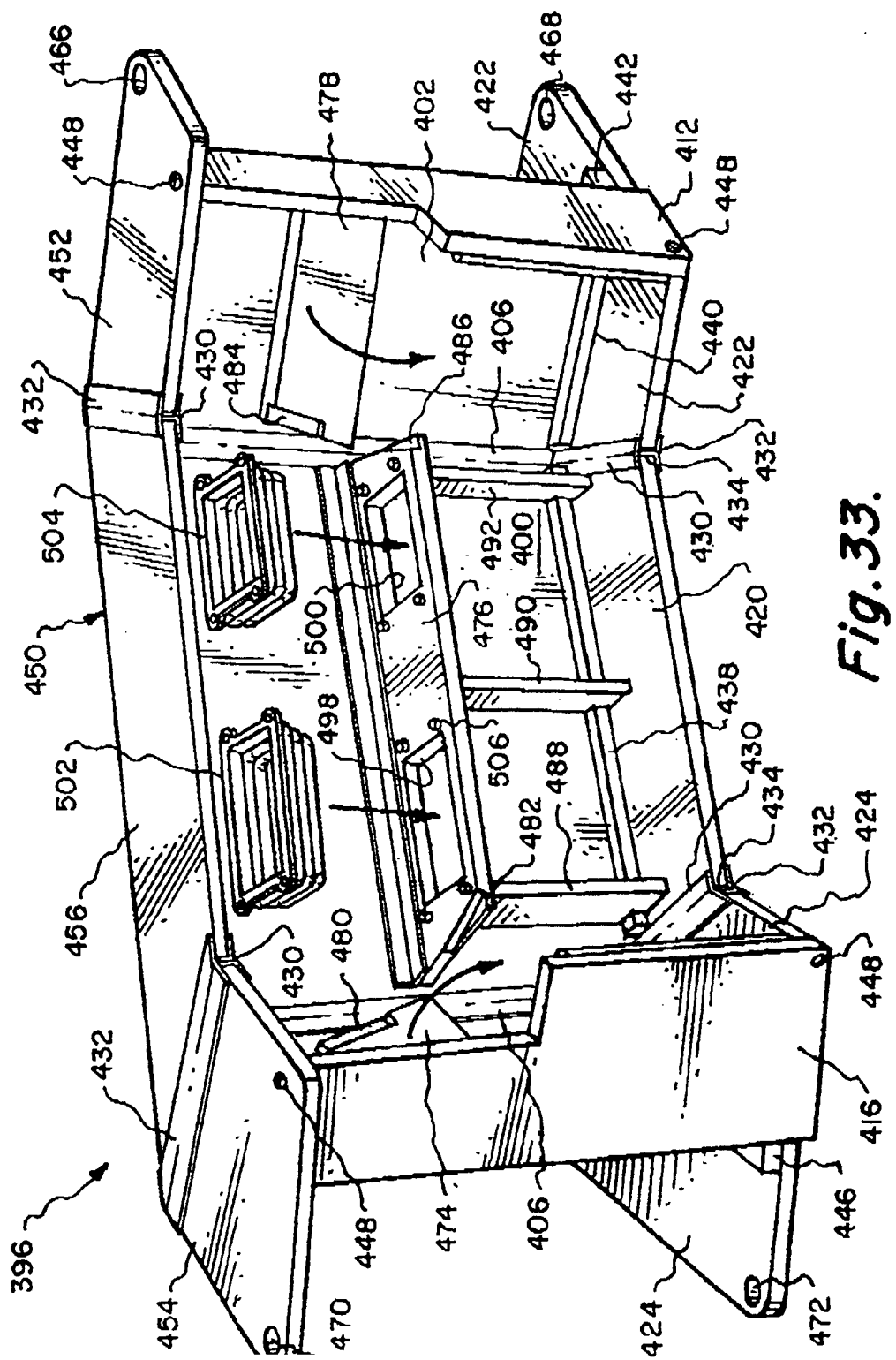
FIG. 33 is an isometric view similar to FIG. 32 depicting the mounting of ice buckets in conjunction with the shelving.
Figure 34:
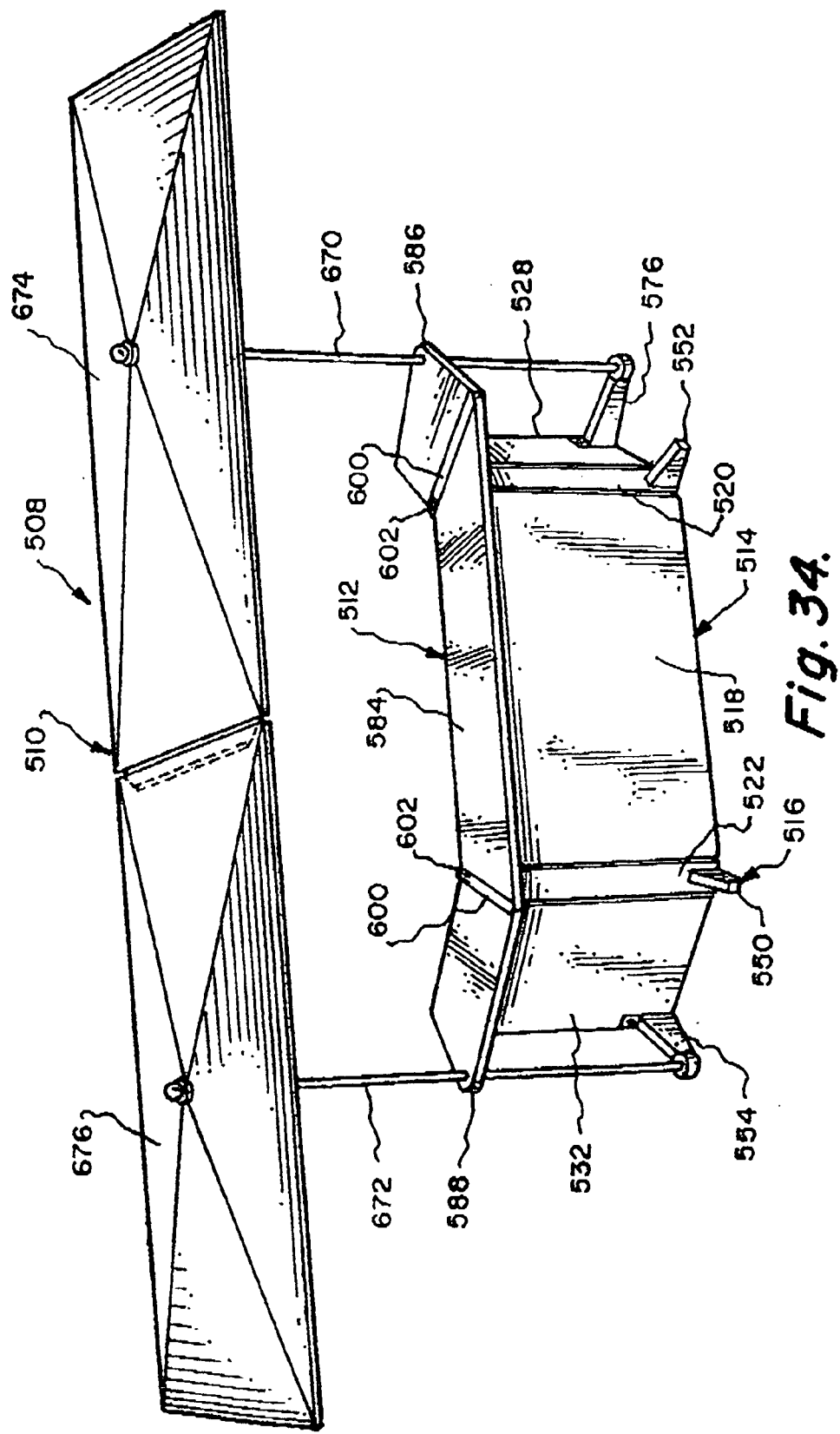
FIG. 34 is a frontal isometric view of a fourth embodiment of portable bar of this invention.
Figure 35:
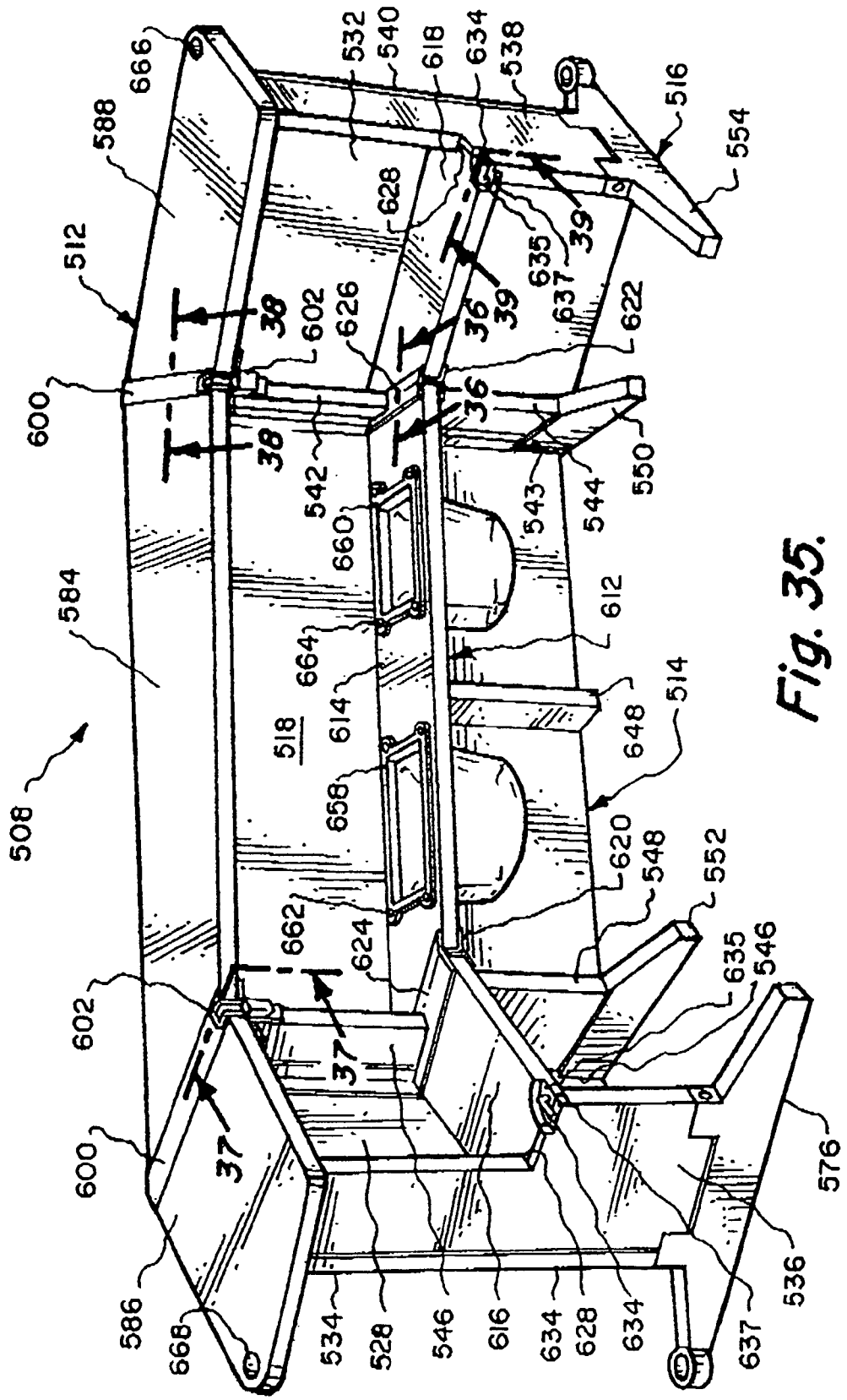
FIG. 35 is a rear isometric view of the fourth embodiment of portable bar of this invention.
Figure 41:
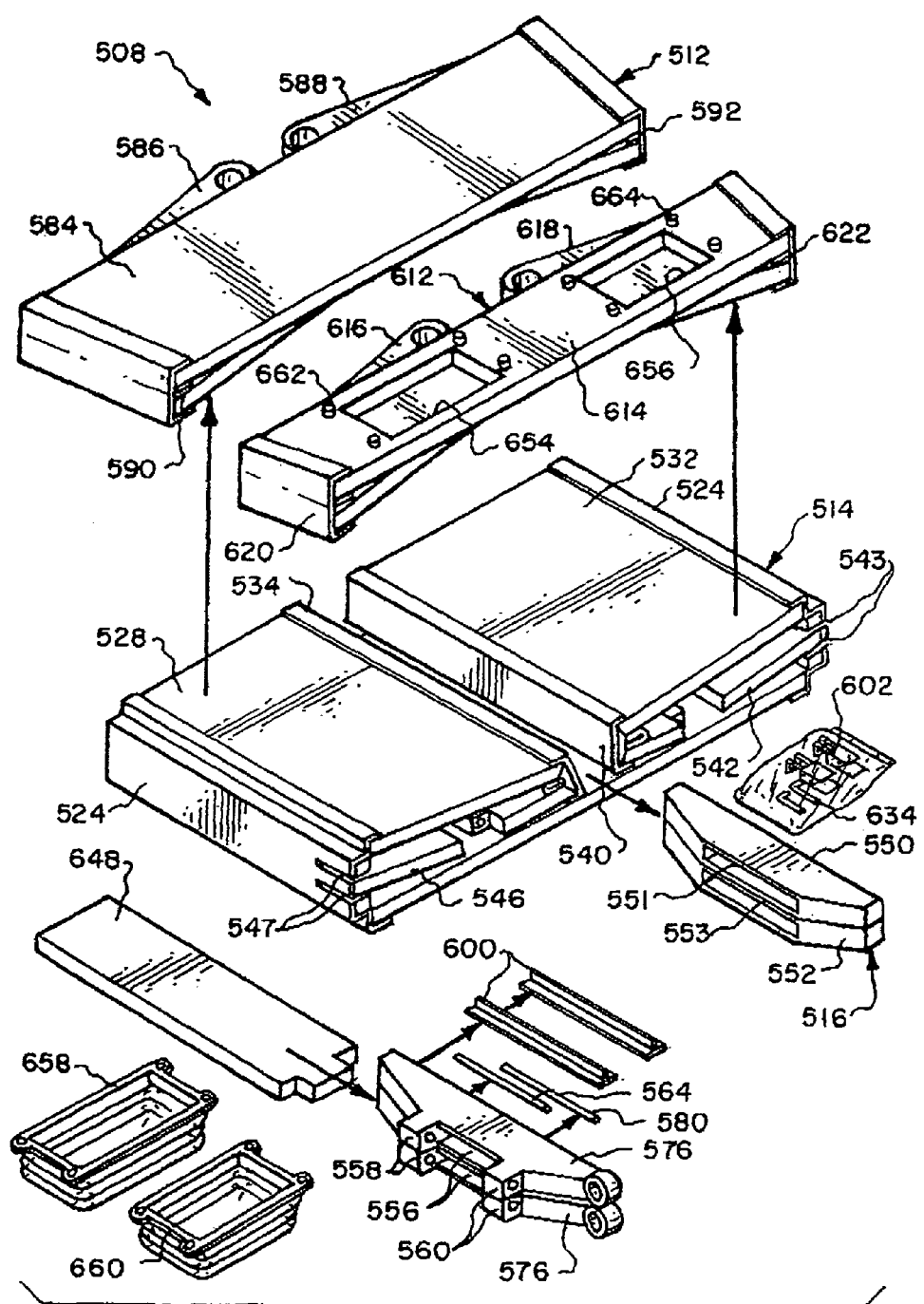
FIG. 41 is an exploded isometric view of the different parts that are utilized within the fifth embodiment of the present invention showing such removed from the container.
Figure 42:
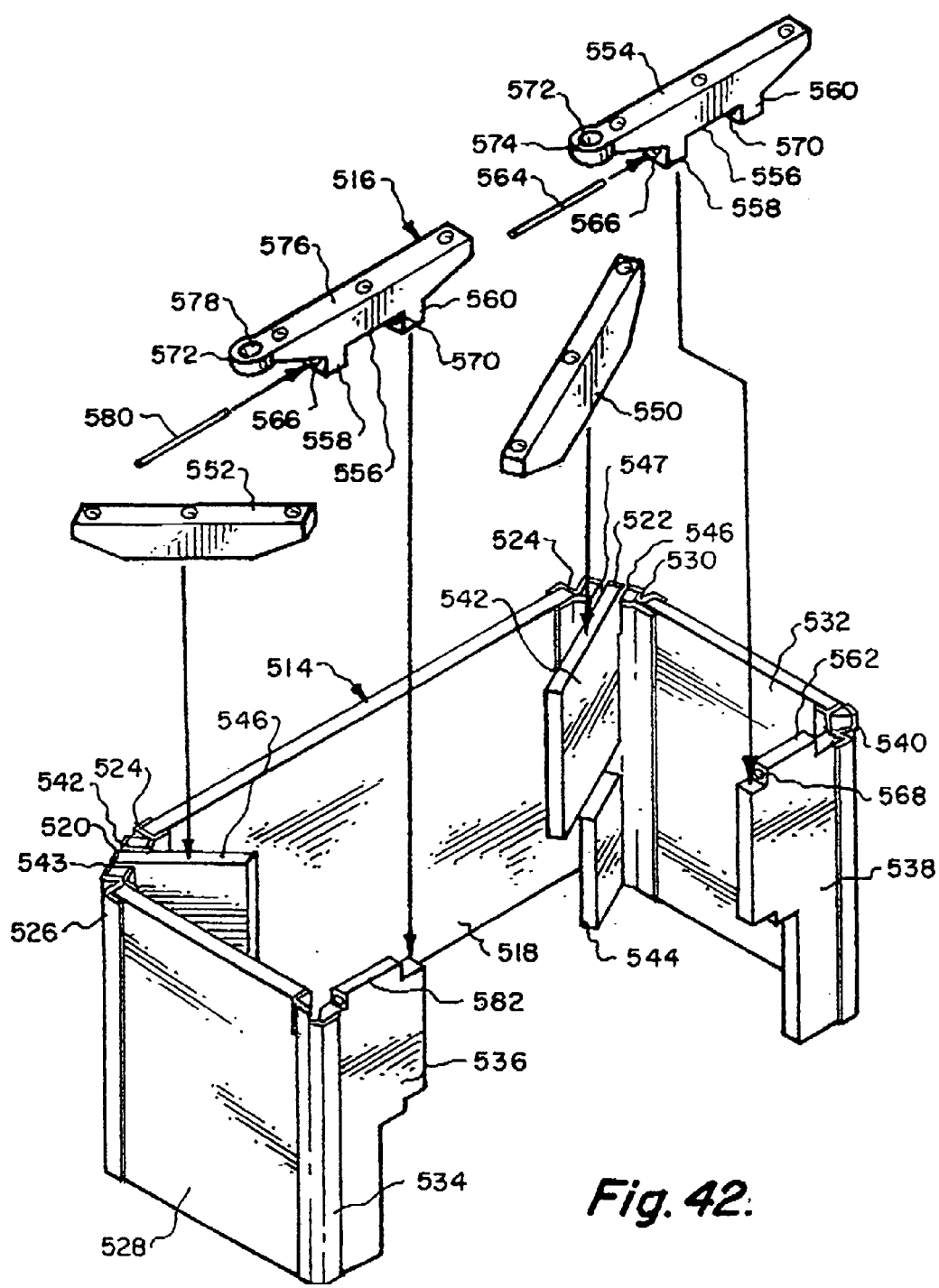
FIG. 42 is an isometric view showing expanding of the bar wall of the fifth embodiment of the present invention depicting the installation of the elongated foot members that make up the base of the fifth embodiment of portable bar of this invention.
Figure 43:
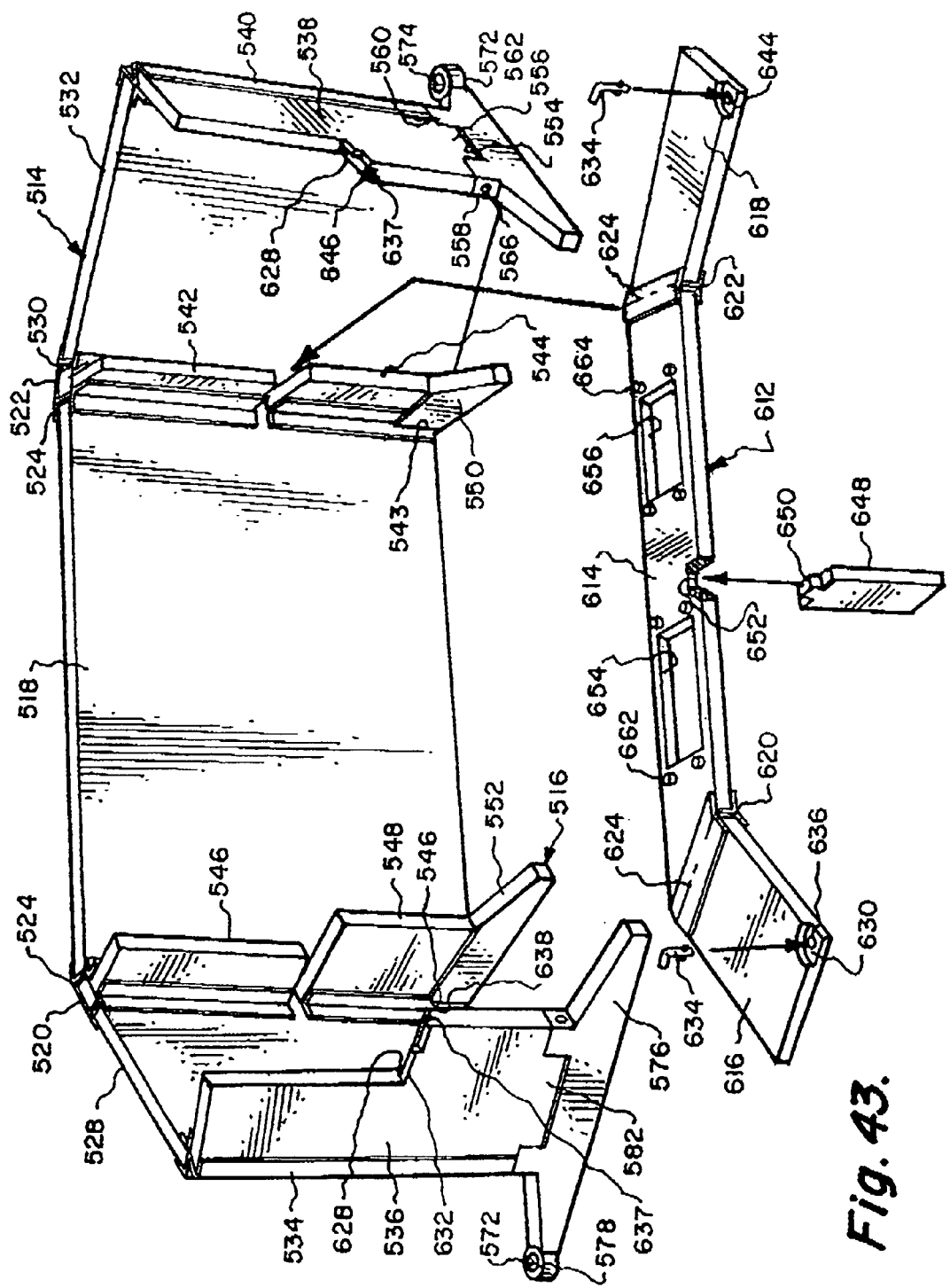
FIG. 43 is a rearward isometric view depicting installation of the shelving in conjunction with the fifth embodiment of portable bar.
Figure 44:
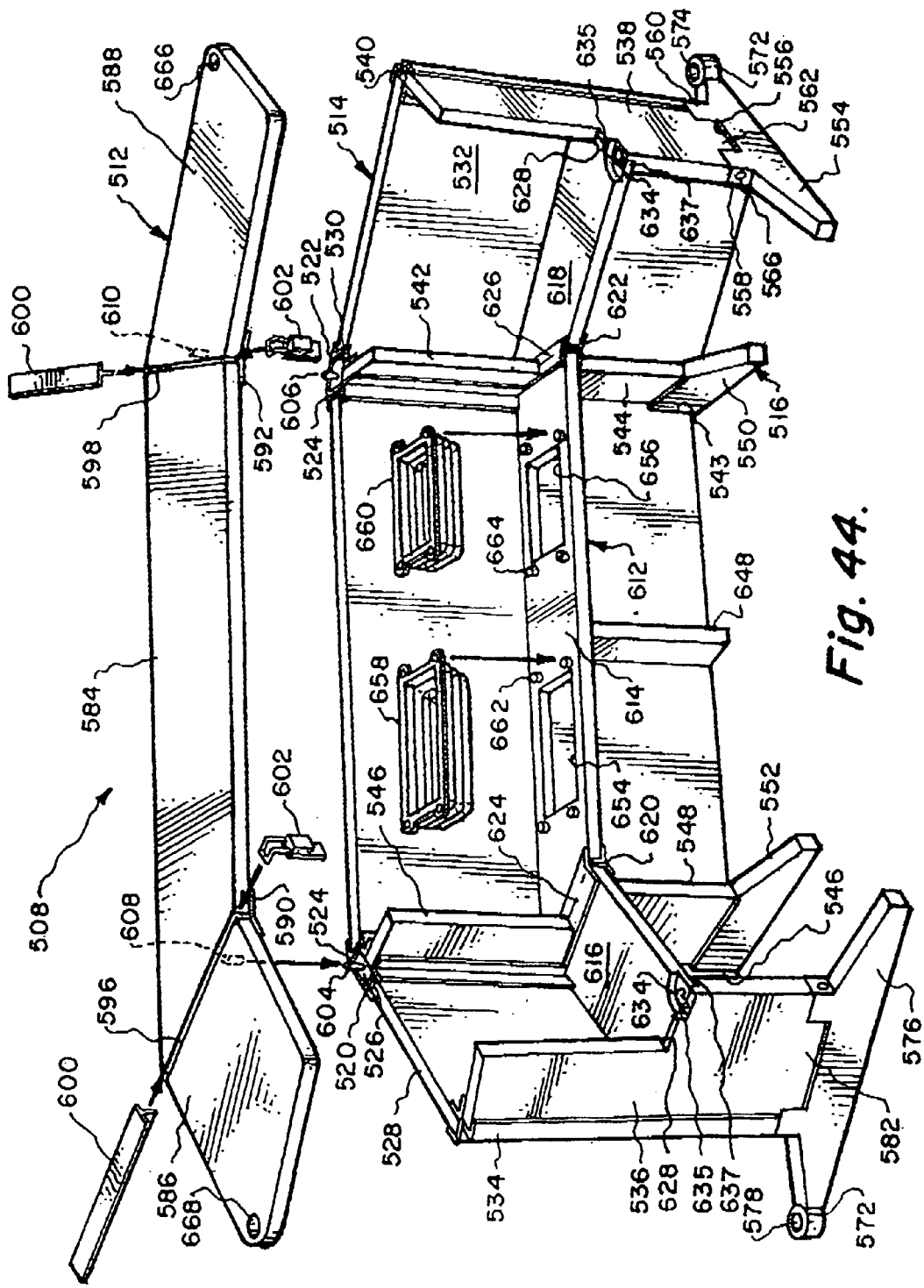
FIG. 44 is an isometric view similar to FIG. 43 depicting installation of the counter in conjunction with the portable bar and also installation of the collapsible ice buckets in conjunction with the shelving of the fifth embodiment of portable bar of this invention.
Figure 45:
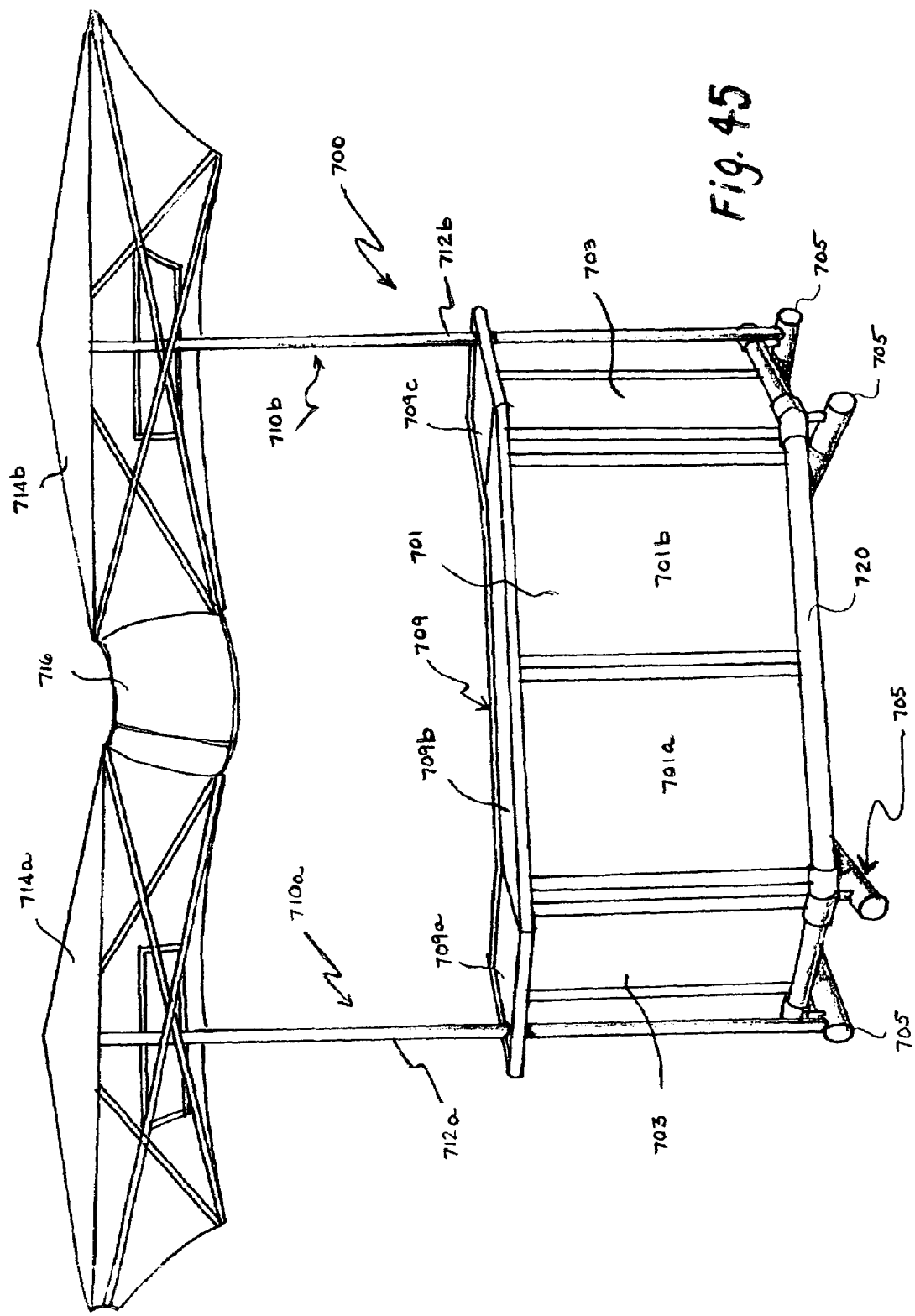
FIG. 45 is a frontal view of one of the embodiments of the present invention showing the portable bar with umbrella assembly.
Figure 46:
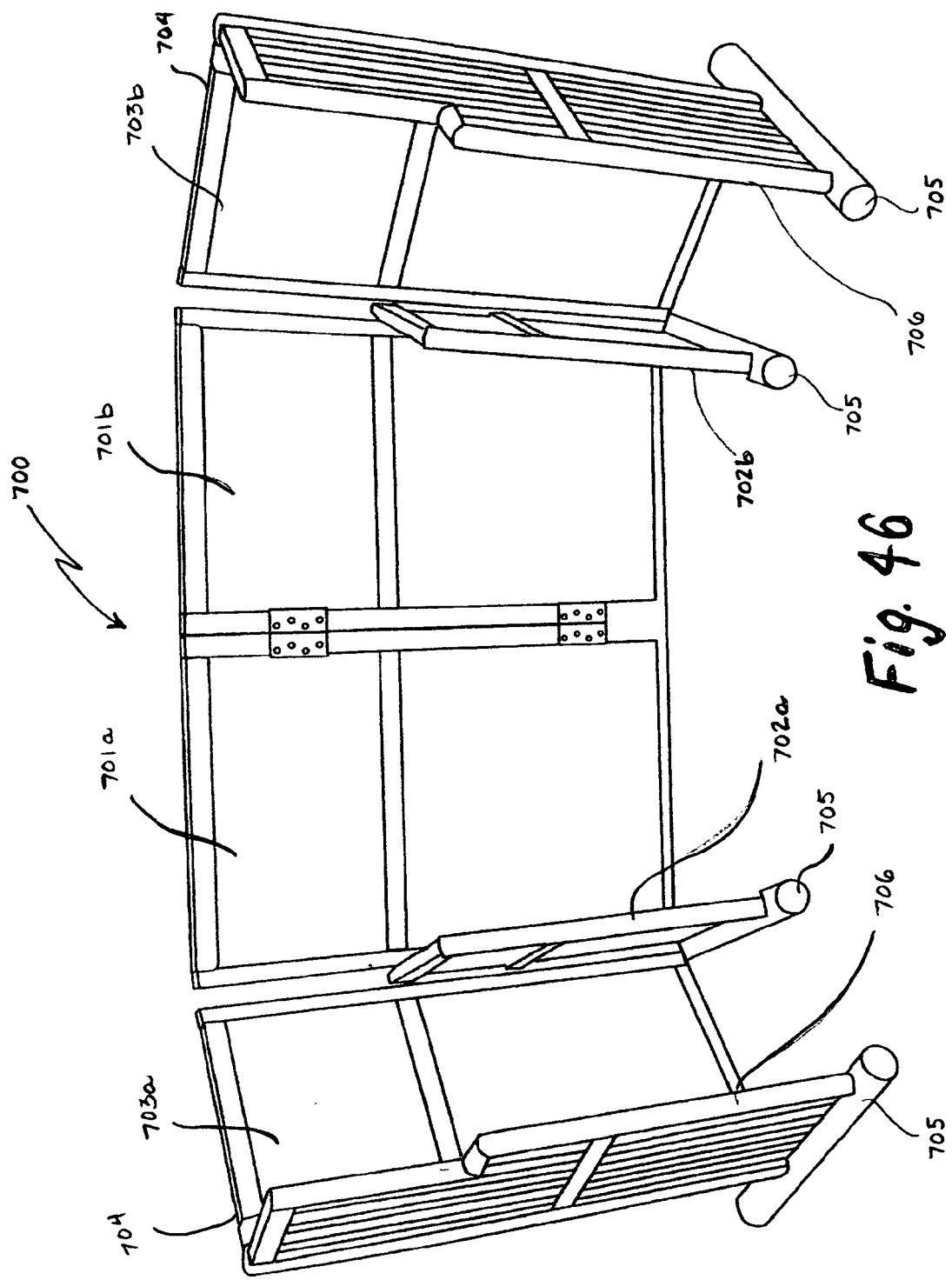
FIG. 46 is a backside view of FIG. 45 showing the shelves and container retaining shelves of the present invention.
Figure 47:
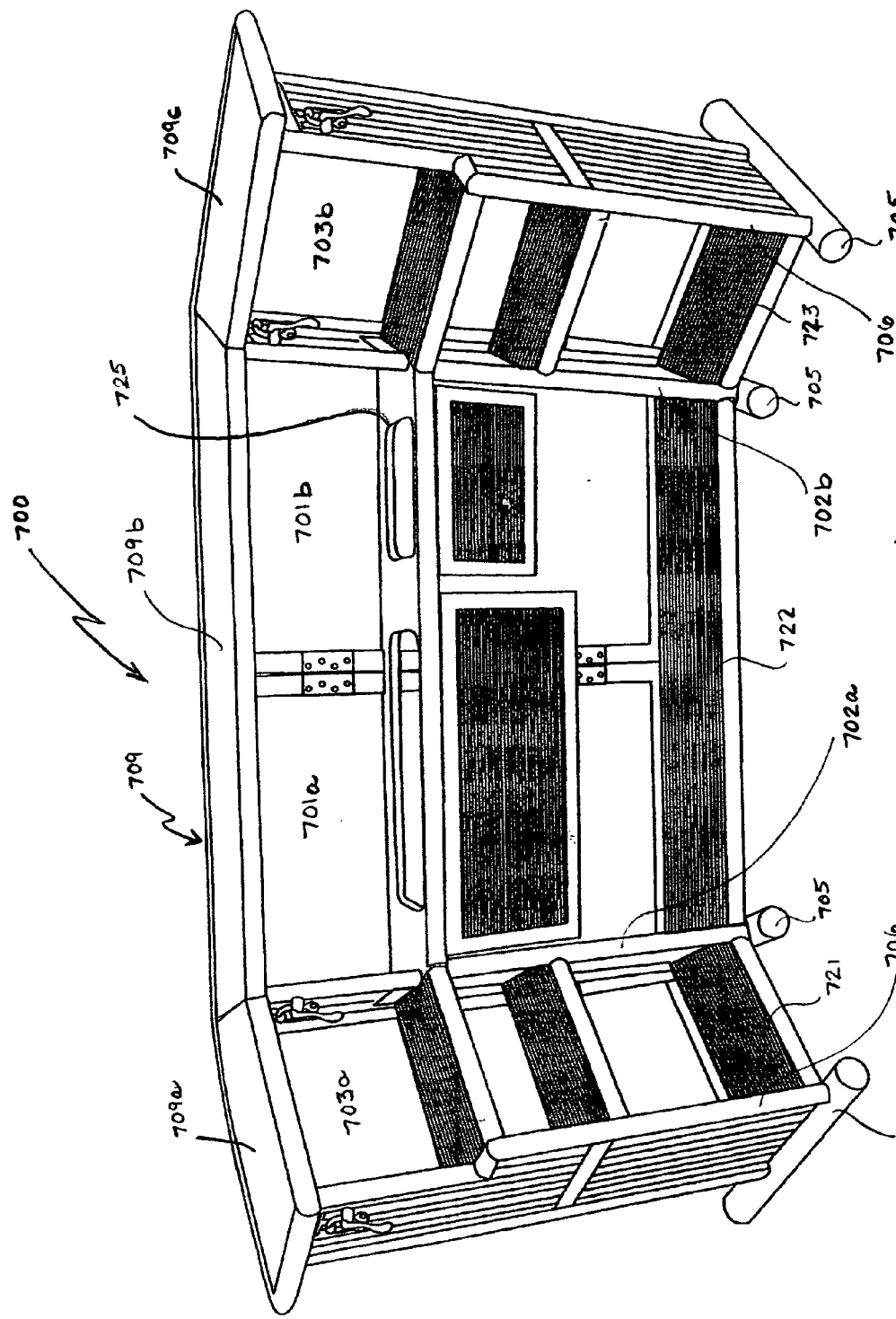
FIG. 47 is a backside view of the assembly of the vertical panels, side panels, and supporting panels of FIG. 45.
Figure 50:
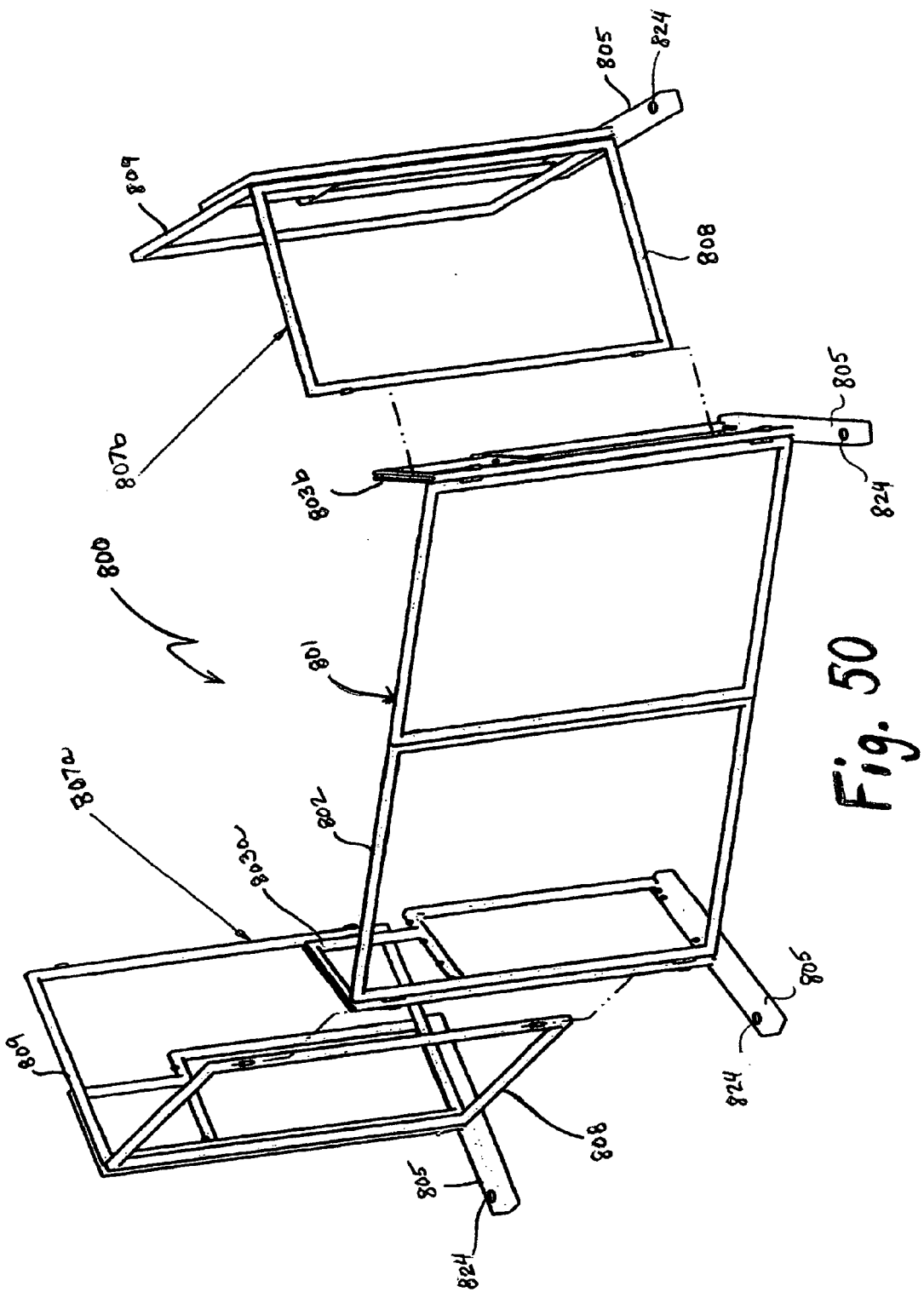
FIG. 50 is a perspective frontal view of another embodiment of the present invention showing the framework and the supporting frame of the portable bar.
Figure 54:
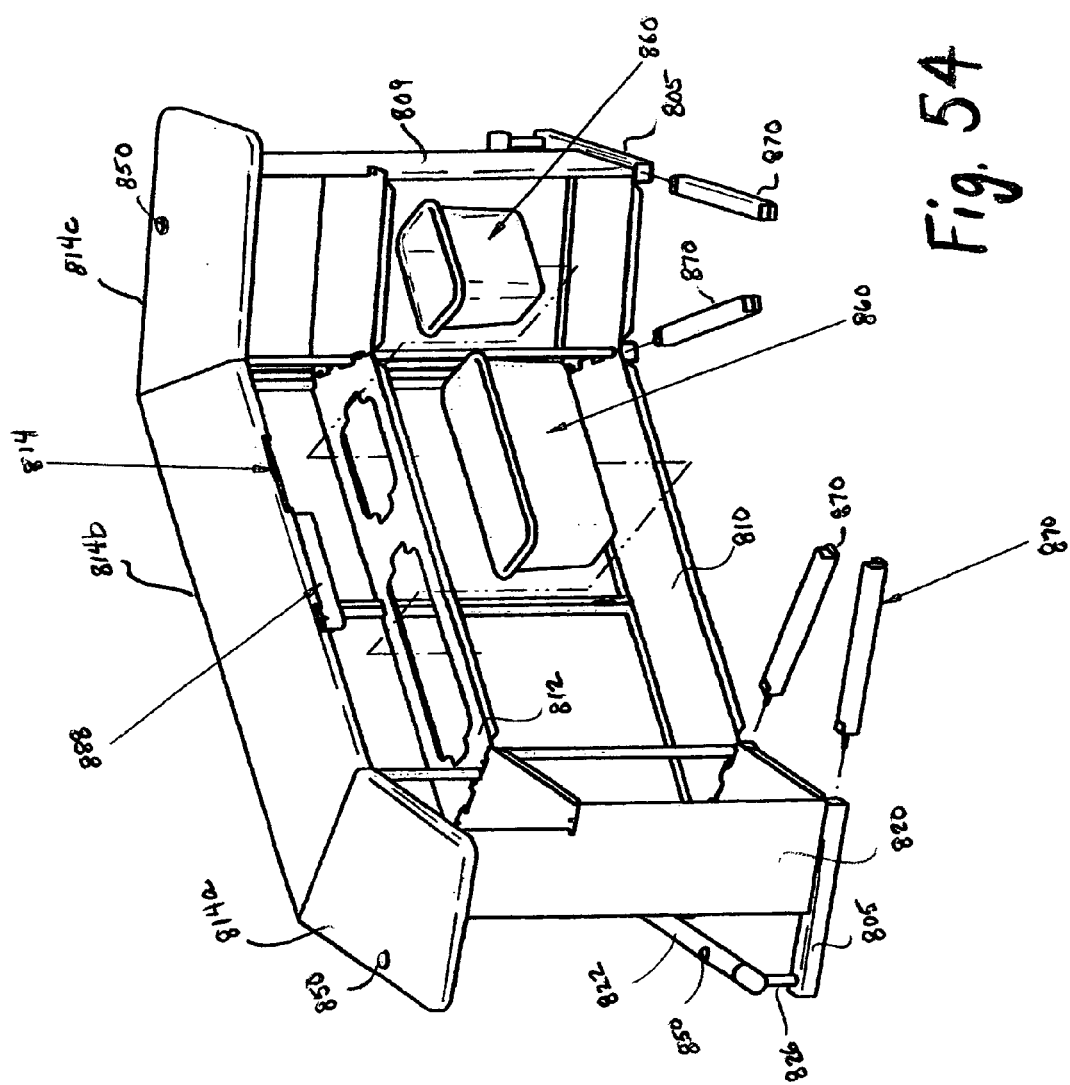
FIG. 54 is a perspective rear view of the further assembly of the portable bar shown in FIG. 52 showing the weights being attached to the foot members of the side frames of the bar and illustrates the shelves and the containers at the back side of the bar.

Hingedly connecting in a manner which is previously discussed in relation to the second embodiment of this invention, as clearly shown in FIG. 23, are shelves 474, 476 and 478. Shelf 474, when located in a transverse position relative to side panel 404, has a notch 480, which engages with a notch 482 formed within shelf 476. This will mean that the shelves 474 and 476 are in the outwardly extending transverse position so the top surface of the shelves 474 and 476 will be flush with each other. The same is true between shelves 476 and 478 by notches 484 and 486. Shelf 476 is to be connected with three in number of spaced apart braces 488, 490 and 492 with the outer end of the braces 488, 490 and 492 to be mounted against center section 420 of base 418. It is to be noted that brace 490 constitutes a separate member which is to be mounted by a pair of pins 494 to the under surface of shelf 476. Braces 488 and 492 are already mounted to shelf 476 by means of hinge plate 496. Hinge plate 496 permits braces 488 and 492 to be placed in juxtaposition with shelf 476 when third embodiment 396 of portable bar of this invention is in the disassembled position, as is shown in FIG. 28.

Shelf 476 includes a pair of enlarged holes 498 and 500. Hole 498 can be slightly larger than hole 500. Hole 498 is to connect with ice bucket 502 with hole 500 connecting with ice bucket 504. Also, ice buckets 502 and 504 will be mounted in the same way, as shown in FIGS. 20–21, on shelf 476 by pins 506. Ice buckets 502 and 504 will normally be made to be collapsible, similar to FIGS. 20–21.

Referring now to FIGS. 34–44, there is shown the fourth embodiment 508 of portable bar of this invention. Basically, fourth embodiment 508 includes an umbrella assembly 510, which is mounted in conjunction with a counter 512 which is mounted on a sidewall 514 which in turn is mounted on a base assembly 516. Sidewall 514, constructed similar to what was shown in FIG. 31, comprising a center section 518 which is attached at each end to a hinge strip 524. Since strip 522 has fixed thereto and extending in an inward direction an upper extension 542 and a lower extension 544. In a similar arrangement, side strip 520 has mounted thereon an upper extension 546 and a lower extension 548. On either wide of each upper extension 542 and 546 there is formed a pair of slots 543 and 547, respectively.

Side section 528 is hingedly connected by hinge strip 534 to vertical wall 536. Vertical wall 536 is capable of being deflected to a ninety degree angle relative to side section 528. Vertical wall 538 is mounted by hinge strip 540 to side section 532. Again, vertical wall 538 is capable of being deflected to a ninety-degree angle relative to side section 532 by hinge strip 540. Vertical walls 536 and 538, side sections 528 and 532, as well as center section 514 are also constructed of tin, planar sheet material panels with plastic again being the preferable material.

Extension 542 is to be located about a forty-five degree angle relative to center section 518. An elongated foot member 550 is to have a hollow interior chamber 551 and is to be connected to upper extension 542 by the lower edge of extension 542 to be inserted within this internal chamber 551 of elongated foot member 550 with this insertion being permitted by slots 543. A similar mounting arrangement is to occur for elongated foot member 552 relative to upper extension 546 utilizing hollow interior chamber 553 and slots 547. Elongated foot member 554 has a recess 556 located between a pair if spaced apart protrusions 558 and 560. There is a hole formed within both protrusions 558 and 560 with there being a similarly sized hole formed in narrowed extension 562 of vertical wall 538. A rod 564 is to be placed through hole 566 formed in protrusion 558 and then through hole 568 in narrowed extension 562 and then engaging with hole 570 formed within protrusion 560. Elongated foot member 554 is thus mounted to vertical wall 538. Elongated foot member 554 includes a round extension 572, which has a through hole 574.

Elongated foot member 576 is constructed similar to elongated foot member 554 and is actually identical. It is to be understood that like numbers are employed to show like parts. The only difference is the through hole in the round extension 576 will be referred to 578. Rod 580 will be used to mount elongated foot member 576 onto narrowed extension 582 of vertical wall 536.

Counter 512 is composed of center section 584 and side sections 586 and 588. Side section 586 is hingedly mounted relative to center section 584 by means of hinge strip 590. Similarly, side section 588 is pivotally mounted by hinge strip 592 relative to center section 584. Side sections 586 and 588 can be folded over and lay against the center section 584 when in the disassembled state, which is shown in FIG. 40. The disassembled state in FIG. 40 is depicting the fourth embodiment 508 of portable bar of this invention being contained within a shipping and storage box 594.

It is desirable to make the upper surface of counter 512 as smooth as possible, and when side sections 586 and 588 are folded out to be in substantial alignment with center section 584, there is formed a pair of slots 596 and 598. Within each slot 596 and 598 there is to be mounted a T-shaped strip 600. The leg of the T-is inserted within each slot 596 or 598 with the head portion of T-shaped strip 600 resting against the upper surface of counter 512. Clamp 602 is to be engaged in the area of each slot 596 and 598 with it being understood that there are two in number of clamps 602 being utilized. One clamp 602 will be secured to upper extension 546 and the other clamp 602 will be secured to extension 542. The function of clamp 602 is to keep counter 512 from tipping and keep it tightly secured to sidewall 514. To facilitate the securement to sidewall 514, there are mounted a pair of pins 604 and 606 which are mounted respectively on side strip 520 and side strip 522. Pin 604 fits within recessed hole 608 formed within side section 586. Pin 606 fits within recessed hole 610 formed within side section 588. Pins 604 and 606 will prevent counter 512 from sliding relative to sidewall 514.

A shelf unit 612 is to be constructed of a center shelf 614 and a pair of side shelves 616 and 618. Side shelf 616 is pivotally mounted to center shelf 614 by hinge strip 620. Side shelf 618 is pivotally mounted relative to center shelf 614 by means of hinge strip 622. A T-shaped strip 624 connects with the slot that is formed between side shelf 616 and center shelf 614. In a similar manner, a T-shaped strip 626 is mounted within the slot that is formed between side shelf 618 and center shelf 614 when side shelf 618 is aligned with center shelf 614. The same is true for the side shelf 616 when it is aligned with center shelf 614. Shelf unit 612 is to be placed in conjunction with sidewall 514 and be located in the gap area between upper extension 546 and lower extension 548 and upper extension 542 and lower extension 544. The side shelf 616 is to abut against vertical wall 536 will rest on ledge 628 of vertical wall 536 and abut against lip 628. Rod fastener 634 is to be used to connect between holes 636 and 638 to tightly secure side shelf 616 to vertical wall 536.

A similar mounting arrangement is to occur with side shelf 618. As for side shelf 618, a similar rod fastener 634 is used to connect between holes 646 and 646 of side section 618 and vertical wall 538 in order to securely mount this end of shelf unit 612. Side shelf 618 is to abut against vertical wall 532 and rest on ledge 637 and abut against lip 628.

Center brace 648 is to be used to support the middle area of center shelf 614 relative to the supporting surface on which the portable bar is mounted. One end of center brace 648 has knob 650, which is to connect within recess 642 formed within the undersurface of center shelf 614.

Formed within center shelf 614 is a pair of enlarged holes 654 and 656. Within hole 654 there is to be located ice bucket 658. Within hole 656 there is to be located ice bucket 660. Again, ice bucket 660 is shown to be smaller than ice bucket 658. However, any size representation could be employed. Actually, ice buckets 658 and 660 could also be of the same size. For a description of ice buckets 658 and 660, reference is to be had to FIGS. 20–21, which also shows the mounting arrangement utilizing of pins 662 and 664.

There is a through hole 666 formed in side section 588. There is a similar through hole 668 formed in side section 586. An umbrella shank 670 is to be mounted between the holes 668 and 578. In a similar manner, an umbrella shank 672 is to be mounted between the holes 666 and 574. Umbrella shank 670 includes a canopy 674 and umbrella shank 672 includes a canopy 676. The canopies 674 and 676 are to be connected together, as is shown in FIG. 2 of the drawings. Rod fastener 634 is located within a cutout area 635 formed within shelf sections 618 and 616. The reason for the cutout area 635 is to keep the rod fastener 634 located beneath the upper level of shelf 616 and 618 so that the rod fastener 634 will not interfere with any structure, such as glassware or silverware that may be mounted on shelf 616 or shelf 618.

Referring now to FIGS. 45–48, the portable bar 700 of the present invention is provided. The portable bar 700 comprises: a vertical panel 701 having a front side, a back side and opposing ends; at least two side panels 702a and 702b respectively, one side panel 702a is connected to each of the opposing ends of the vertical panel 701 and is perpendicular to the vertical panel 701, each of the panels, 702a and 702b, comprises at least one leg, the leg is a transversely located elongated foot member 705; at least two vertical support panels 703, each support panel 703 is connected to the opposing ends of the vertical panel 701 and the side panel 702, each of the vertical support panels 703 comprises a front panel 704 and a side support panel 706, the side support panel 706 is connected to the front panel 704 of the vertical support panel 703 and comprises at least one leg; a counter 709 is connected to and supported by the vertical panel 701 and the vertical support panels 703; and at least one horizontal shelf 721 is situated on the back side of the vertical panel 701.

The vertical panel 701 comprises at least two panel members 701a and 701b respectively, the panel members are connected to one another and are foldable onto one another for storage and shipment.

The shelf 721 comprises at least three shelf members, 721, 722 and 723 respectively, a first shelf member 722 being situated between each of the side panels 702, one of the second and third shelf members being situated between one of the side panels 702 and one of the side support panels 706 of each of the vertical support panels 703. The shelf 721 is situated near a bottom portion of the bar 700 to thereby support the assembly of the vertical panel 701, the side panels 702a and 702b and the vertical support panels 703a and 703b.

In another embodiment, the shelf 725 comprises at least one hole, the hole is designed to support a container and the container (not shown) is selected from a group consisting of an ice bucket, a chilling bucket, a cooler, an insulated compartment, a heated compartment, a storage compartment and mixtures thereof.

In a further embodiment, the leg of the side support panel 706 being a transversely located elongated foot member 705. In still a further embodiment, the counter 709 comprises at least three counter members, 709a, 709b and 709c respectively, and the counter members are connected to one another and are foldable for storage and shipment.

In yet further embodiment, the portable bar 700 further comprises a foot stand 720 connected to the legs of the side panels 702 and the side support panels 706, the stand 720 is situated on the front side of the vertical panel 701. In still yet a further embodiment, the foot stand 720 and the counter 709 comprises aligned apertures (not shown) for supporting an umbrella assembly 710a,b. The umbrella assembly 710a,b comprises a pole 712a,b and a canopy 714a,b, and the umbrella assembly 710a,b is attached to the bar 700.

In still another further embodiment, the portable bar 700 further comprises at least two umbrella assembles, 710a and 710b respectively, each of the umbrella assemblies comprises a pole, 712a and 712b, and a canopy, 714a and 714b, each of the poles 712 of the umbrella assemblies is designed to be inserted into the apertures of the foot member 705 and the counter 709 during assembly. In yet another further embodiment, the portable bar further comprises a connecting flap 716, and the flap 716 is attached to each of the canopies, 714a and 714b, of the umbrella assemblies, 710a and 710b.

Referring now to FIGS. 49a, 49b and 49c, the vertical panel 701, side panels 702 and vertical support panels 703 of the portable bar 700 are connected to one another by a series of locking mechanisms. The locking mechanism (hinge) comprises a first component 750 with a rod 751 and a second component 753 with a channel 752 for receiving the rod 751 during assembly. The locking mechanism has a keyed notch detail and the angle can be made to any desired degrees during assembly.

Referring now to FIGS. 50–55, the present invention relates to another embodiment of a portable bar 800. The portable bar 800 comprising: a framework 801 having a front and back side and comprising a central frame 802 with opposing ends and at least two side frames, 803a and 803b respectively, being situated on the opposing ends of the central frame 802 and being perpendicular to the central frame 802, each of the side frames 803 comprising at least one elongated foot member 805 situated at a bottom end of the side frame 803; at least two side supporting frames, 807a and 807b respectively, each being connected to the opposing ends of the central frame 802, the supporting frame 807 comprising a central supporting frame 808 and a side supporting frame 809, the side supporting frame 809 comprising at least one elongated foot member 805 situated at a bottom end of the side supporting frame 807; at least one supporting shelf 810 and at least one shelf 812 having an aperture for supporting a container 860, said shelves 810 and 812 being situated on the back side of the framework 801; at least one counter 814 attached to a top side of the framework 801 and the supporting frames 807; and at least one front panel 820 situated on the front side of the framework 801.

As shown in FIG. 53, the portable bar 800 further comprises a foot stand 822 connected to the foot members 805 of the side frames 803 and the side supporting frames 807, and the foot stand 822 is situated on the front side of the framework 801. The foot stand 822 has rods 826, which are designed for insertion into apertures 824 located on the foot members 805.

In still another embodiment, the container 860 is selected from a group consisting of an ice bucket, a chilling bucket, a cooler, an insulated compartment, a heated compartment, a storage compartment and mixtures thereof.

Figure 55:
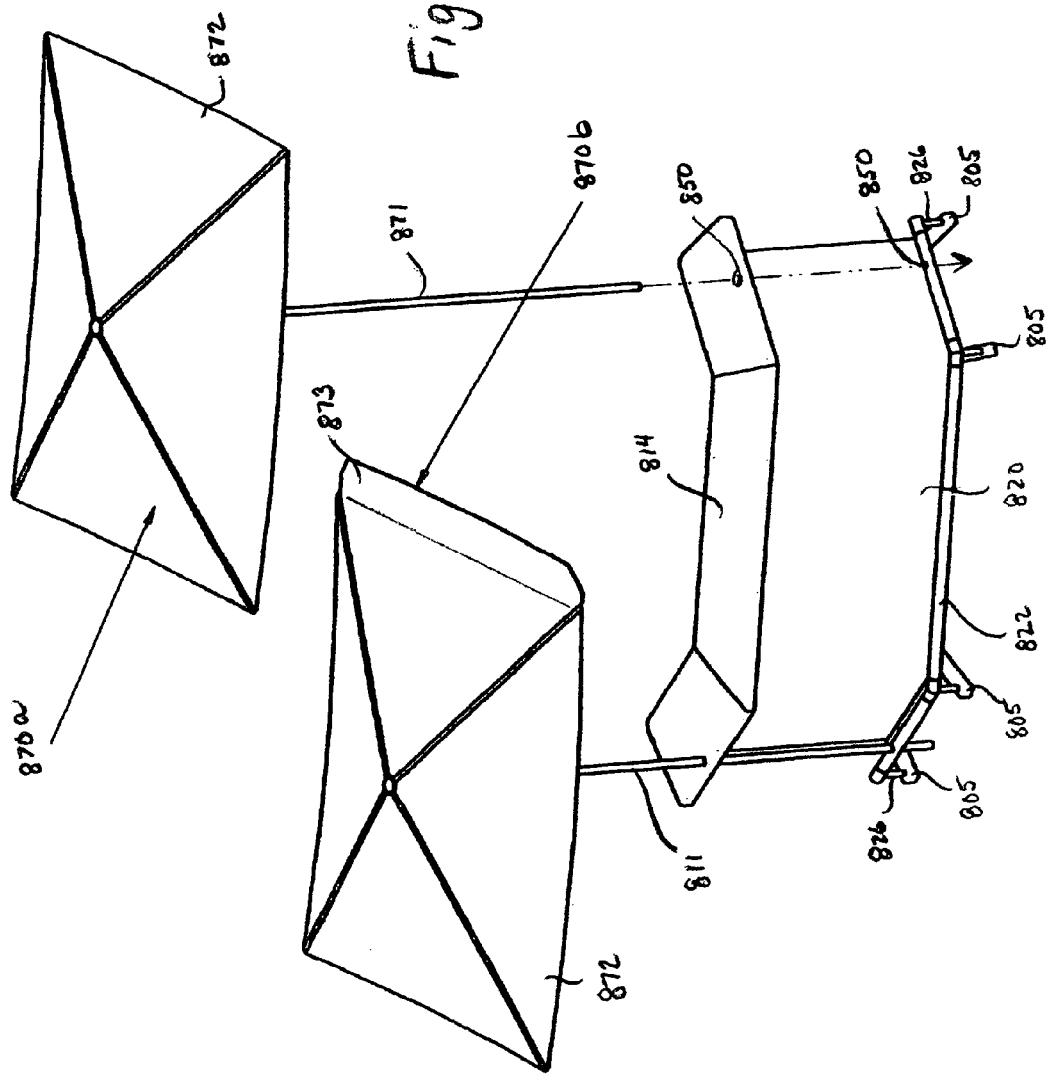
FIG. 55 is a perspective front view of the portable bar shown in FIGS. 50–54 showing the insertion of the umbrella assemblies.

As seen in FIG. 55, the portable bar 800 further comprises an umbrella assembly 870a,b, the umbrella assembly 870a,b comprises a pole 871 and a canopy 872, and the umbrella assembly 870a,b is attached to the bar 800. In still another embodiment, the portable bar 800 further comprises a foot stand 822 connected to the foot members 805 of the side frame 803 and the side supporting frames 807 and at least two umbrella assembles, 870a and 870b respectively, each of the umbrella assemblies comprises a pole 871 and a canopy 872, the foot stand 822 and the counter 814 having at least one aperture 850, each of the poles 871 of the umbrella assemblies is designed to be inserted into the apertures 850 of the foot stand 822 and the counter 814 during assembly. The two umbrella assemblies, 870a and 87b, have a connecting flap 873 for connecting the canopies, 872a and 872b, of the umbrella assemblies 870a and 870b.

In still yet another embodiment and as shown in FIG. 51, the counter 814 comprises at least three foldable members, 814a, 814b and 814c respectively, and the members are connected to one another and are in an extended state during use and a folded state during storage and shipment. In a further embodiment, the portable bar 800 further comprising at least one weight 870 attached to the foot members 805, and the foot members are hollow and designed to receive the weight. In a further embodiment, the front panel 820 comprises a fabric wrap designed to be attached to the framework 801. The bar 800 also has a retractable cutting board 888.

Figure 56:
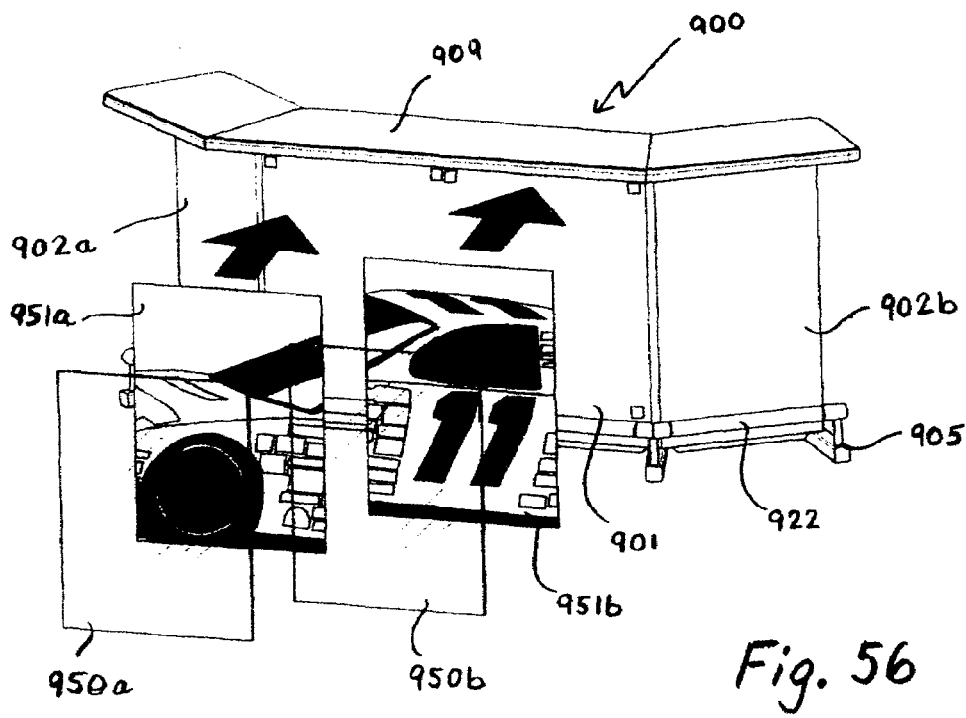
FIG. 56 is a perspective view of the portable bar showing the advertising material and the transparent attaching means situated on the front side of the vertical panel.
Figure 57:
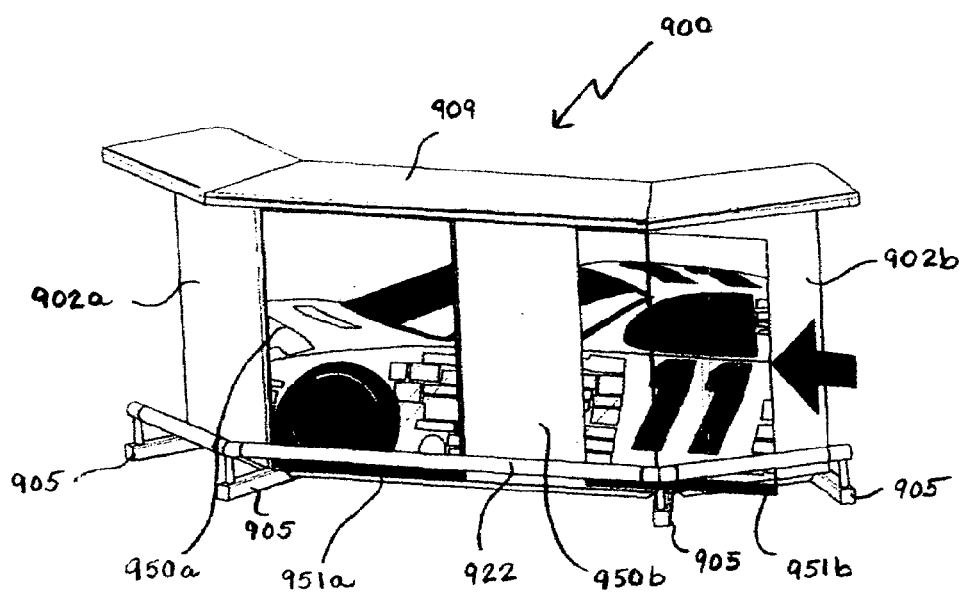
FIG. 57 is a perspective view of the portable bar shown in FIG. 56 showing the insertion of the advertising material within a space between the front side of the vertical panel and the transparent attaching means.

Referring now to FIGS. 56–57, the present invention provides for a portable bar 900. The portable bar comprises the front side of the vertical panel 901 and the front side of two vertical side support panels, 902a and b respectively. Each of the two vertical side support panels, 902a and b, are situated on opposing sides of the vertical panel 901. The bar 900 further comprises a counter 909 and a foot stand 922 supported by a plurality of foot members 905. The bar 900 further comprises advertising material 951a and b and transparent attaching means 950a and b. FIG. 57 shows the transparent attaching means, 950a and b, being attached to the front side of the vertical panel 901 to thereby create a space between the transparent attaching means 950 and the vertical panel 901. The advertising material 951 is inserted within the space created by the transparent attaching means 950 and the vertical panel 901.

Figure 58:
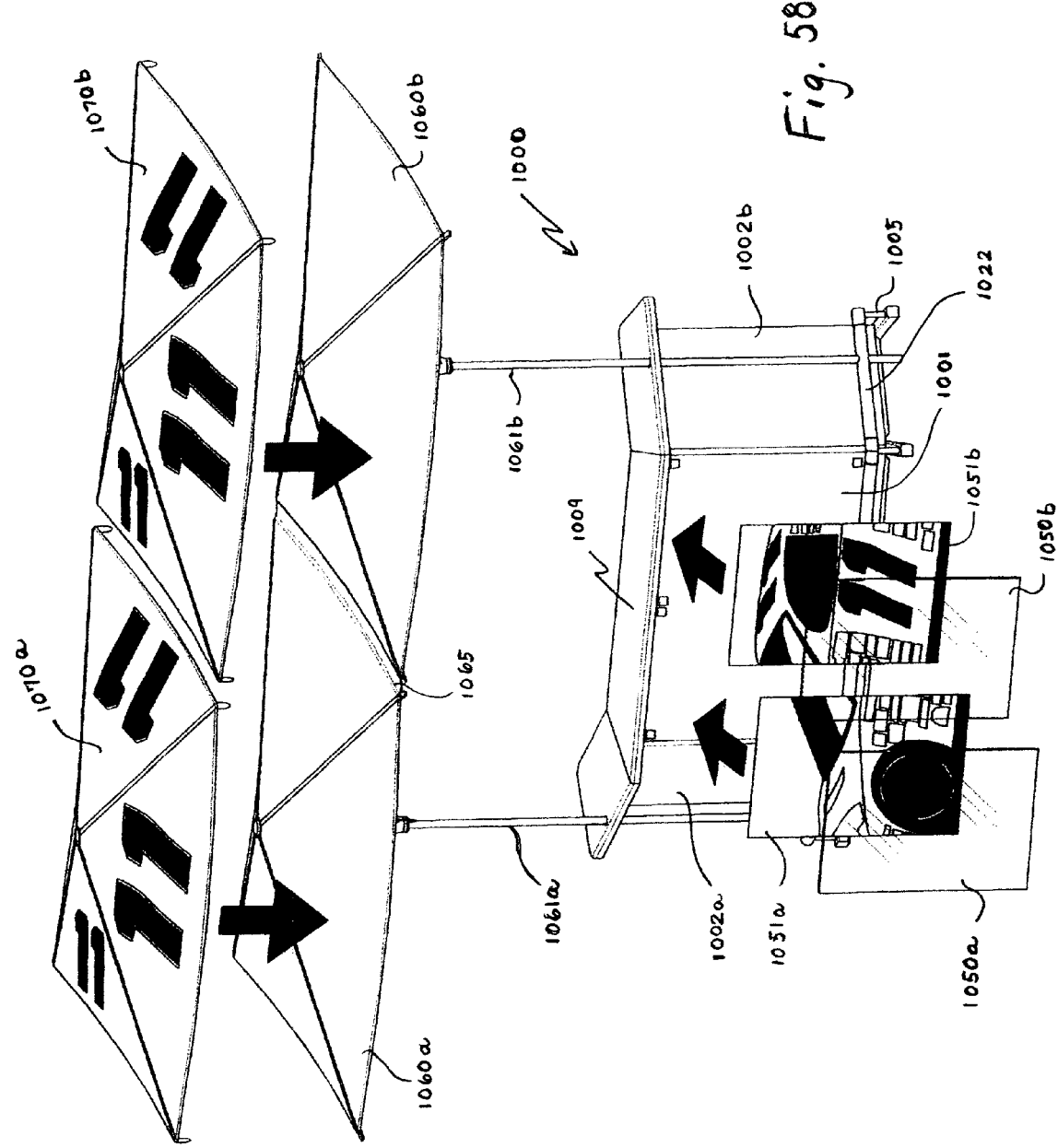
FIG. 58 is a perspective view of the portable bar with the umbrella assembly and advertising cover, and a wrap around advertising material attached to the front panel of the bar.

Referring now to FIG. 58, the present invention provides for a portable bar 1000. The portable bar comprises the front side of the vertical panel 1001 and the front side of two vertical side support panels, 1002a and b respectively. Each of the two vertical side support panels, 1002a and b, are situated on opposing sides of the vertical panel 1001. The bar 1000 further comprises a counter 1009 and a foot stand 1022 supported by a plurality of foot members 1005. The bar 1000 further comprises advertising material 1051a and b and transparent attaching means 1050a and b. The bar 1000 further comprises an umbrella assembly having two umbrellas, 1060a and b, and two poles, 1061a and b, attached to the two umbrellas. The bar 1000 further comprises two covers, 1070a and b, attached to umbrellas, 1060a and b. The umbrella assemby further comprises a connector 1065 for connecting the two umbrellas, 1060a and b. Advertising material can be printed, painted, silk screened, etc. onto the cover. The cover can be waterproof.

Figure 59:
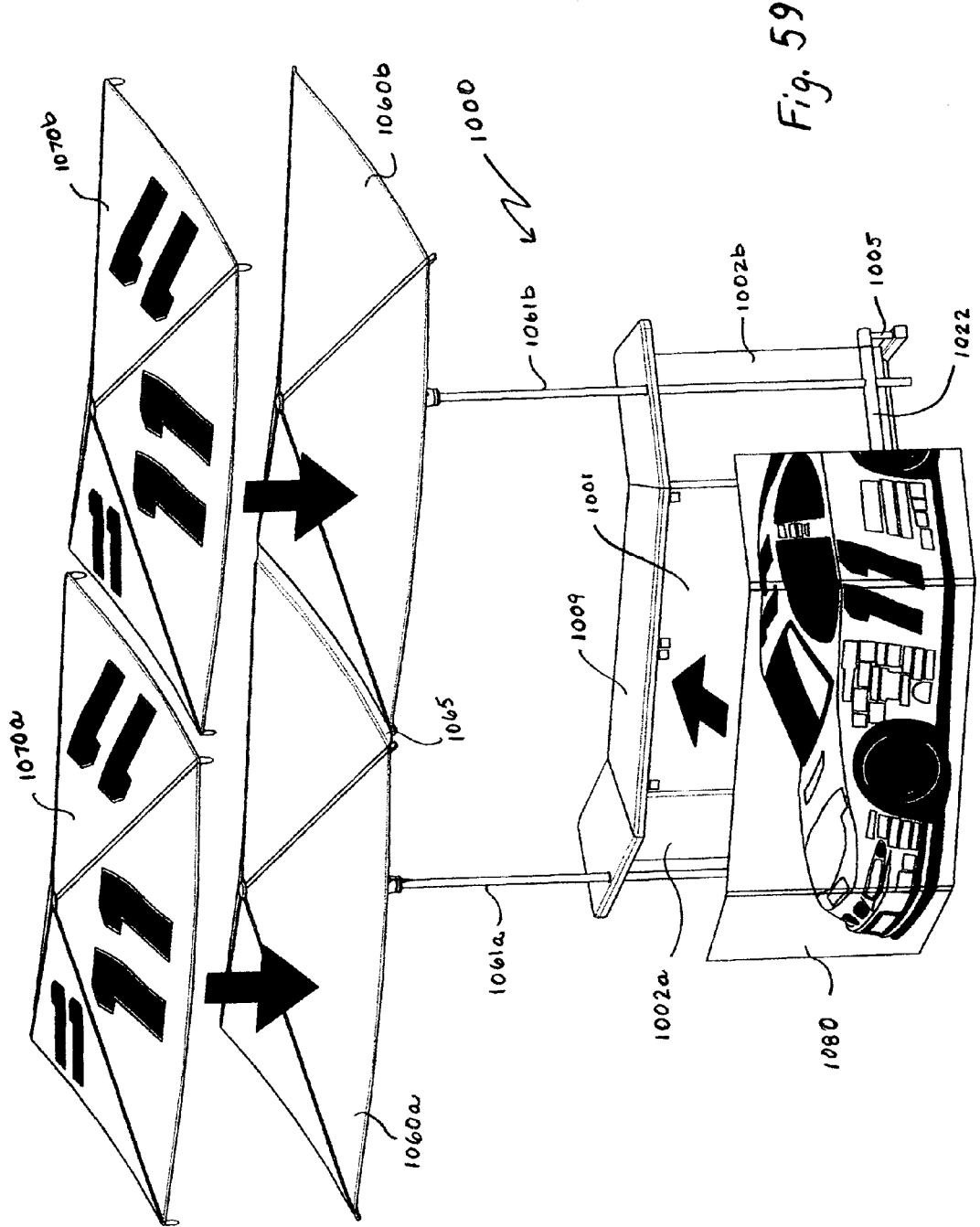
FIG. 59 is a perspective view of the portable bar with the umbrella assembly and cover and the advertising material with the transparent attaching means.

Now we refer to FIG. 59 where the present invention provides for another embodiment of the invention for attaching advertising material onto the front side of the bar 1000. The portable bar comprises the front side of the vertical panel 1001 and the front side of two vertical side support panels, 1002a and b respectively. Each of the two vertical side support panels, 1002a and b, are situated on opposing sides of the vertical panel 1001. The bar 1000 further comprises a counter 1009 and a foot stand 1022 supported by a plurality of foot members 1005. The bar 1000 further comprises wraparound advertising material 1080 attached to the front side of the vertical panel 1001 and the front side of the two vertical side panels, 1002a and b. The bar 1000 further comprises an umbrella assembly having two umbrellas, 1060a and b, and two poles, 1061a and b, attached to the two umbrellas. The bar 1000 further comprises two covers, 1070a and b, attached to umbrellas, 1060a and b. The umbrella assembly further comprises a connector 1065 for connecting the two umbrellas, 1060a and b.

Figure 60:
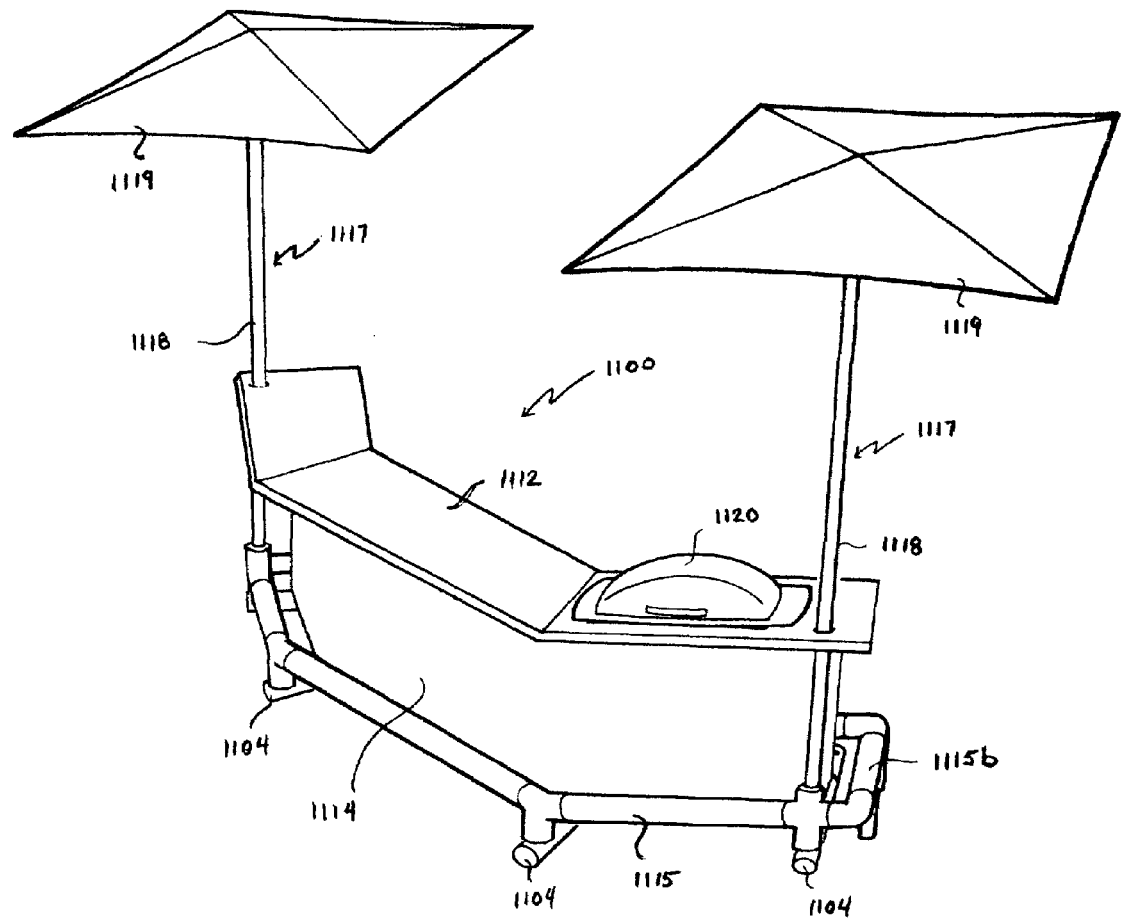
FIG. 60 is a perspective view of another embodiment of the invention showing the portable bar with barbecue, umbrella assemblies and foot stand.
Figure 61:
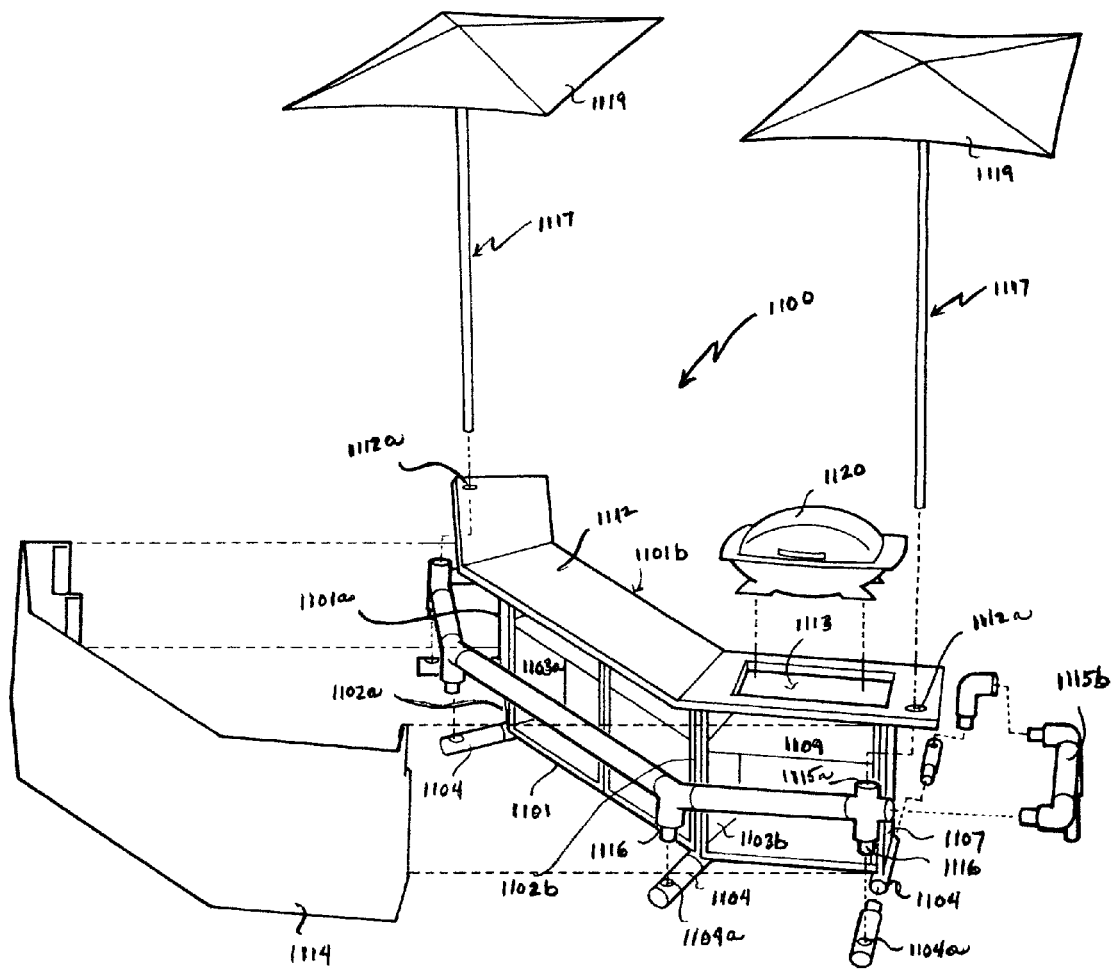
FIG. 61 is a perspective view of FIG. 60 showing the dissembled components of the portable bar shown in FIGS. 50–55 and portable barbecue.

Referring now to FIGS. 60–61, the present invention provide for portable bar 1100 comprises a framework 1101 having a front and back side, 1101a and 1101b respectively. The bar 1100 comprises a central frame 1102 with opposing ends, 1102a and 1102b respectively, and at least two side frames 1103a and 1103b situated on the opposing ends, 1102a and 1102b, of the central frame 1102 and is perpendicular to the central frame 1102. Each of the side frames, 1103a and 1103b, comprises at least one elongated foot member 1104 situated at a bottom end of each of the side frame, 1103a and 1103b. The portable bar 1100 further comprises least two side supporting frames, 1105a and 1105b, respectively. Each frame is connected to the opposing ends, 1102a and 1102b, of the central frame 1102. The supporting frame 1105 comprising a central supporting frame 1106 and a side supporting frame 1107. The side supporting frame 1107 comprises at least one elongated foot member 1104 situated at a bottom end of the side supporting frame 1107. The bar 1100 further comprises at least one supporting shelf 1108 and at least one shelf 1109 having an aperture 1110 for supporting a container 1111. The shelves, 1108 and 1109, are situated on the back side 1101b of the framework 1101. The bar 1100 also comprises at least one counter 1112 attached to a top side of the framework 1101 and the supporting frames 1105; and at least a portion of the counter 1112 having an aperture 1113 for receiving a cooking apparatus 1120. The bar 1100 further comprises at least one front panel 1114 situated on the front side 1101a of the framework 1101.

The portable bar also has a foot stand 1115. The foot stand 1115 has a plurality of rods 1116 which are perpendicular to the foot stand 1115 and point in a downward direction. The foot members 1104 have an aperture 1104a designed to receive the rods 1116 of the foot stand 1115. In another embodiment, the bar 1100 further comprises an umbrella assembly 1117 and the assembly comprises a pole 1118 and a canopy 1119. The counter 1112 of the bar 1100 can have a hole 1112a for receiving the pole 1118 of the umbrella assembly 1117, In a further embodiment, the foot stand 1115 has a hole 1115a situated above one of the rods 1116 which aligns with the foot member 1104. In still another embodiment, the pole 1118 of the umbrella assembly 1117 goes through the hole 1112a and then through the hole 1115a of the foot stand 1115 and sits on the aperture 1104a of the foot member 1104. The foot stand 1115 can have a side stand 1115b.

Figure 62:
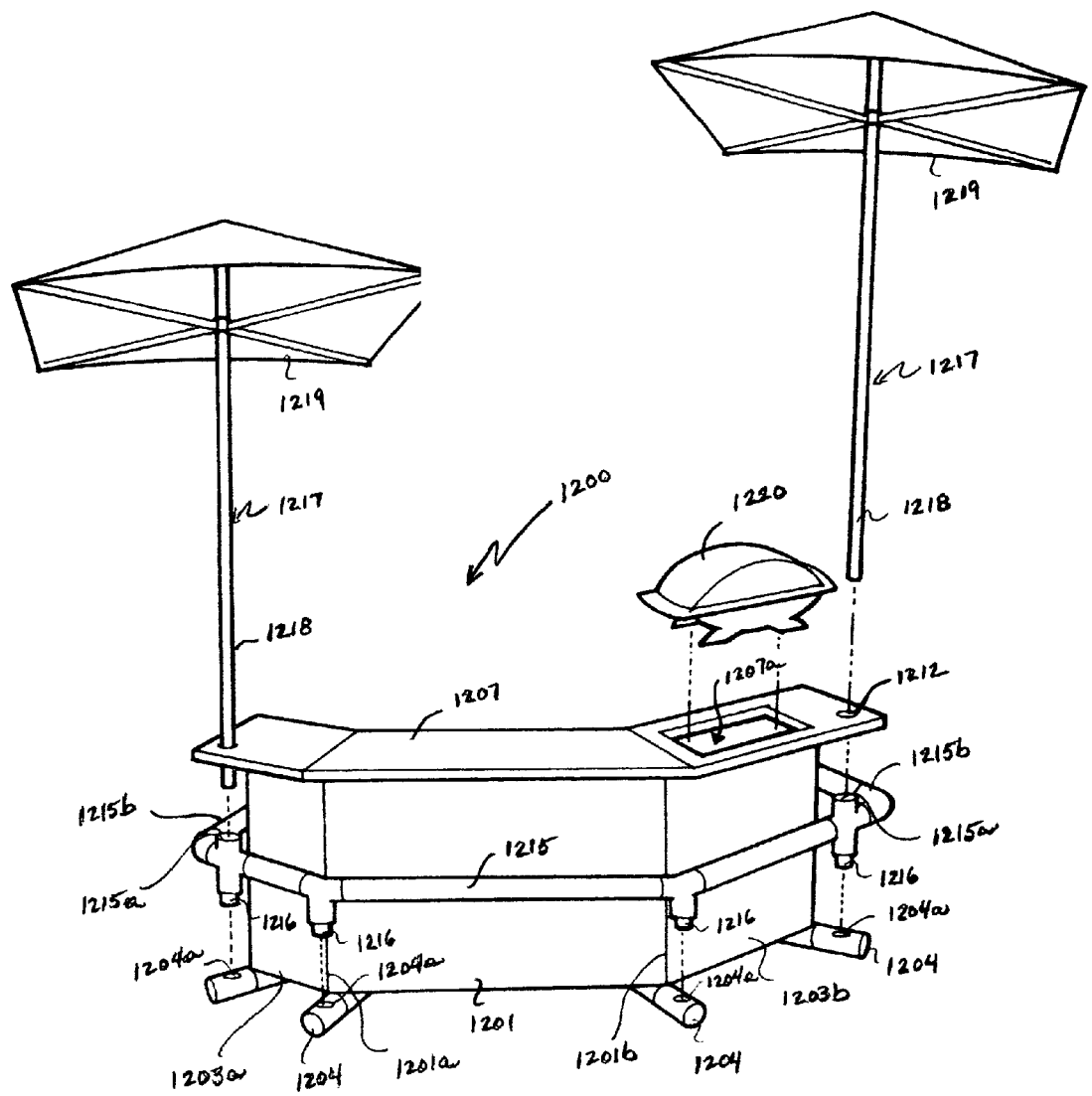
FIG. 62 is a perspective view of another embodiment of the present invention having the portable bar structure shown in FIGS. 45–48.
Figure 63:
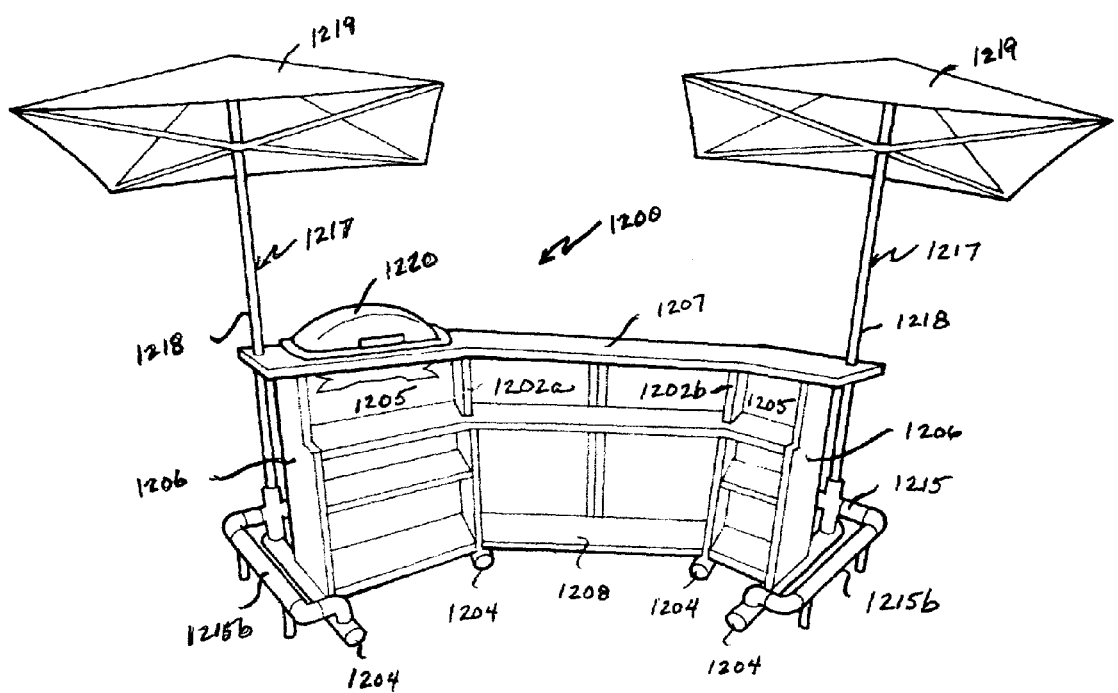
FIG. 63 is a rear view of FIG. 62 showing the portable bar and portable barbecue.

In FIGS. 62–63, the present invention provides for a portable bar 1200 a vertical panel 1201 having a front side 1201a, a back side 1201b and opposing ends 1201c and 1201d respectively; at least two side panels 1202a and 1202b, each of the side panels, 1202a and 1202b, are connected to each of the opposing ends, 1201c and 1201d, of the vertical panel 1201 and are perpendicular to the vertical panel 1201. Each of the side panels, 1202a and 1202b, comprises at least one elongated foot member 1204. The bar 1200 further comprises at least two vertical support panels, 1203a and 1203b respectively; each support panel 1203 is connected to the opposing ends, 1201c and 1201d, of the vertical panel 1201 and the side panels, 1202a and 1202b. Each of the vertical support panels, 1203a and 1203b, comprises a front panel 1205 and a side support panel 1206. The side support panel 1206 is connected to the front panel 1205 of the vertical support panel 1203 and comprising at least one elongated foot member 1204. The bar 1200 also comprises a counter 1207 connected to and supported by the vertical panel 1201 and the vertical support panels 1203. At least a portion of the counter 1207 comprises at least one aperture 1207a for receiving a cooking apparatus 1220. The bar 1200 comprises at least one horizontal shelf 1208 situated on the back side 1201b of the vertical panel 1201.

The portable bar also has a foot stand 1215. The foot stand 1215 has a plurality of rods 1216 which are perpendicular to the foot stand 1215 and point in a downward direction. The foot members 1204 have an aperture 1204a designed to receive the rods 1216 of the foot stand 1215. In another embodiment, the bar 1200 further comprises an umbrella assembly 1217 and the assembly comprises a pole 1218 and a canopy 1219. The counter 1207 of the bar 1200 can have a hole 1212 for receiving the pole 1218 of the umbrella assembly 1217, In a further embodiment, the foot stand 1215 has a hole 1215a situated above one of the rods 1216 which aligns with the foot member 1204. In still another embodiment, the pole 1218 of the umbrella assembly 1217 goes through the hole 1212a and then through the hole 1215a of the foot stand 1215 and sits on the aperture 1204a of the foot member 1204. The foot stand 1215 can have a side stand 1215b.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A portable bar comprising:
   a vertical panel having a front side, a back side and opposing ends;
   at least two side panels, one side panel being connected to each of said opposing ends of said vertical panel and being perpendicular to said vertical panel, each of said side panels comprising at least one leg, said leg being a transversely located elongated foot member;
   at least two vertical support panels, each support panel being connected to said opposing ends of said vertical panel and said side panels, each of said vertical support panels comprising a front panel and a side support panel, said side support panel being connected to said front panel of said vertical support panel and comprising at least one leg;
   a counter being connected to and supported by said vertical panel and said vertical support panels, at least a portion of said counter comprising at least one aperture for receiving a cooking apparatus; and
   at least one horizontal shelf being situated on the back side of said vertical panel.

2. The portable bar of claim 1 wherein said vertical panel comprises at least two panel members, said panel members being connected to one another and being foldable onto one another for storage and shipment.

3. The portable bar of claim 1 wherein said shelf comprises at least three shelf members, a first shelf member being situated between each of said side panels, one of said second and third shelf members being situated between one of said side panels and one of said side support panels of each of said vertical support panels.

4. The portable bar of claim 3 wherein said shelf is situated near a bottom portion of said bar to thereby support the assembly of said vertical panel, said side panels and said vertical support panels.

5. The portable bar of claim 1 wherein said shelf comprises at least one hole, said hole being designed to support a container.

6. The portable bar of claim 5 wherein said container is selected from a group consisting of an ice bucket, a chilling bucket, a cooler, an insulated compartment, a heated compartment, and a storage compartment.

7. The portable bar of claim 1 wherein said leg of said side support panel being a transversely located elongated foot member.

8. The portable bar of claim 1 wherein said counter comprises at least three counter members, said counter members being connected to one another and being foldable for storage and shipment.

9. The portable bar of claim 1 further comprising a foot stand connected to said legs of said side panels and said side support panels, said stand being situated on the front side of said vertical panel.

10. The portable bar of claim 9 wherein said foot stand and said counter comprises aligned apertures for supporting an umbrella assembly.

11. The portable bar of claim 1 further comprising an umbrella assembly, said umbrella assembly comprising a pole and a canopy, said umbrella assembly being attached to said bar.

12. The portable bar of claim 11 further comprising connecting flap, said flap being attached to each of said canopies of said umbrella assemblies.

13. The portable bar of claim 1 further comprising an umbrella assembly, said umbrella assembly comprising a pole and a canopy, said umbrella assembly being attached to said bar.

14. The portable bar of claim 1 further comprising a means for attaching advertising material to said front side of said vertical panel and a front side of said vertical support panels.

15. The portable bar of claim 14 wherein said attaching means comprises a transparent material situated adjacent to said front side of said vertical panel and providing a space between said transparent material and said vertical panel to allow for insertions of advertising material.

16. The portable bar of claim 1 wherein the attachment of said vertical panel to each of said vertical support panel creates an angle from at least about 1 degree to about 90 degrees relative to a vertical line upon which said vertical panel is situated.

17. The portable bar of claim 1 further comprises a cooking apparatus, said cooking apparatus comprises a barbecue.

18. The portable bar of claim 1 further comprises a cooking apparatus, said cooking apparatus comprises a portable barbecue.

19. A portable bar comprising:
   a vertical panel having a front side, a back side and opposing ends;
   at least two side panels, one side panel being connected to each of said opposing ends of said vertical panel and being perpendicular to said vertical panel, each of said side panels comprising at least one leg, said leg being a transversely located elongated foot member;
   at least two vertical support panels, each support panel being connected to said opposing ends of said vertical panel and said side panels, each of said vertical support panels comprising a front panel and a side support panel, said side support panel being connected to said front panel of said vertical support panel and comprising at least one leg;

a counter being connected to and supported by said vertical panel and said vertical support panels, at least a portion of said counter comprising at least one aperture for receiving a cooking apparatus;

at least one cooking apparatus situated within said aperture of said counter during use and being removable from said aperture of said counter during storage or portability; and at least one horizontal shelf being situated on the back side of said vertical panel.

20. A collapsible, portable bar comprising:

a main panel having a front side and a back side, said main panel comprising at least one vertical front panel having opposing sides and at least one side panel attached to each of said opposing sides of said front panel, each of said side panels comprising at least one elongated foot member, a portion of said foot member being situated on the front side of said main panel and another portion of said foot member being situated on the back side of said main panel;

at least two supporting panels, one of said supporting panels being connected to said opposing sides of said vertical front panel, each of said supporting panels comprising front supporting panel connected to a side supporting panel, said side supporting panel comprising at least one elongated foot member, said supporting panels having a front side and a back side, a portion of said foot member being situated on the front side of said supporting panel and another portion of said foot member being situated on the back side of said supporting panel;

at least one counter attached to a top side of said main panel and said supporting panels, at least a portion of said counter comprising at least one aperture for receiving a cooking apparatus;

at least one supporting shelf being situated on the back side of said main panel; and at least one shelf situated on the back side of said main panel, said shelf having an opening for supporting a container, said container is selected from a group consisting of an ice bucket, a chilling bucket, a cooler, an insulated compartment, a heated compartment, and a storage compartment.

* * * * *